US006791207B2

(12) United States Patent
Yoshida et al.

(10) Patent No.: US 6,791,207 B2
(45) Date of Patent: Sep. 14, 2004

(54) POWER SUPPLYING APPARATUS FOR VEHICLE AND INTENSIVE WIRING APPARATUS

(75) Inventors: Tatsuya Yoshida, Urizura-machi (JP); Hiroyuki Saito, Hitachinaka (JP); Shinichi Sakamoto, Mito (JP); Mitsuru Kon-i, Hitachinaka (JP); Yuichi Kuramochi, Hitachinaka (JP); Kaneyuki Okamoto, Hitachinaka (JP); Ichiro Ohsaka, Kawasaki (JP); Kiyoshi Horibe, Hitachi (JP)

(73) Assignees: Hitachi, Ltd., Tokyo (JP); Hitachi Car Engineering Co., Ltd., Htachinaki (JP)

( * ) Notice: Subject to any disclaimer, the term of this patent is extended or adjusted under 35 U.S.C. 154(b) by 0 days.

(21) Appl. No.: 09/349,211

(22) Filed: Jul. 2, 1999

(65) Prior Publication Data

US 2003/0075980 A1 Apr. 24, 2003

(30) Foreign Application Priority Data

Jul. 3, 1998 (JP) .......................................... 10-188549

(51) Int. Cl.[7] .............................................. H02G 3/00
(52) U.S. Cl. ...................... 307/10.1; 307/9.1; 307/10.6; 307/10.7; 307/10.8
(58) Field of Search .............................. 307/10.1, 10.6, 307/10.8, 10.7, 9.1; 361/104, 115, 93.1

(56) References Cited

U.S. PATENT DOCUMENTS

| 5,808,371 A | * | 9/1998 | Kon'I et al. | ................ 307/10.1 |
| 5,818,673 A | * | 10/1998 | Matsumaru et al. | ........... 361/63 |
| 5,917,249 A | * | 6/1999 | Kon'I et al. | ................ 307/10.1 |
| 5,994,790 A | * | 11/1999 | Nagashima et al. | ........ 307/10.1 |
| 6,157,091 A | * | 12/2000 | Yoshida et al. | ............. 307/10.1 |
| 6,166,453 A | * | 12/2000 | Kon'I et al. | ................ 307/10.1 |

FOREIGN PATENT DOCUMENTS

WO          WO 96/26570         8/1996

* cited by examiner

Primary Examiner—Robert DeBeradinis
(74) Attorney, Agent, or Firm—Crowell & Moring LLP

(57) ABSTRACT

An electric power supply system for a vehicle has an electric power line wired in a loop configuration. From the electric power line power is supplied to a load, and to another system which supplies control system power supply. One shutdown circuit is provided in a module connected to the loop configured power supply line. When the electric power line and the load are short circuited, the shutdown can isolate and shut down only the failure point. Further, when the car is not in use, by stopping the power supply to the load, current consumption can be restrained. In response to detection of a ground short and a failure of a connection of a connector, an over-current prevention of an electric power line, a simple construction can be provided and a low current consumption can be realized.

10 Claims, 39 Drawing Sheets

FIG. 27
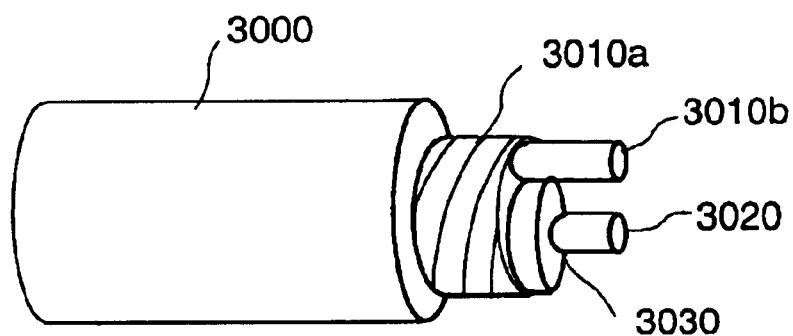
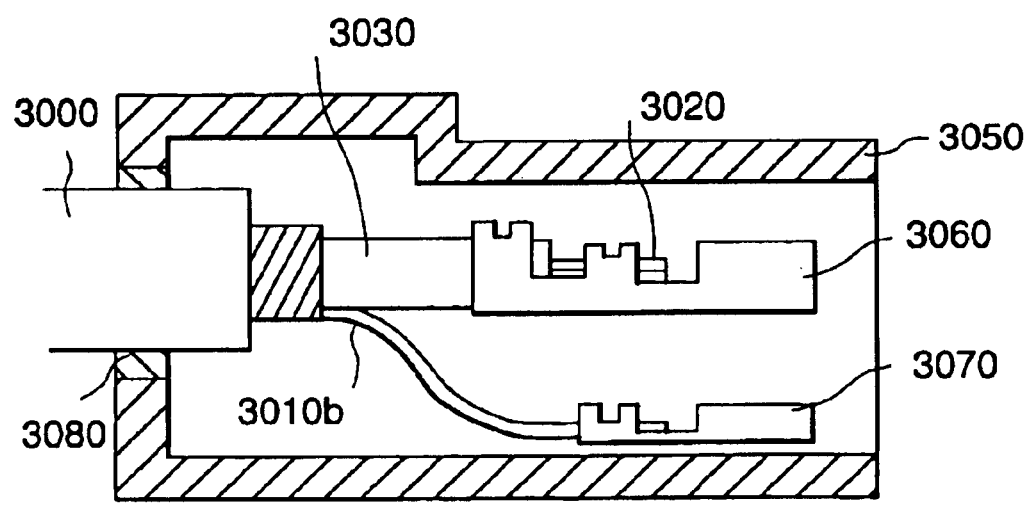

FIG. 31

| FAIL POINT | LOAD POWER SUPPLY SHUTDOWN CIRCUIT TO BE PERFORMED SHUTDOWN |
|---|---|
| 12 −A | LOAD POWER SUPPLY SHUTDOWN CIRCUIT 1 OF FIM AND LOAD POWER SUPPLY SHUTDOWN CIRCUIT 1 OF BCM |
| 12 −B | LOAD POWER SUPPLY SHUTDOWN CIRCUIT 1 OF FIM AND LOAD POWER SUPPLY SHUTDOWN CIRCUIT 1 OF BCM |
| 12 −C | LOAD POWER SUPPLY SHUTDOWN CIRCUIT 1 OF BCM AND LOAD POWER SUPPLY SHUTDOWN CIRCUIT OF RIM |
| 12 −D | LOAD POWER SUPPLY SHUTDOWN CIRCUIT 1 OF BCM AND LOAD POWER SUPPLY SHUTDOWN CIRCUIT OF RIM |
| 12 −E | LOAD POWER SUPPLY SHUTDOWN CIRCUIT OF RIM AND LOAD POWER SUPPLY SHUTDOWN CIRCUIT 2 OF BCM |
| 12 −F | LOAD POWER SUPPLY SHUTDOWN CIRCUIT OF RIM AND LOAD POWER SUPPLY SHUTDOWN CIRCUIT 2 OF BCM |
| 12 −G | LOAD POWER SUPPLY SHUTDOWN CIRCUIT 2 OF BCM AND LOAD POWER SUPPLY SHUTDOWN CIRCUIT2 OF FIM |
| 12 −H | LOAD POWER SUPPLY SHUTDOWN CIRCUIT 2 OF BCM AND LOAD POWER SUPPLY SHUTDOWN CIRCUIT2 OF FIM |
| NORMAL | LOAD POWER SUPPLY SHUTDOWN CIRCUIT OF FIM |

FIG. 32

| FAIL POINT | LOAD POWER SUPPLY SHUTDOWN CIRCUIT TO BE PERFORMED SHUTDOWN |
|---|---|
| A | LOAD POWER SUPPLY SHUTDOWN CIRCUIT 1 OF FIM AND LOAD POWER SUPPLY SHUTDOWN CIRCUIT 1 OF BCM |
| B | LOAD POWER SUPPLY SHUTDOWN CIRCUIT 1 OF FIM AND LOAD POWER SUPPLY SHUTDOWN CIRCUIT 1 OF BCM |
| C | LOAD POWER SUPPLY SHUTDOWN CIRCUIT 1 OF BCM AND LOAD POWER SUPPLY SHUTDOWN CIRCUIT OF RIM |
| D | LOAD POWER SUPPLY SHUTDOWN CIRCUIT 1 OF BCM AND LOAD POWER SUPPLY SHUTDOWN CIRCUIT OF RIM |
| E | LOAD POWER SUPPLY SHUTDOWN CIRCUIT OF RIM AND LOAD POWER SUPPLY SHUTDOWN CIRCUIT 2 OF BCM |
| F | LOAD POWER SUPPLY SHUTDOWN CIRCUIT OF RIM AND LOAD POWER SUPPLY SHUTDOWN CIRCUIT 2 OF BCM |
| G | LOAD POWER SUPPLY SHUTDOWN CIRCUIT 2 OF BCM AND LOAD POWER SUPPLY SHUTDOWN CIRCUIT2 OF FIM |
| H | LOAD POWER SUPPLY SHUTDOWN CIRCUIT 2 OF BCM AND LOAD POWER SUPPLY SHUTDOWN CIRCUIT2 OF FIM |
| NORMAL | NONE (ALL CONNECTION STATES) |

POWER SUPPLYING APPARATUS FOR VEHICLE AND INTENSIVE WIRING APPARATUS

BACKGROUND OF THE INVENTION

This application claims the priority of Japanese patent document 10 188549, filed Jul. 3, 1998, the disclosure of which is expressly incorporated by reference herein.

The present invention relates to an apparatus for supplying power from a power supply to plural electric loads mounted on a vehicle, and particularly an automobile.

In a vehicle, an electrical supply system is installed for the various kinds of the electric loads. In an automobile, for example, various power supply wire harnesses are used to supply power from a power supply such as a battery and a generator to the various electric loads.

When an electric power line (a wire harness) is used for wiring an actual vehicle, taking into consideration the labor involved in wiring and repairs, each area of the vehicle (such as an engine compartment, an interior portion of the cabin, a trunk, or a door) is connected by separating the wire harness, and using a connector. Accordingly, power is supplied to the several harnesses through the various kinds of the connectors to reach the end loads from the power supply (such as the battery).

Further, in the above described power supply system, generally one side of the power supply system is used to supply a part of a vehicle body. For this reason, a short circuit occurs only by touching the electric power line to the vehicle body.

Therefore, in the conventional vehicle power supply apparatus, since a fuse box is provided at a predetermined location in the vehicle, and further a fuse (a fusible chip for protecting against an over-current) is provided at a predetermined load system, when a short occurs in the electric power line, the power supply is isolated by the fuse, so that the apparatus is protected. Such a fuse is housed in a lower portion of a console box of the automobile, and in a fuse box which is provided to an interior portion of the trunk.

Accordingly, in the prior art, depending on its nature, the load may be connected to the power supply by a very long wire harness. Further, when the electric power line is short-circuited and fails, in order to avoid generating smoke in the electric power line before the fuse blows, it is necessary for the circuit to be able to accommodate an increase of the normal current of the electric power line up to the fuse current of the fuse. As a result, the vehicle uses a heavy gauge wire as the electric power line.

Further, if the coupling of the connector is loosened at a midway point of the wire harness and the connector fails, the power supply to the load becomes unstable. Since the wire harness is normally hidden in an inner trim (an interior mounting), the identification of the shorted portions of the electric power line and the location of a failure in connection of the connector, are difficult.

To solve the above problems, the applicants have proposed a new power supply system in an international laid-open publication No. WO 96/26570.

SUMMARY OF THE INVENTION

An object of the present invention is to provide a power supply apparatus which is highly reliable with respect to abnormalities (such as, for example, a short-circuit) of an electric power line.

Another object of the present invention is to provide a power supply apparatus in which power can be supplied using a wire harness having a comparatively low regular current.

A further object of the invention is to provide a power supply apparatus for a vehicle in which an abnormal and/or failed portion of a connection, due to a short-circuit of the wire harness, can be easily located.

Still another object of the invention is to provide a power supply apparatus which prevents unnecessarily high load current to an electric power line, and reduces consumption of electric power.

Yet another object of the invention is to provide a power supply apparatus in which a fuse and a relay are arranged in the vicinity of a control module, and power supply wiring can be shortened.

One object stated above is attained by providing a fuse and/or an electric line shutdown apparatus (for example, a relay, a self shutdown switching element, such as a circuit breaker) between the power supply and the electric load. In this manner, double protection or even a triple protection is provided against a short circuit.

Another object can be attained by means of a control unit from the power supply. To supply power to an electric load in a vehicle having a supply system in which one side is grounded to the car body of a vehicle, a conductive electric line is provided, and to connect equivalently in parallel at a respective control unit an impedance of a power line, the control unit is connected to an electric power line for a load.

According to another feature of the invention a power supply line for the control unit is arranged independently of the power supply line for the load, and an improper shutdown of the power supply for the load is controlled through a shutdown circuit.

Another object can be attained by providing an independent short sensor at plural intervals of an electric power line. When a short circuit or a failure of the connection at the connector occurs, the interval at which the failure has occurred can be determined.

Further, it is preferable to combine the present invention with a system in which a control signal is received and sent between plural control units in accordance with a communication control.

Further, in the present invention, a control module has a relay and/or a fuse between the electric power line and the electric load. The relay and/or the fuse is situated in the vicinity of the control module which controls the electric load. Preferably, a relay box and/or a fuse box is integrated into the control module in a single body, constituting a control unit.

Other objects, advantages and novel features of the present invention will become apparent from the following detailed description of the invention when considered in conjunction with the accompanying drawings.

BRIEF DESCRIPTION OF DRAWINGS

FIG. 27 shows the construction of a short sensor (2);

FIG. 31 is a logical value table (1) for a load power supply shutdown circuit, during a power bus failure;

FIG. 32 is another logical value table (2) for a load power supply shutdown circuit, during a power bus failure;

DESCRIPTION OF THE INVENTION

Figure 1:
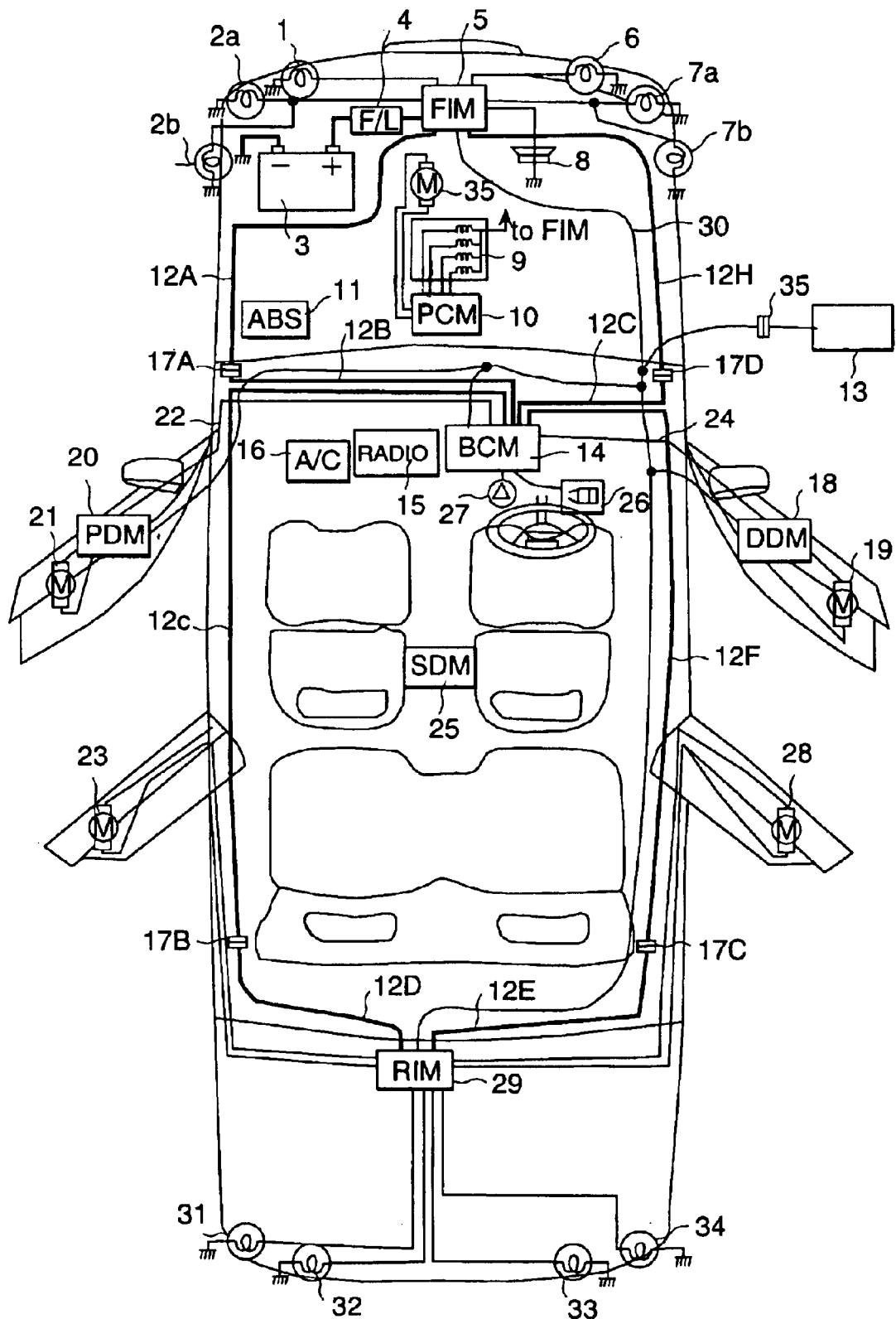
FIG. 1 shows the arrangement of an automobile in which the present invention is implemented.

FIG. 1 shows a whole system view of an automobile in which the present invention is adopted, including an arrangement of components to implement the present invention. A battery 3 supplies power to a whole vehicle through a fusible link 4 which is arranged close to the battery 3. A power train control module (PCM) 10 controls fuel injection amount, engine ignition timing, throttle valve opening degree, and operation of an engine transmission.

The above Stated PCM 10 is installed near the engine (for example, at an outer wall of the intake air conduit, the outer wall of a surge tank or an interior portion of the air cleaner). Various sensors such as an air flow meter, a water temperature sensor and a crank angle sensor are connected to PCM 10, as well as an actuator group comprised of an injector 9, and an ignition means, a throttle motor 35 for opening and closing a throttle valve as the electric loads.

A control module 11 for an anti-lock brake system (ABS) is mounted at a rear portion of the engine compartment which is provided adjacent to ABS use actuator. An air conditioner control unit (A/C) 16 is arranged in the vicinity of the dashboard of a passenger seat, and is positioned near the A/C temperature sensor and the actuator. An airbag control module (SDM) 25 is mounted in the vicinity of a center console box.

A body control module (BCM) 14 connects a display device in the vicinity of the steering wheel near switches for an ignition key 26, a hazard light 27, a flasher, a wiper etc., and is installed in or near the dashboard.

Each of these modules has at least an execution processing unit or a central processing unit (CPU) and a communication circuit (a communication IC) for carrying out data communication with other modules. Each of the modules is installed near the devices (such as the sensor and the electric load, etc.) which are connected to it. In this manner, the length of the harness between the devices which are connected to these modules can be shortened.

A front integration module (FIM) 5 is arranged at the front portion of the engine compartment, adjacent to head lamps 1, 6. turn signal lamps 2a, 2b (left), and 7a, 7b (right), and is connected to drive the above stated head lamps 1, 6, the turn signal lamps 2a, 2b, 7a, 7b and a horn 8 which is mounted closed by.

A driver door module (DDM) 18 and a passenger door module (POM) 20 are mounted on the driver and passenger side doors, respectively, and are connected to door lock motors 19, 21, a power window motor, a door lock switch (SW), a power window switch (SW), and an electric driven mirror motor (all not shown).

A rear integration module (RIM) 29 arranged at a front portion of the trunk is connected to and positioned adjacent to tail lamps 32, 33 and turn signal lamps 31, 34, which it drives, together with a trunk opener motor, a rear defogger, rear seat door lock motors 23, 28, a power window motor, a door lock switch (SW) and a power window switch (SW), etc.

Each of the above stated FIM 5, RIM 29, DDM 18 and PDM 20 has a communication circuit for data transfer with other modules, as well as an input/output interface to which the sensors and the switches etc. and the devices of the outside portion electric loads are connected, and an execution processing unit or a central processing unit (CPU) which executes a control signal to the electric loads. To transfer data between these modules, a multiple communication line 30 (or data bus) is connected between the communication circuits of the respective modules.

As state above, since the respective modules are arranged near the devices to which they are connected, and since input data and output data for devices to which they are not directly connected are received and sent between other modules through the multiple communication line, data necessary for the respective modules can be obtained.

The multiple communication line 30 can be connected to a diagnostic apparatus 13 through a connector 35 to obtain information from the respective modules, necessary for diagnosis.

An electric power line from the battery 3 is connected to FIM 5 through the fusible link 4. The FIM 5 is connected to BCM 14 through an electric power line 12A, a connector 17A and an electric power line 12B. BCM 14 in turn is connected to RIM 29 through an electric power line 12C, a connector 17B and an electric power line 12D. RIM 29 is connected to BCM 14 through an electric power line 12E, a connector 17C and an electric power line 12F; and BCM 14 is connected to FIM 5 through an electric power line 12G, a connector 17D and an electric power line 12H, respectively.

Thus the electric power lines are wired in a loop in the vehicle, to which the respective modules are connected. In this manner, the electric power lines are connected to the respective modules, and the power is supplied to the various actuators as electric loads, through the respective modules.

The respective modules (in this embodiment, constituted by FIM, BCM, RIM) are arranged one each to the engine compartment, the passenger cabin and the trunk.

According to this embodiment, the impedance of the power line for each of the respective control units is connected in parallel (equivalently), so that a power system can be constituted using electric power lines having a small regular current. DDM 18, PDM 20 are arranged in the door, and are constituted to supply power supply from BCM 14.

The loop electric power line 12A–H is attached and detached by connectors 17A, 17B, 17C, 17D. The electric power lines 12A and 12H are arranged separately in the engine room, while the electric power lines 12B, 12C, 12F and 12G are arranged separately in the vehicle passenger compartment; and the electric power lines 12D and 12E are arranged separately in the trunk, respectively.

Accordingly, the electric power lines are wired in a loop configuration. Alternatively, the control modules can also be connected in a star shape and a tree shape. For example, the electric power lines 12E, 12F, 12G, 12H connected by the connectors 17D can be detached from the apparatus and constituted to form a tree connection.

Next, three embodiments with a loop connected electrical power supply system will be explained referring to FIG. 2, FIG. 3 and FIG. 4. Firstly, a construction of an embodiment shown in FIG. 2 will be explained.

The electric power line which is wired in a loop configuration in FIG. 1 is connected to a load power supply shutdown circuit 110 of FIM 5, from the battery 3 through fusible links 4f and 4e. The power supply from the fusible link 4f is connected to the electric power line 12A via the load power supply shutdown circuit 110.

The electric power line 12A is connected via the connector 17A to one end of the electric power line 12B the other end of which is connected to a module connector of the BCM 14, and to a load power supply shutdown circuit 210 therein.

The electric power line 12B in turn is connected electrically to the electric power line 12C, one end of which is connected to a module connector of the BCM via the load power supply shutdown circuit 210.

Another end of the electric power line 12C is connected to one end of the electric power line 12D via connector 17B and is connected to a load power supply shutdown circuit 310 of RIM 29 via a module connector of RIM.

The other end of the electric power line 12D is connected electrically to the electric power line 12E, one end of which is connected to a module connector of the RIM via the load power supply shutdown circuit 310.

The other end of the electric power line 12E is connected to one end of the electric power line 12F via the connector 17C, while the other end of the electric power line 12F is connected to the load power supply shutdown circuit 210 of BCM 14, and to one end of the electric power line 12G via a module connector of the BCM. The other end of the electric power line 12G is connected to one end of the electric power line 12H via the connector 17D, while the other end of the electric power line 12G is connected to the load power supply shutdown circuit 110 of FIM 5 via a module connector.

On the other side, the power supply from the fusible link 4e is connected electrically to the end of the electric power line 12H through a module connector via the load power supply shutdown circuit 110 of FIM 5, and as a result the electric power lines 12A–12H are wired in a loop, through the fuses 4e and 4f. Hereinafter, the loop wired electric power line is referred to as a power bus 12.

Figure 26:
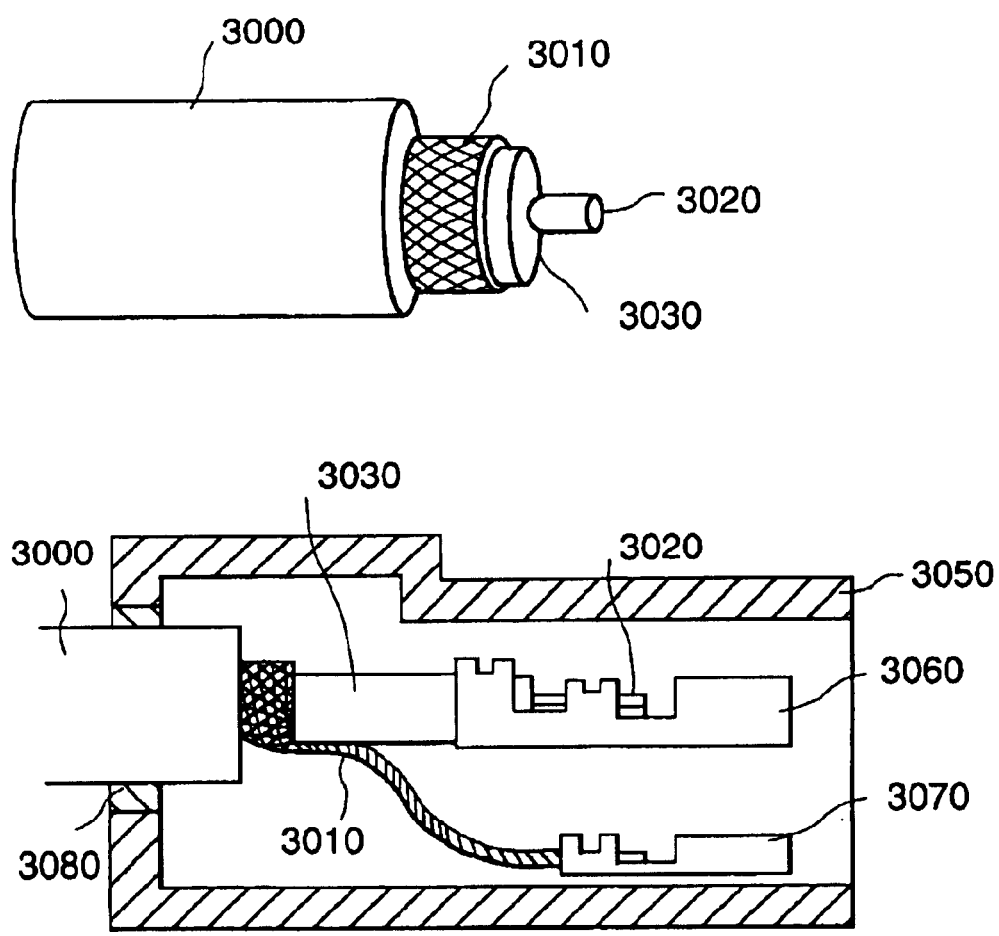
FIG. 26 shows the construction of a short sensor (1)

The structure of the electric power lines 12A, 12B, 12C, 12D, 12E, 12F, 12G and 12H, is shown in FIG. 26, and is constituted by a center 3020, an insulation member 3030 which surrounds the electric power line 3020, a conductive body 3010 which covers the outer periphery of the insulation member 3030 and an insulation material 3000 which covers the outer periphery of the insulation body 3010.

Herein, firstly the center conductor 3020 is made of a single copper wire or a copper twist wire and forms a power supplying conductive line. The insulation member 3030 is of an insulation material such as a rubber and a plastic, and works to insulate the electric power line 3020.

The conductive body 3010 forms a layer at an outer periphery of the insulation member 3030 by knitting together (hereinafter, a "knit wire") thin copper wires. The insulation member 3000 is made of an insulation material such as a rubber and a plastic and functions as a protection layer for the cable. (The function of the conductive body 3010 will be explained in detail later.)

One end of the conductive body 3010 of the electric power line 12A is connected to a short detection circuit 230 of FIM 5 and the other end presents an open state in the vicinity closed by the connector 17A.

Similarly, one end of the conductive body 3010 of the electric power line 12B is connected to the short detection circuit 230 of BCM 14; one end of the conductive body 3010 of the electric power line 12C is connected to a short detection circuit 230 of BCM 14; one end of the conductive body 3010 of the electric power line 12D is connected to a short detection circuit 330 of RIM 29; one end of the conductive body 3010 of the electric power line 12E is connected to the short detection circuit 330 of RIM 29; one end of the conductive body 3010 of the electric power line 12F is connected to the short detection circuit 230 of BCM 14; one end of the conductive body 3010 of the electric power line 12G is connected to the short detection circuit 230 of BCM 14; and one end of the conductive body 3010 of the electric power line 12H is connected to the short detection circuit 130 of FIM 15, respectively.

Other ends of all of the electric power lines 12A, 12B, 12C, 12D, 12E, 12F, 12G and 12H present an open state in the vicinity closed by the respective connectors. Hereinafter, this conductive body 3010 is called as a short sensor.

On the other hand, the center conductor 3020 starts from FIM 5 and is connected to return through the conductive loop via the electric power line 12A, the connector 17A, the electric power line 12B, BCM 14, the electric power line 12C, the connector 17B, the electric power line 12D, RIM 29, the electric power line 12E, the connector 17C, the electric power line 12F, BCM 14, the electric power line 12G, the connector 17D, and the electric power line 12H.

The electric power lines 12A–12H wired in a loop as described above supply power to the respective electric loads 190, 290 and 390 which are connected to the respective modules through the respective power supply shutdown circuits 110, 210 and 310 of the respective modules FIM 5, BCM 14 and RIM 29 and the respective load drive circuits (the driver circuits) 160, 260 and 360 of the respective modules FIM 5, BCM 14 and RIM 29.

Further, power is supplied to other modules DDM 18 and PDM 20, through the power supply circuit 200 from the electric power lines 12B and 12G closed by the power supply among the electric power lines which are connected to the load power supply shutdown circuit 210 of BCM 14.

A backup power supply is provided to A/C 16, SDM 25 and a radio 15 from the power supply circuit 200 of BCM 14 through the electric power line 50f. In addition to the load use electric power lines referred to above, from the battery 3 to the control system power is supplied to FIM 5, BCM 14 and RIM 29.

To the control system power supply circuit 120 of FIM 5, via the fuse 4c, power is supplied to the control system use power supply circuit 320 of RIM 29 via the fuse 4d.

Accordingly, since the power supply to the control systems is carried out by another system, even when one of the modules fails, the other modules can be operated.

The power bus 12 supplies power to the electric loads (referred to collectively as a body electric component system or the equipment system) such as the control of the head lamp, the stop lamp, the warning lamp, the power window, and the door lock.

Through another system, together with the above described body equipment system power supply system, power is supplied to the injectors for controlling the fuel injection amount, to the ignition apparatus for controlling the ignition timing, to an engine control module (ECM) for controlling the throttle valve opening degree, to an automatic transmission (ATM) for controlling the engine transmission, and a power train system power train control module (PCM), from the battery 3 via the fusible link 4a, the ignition switch 26a, the fuse 36b which are arranged in the vicinity of the dashboard, and the electric power line 50b.

Power is supplied to ABS control unit 11 via the fusible link 4a, ignition switch 26a, fuse 36a in the fuse box 36, and the electric power line 50a. Similarly, power is supplied to the air bag control unit SDM 25 via the fusible link 4a, the ignition switch 26a, the fuse 36c in the fuse box 36, and the electric power line 50c.

In addition, power is supplied to the radio 15 via the fusible link 4a, the accessory switch 26b, the fuse 36d in the fuse box 36, and the electric power line 50d, and to the A/C unit 16 from the battery 3 via the fusible link 4a, the accessory switch 26b, and the fuse 36e in the fuse box 36.

Accordingly, because every control system has a separate function, a separate system power supply system is formed. Thus, even when one of the power supply systems fails, no effect is imposed on to the other power supply systems.

The power supply circuit 200 of BCM 14, is connected to the electric power lines 12B and 12G through the electric power lines 210b and 210g. Since the power is supplied to the radio 15, SDM 25, A/C 16 through the accessory switch 26b or the ignition switch 26a, when the accessory switch 26b or the ignition switch 26a are in an "off" state, no power is supplied.

During this time, to back-up the data during the operation, even when the accessory switch 26b or the ignition switch 26a is in an "off" state, it is necessary to supply power.

Accordingly, power for backing-up these data is supplied from the power supply circuit 200 of BCM 14 through the electric power line 50f. Since the data back-up use power supply can be obtained by the power bus 12, it is unnecessary to provide an addition separate back-up use electric power line and a fuse.

Further, these power bus systems 12A–12H become to obstacle and the back-up data is eliminated, when the radio 15 and SDM 25, and A/C unit 16 are supplied with power through the accessory switch 26b and the ignition switch 26a, the operation is constituted to start with the initial value, the fatal trouble is not occurred.

The body electric component system module FIM 5, BCM 14, RIM 29, DDM 18 and PDM 20 have respectively the communication circuits 140, 240, 340, 640 and 540, which are connected by the multiple communication line 30.

Since the respective modules receive and send mutually the input and/or output information which relates to the whole vehicle (for example the condition of the ignition switch is inputted to SCM 14, according to the input signal which is taken into one module), the load which is provided to the other separate module can be drive-controlled.

Power is supplied to DDM 18 and PDM 20, via the power supply circuit 200. For generating responses, the power supply circuit 620 of DDM 18 and the power supply circuit 520 of PDM 20 are connected respectively to the power supplying circuit 200 of BCM 14.

The load group 290 which is connected to BCM 14 receives power through an output circuit (a driver circuit) 260. The output circuit 260 is connected to the power supply lines 12c and 12f through the electric power lines 120c and 120f, and receives the control signal from a control signal output signal line group 270b of the control circuit 270. It drives and controls the load.

The control circuit 270 outputs the load control signal to the output circuit 260 in accordance with input signals which are inputted from the input circuit 250 and the input interface of the communication circuit 240, the ignition switch signal, the accessory switch signal and the receipt signal.

BCM module 14 has a short detection circuit 230 and monitors the electric power lines 12B, 12C, 12F and 12G for short abnormalities. With the short detection circuit 230, for example, when a short of the electric power line 12F is detected, a signal is inputted into the control circuit 270. The load power supply shutdown circuit 210 is driven through an output signal line 270a, and the portion of the power supply section 12F in which the short occurs is contacted and separated.

At this time, the control circuit 270 sends a signal which specifies the electric power line section having the short, to other modules through the communication circuit 240. A predetermined module RIM 29 which has received this signal controls a self load circuit 310 to separate the electric power line 12E which relates to the short abnormality through the self control circuit 370.

Accordingly, the electric power line section 12F having the short and the electric power line 12E which is connected to the section 12F through the connector 17C are separated from the loop configured electric power line. Thereafter, power is supplied to the respective loads according to a tree connection comprised of the main line having the electric power lines 12A, 12B, 12C and 12D and the sub-lines 23, 24 and 50f which are wired from the power supply circuit 200 of BCM module 14.

FIM module 5 has a short detection circuit 130 and monitors the electric power lines 12A an 12H, to detect short circuits. By means of the short detection circuit 130, for example, when a short circuit is detected in the electric power line 12A, a signal is inputted into the control circuit 170, and the load power supply shutdown circuit 110 is driven through an output signal line 170a. In this manner, an end portion of the shortened electric power line section 12A is contacted and separated.

At this time, the control circuit 170 sends a signal which specifies the electric power line section having the short abnormality to other modules through the communication circuit 140. The control circuit of the BCM module 14, which has received the latter signal, drives the load power supply shutdown circuit 210 through the output signal line 270a. Accordingly, another end portion of the electric power line 12B which is connected through the electric power line 12A and the connector 17A is released.

Under the above stated condition, power is supplied to the respective loads according to a tree connection comprised of the main line having the battery 3, the fuse 4e, the load power supply shutdown circuit 110 of FIM module 5, the electric power lines 12H and 12G, the load shutdown circuit 310 having BCM module 14, and the sub-lines 23, 24 and 50f which are wired from the power supply circuit 200 of BCM module 14.

Figure 2:
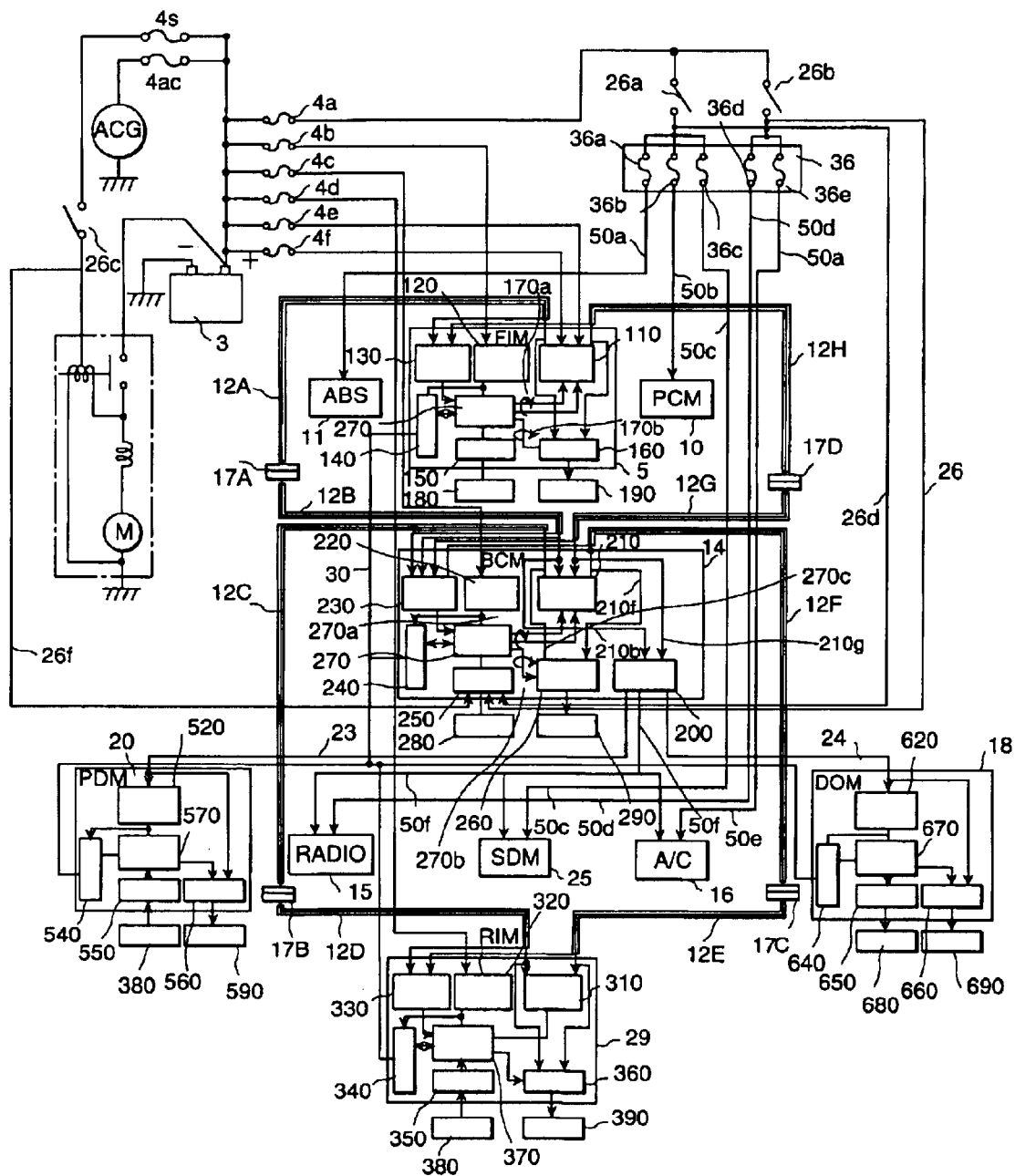
FIG. 2 shows a first embodiment of a whole system of an automobile in which the present invention is implemented.
Figure 3:
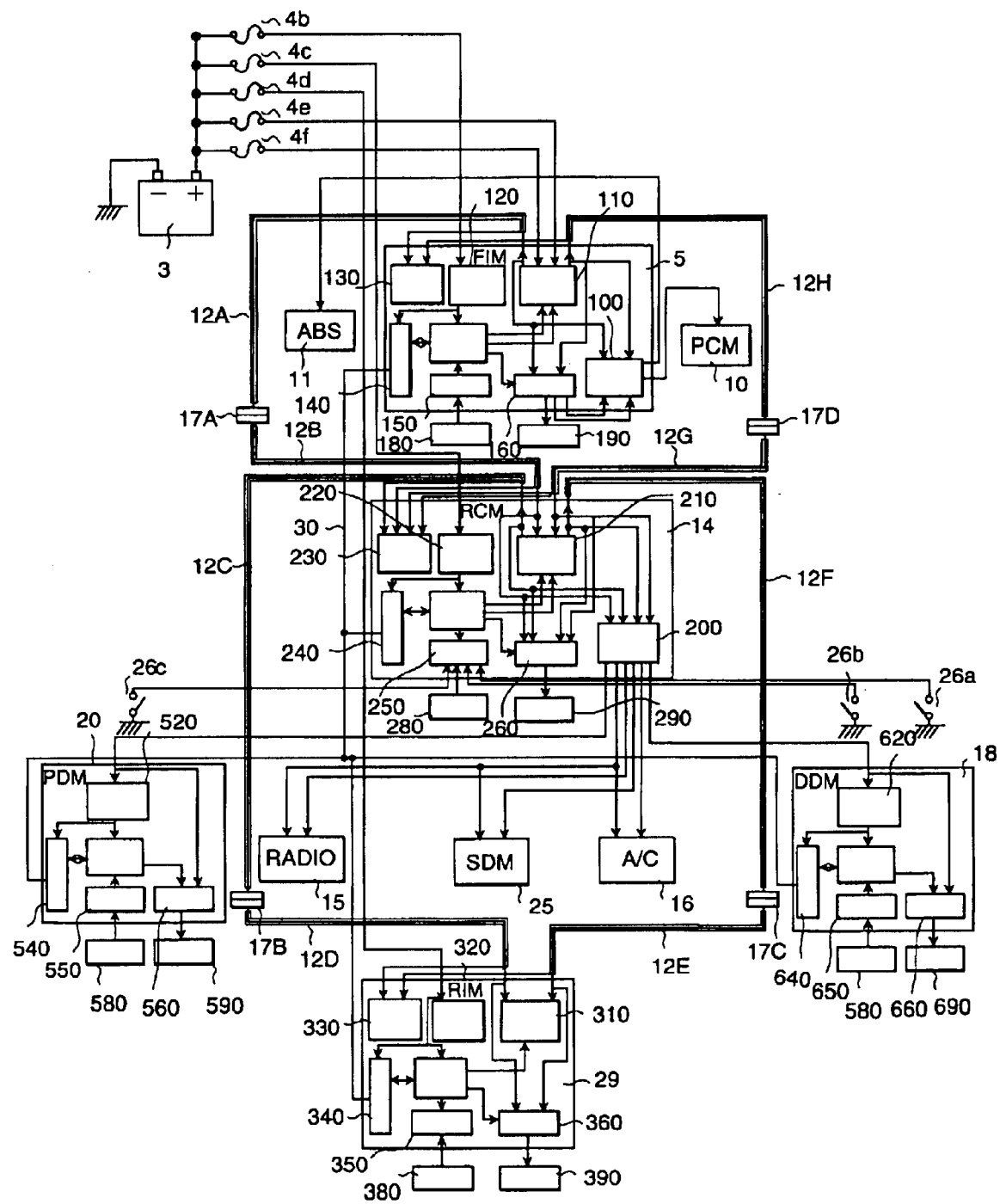
FIG. 3 shows a second embodiment of a whole system of an automobile in which the present invention is implemented.

FIG. 3 shows the construction of another embodiment. The portions which differ from the construction shown in FIG. 2 will be explained.

FIG. 2 shows a power supply system which has separate functions, except for the body electric component system. However, in the embodiment shown in FIG. 3, power is supplied to the power train control module (PCM) 10 and ABS control unit 11 from the power supply circuit 100 of FIM 5 which is arranged in the same engine space, while power is supplied to the radio 15, the SDM 25, and A/C unit 16, from the power supply circuit 200 of BCM 14, which is arranged in the same cabin.

As stated above, it is possible to dispense with the fuses 36a, 36b, 36c, 36d and 36e shown in FIG. 2, which are connected in parallel to the respective power supply lines. The electric power line between the battery 3 and the respective modules passes through from the battery 3 which is arranged in the engine compartment to the ignition key which is arranged in the passenger cabin, and the fuse box. However, the electric power line is closed by FIM 5 and BCM 14. In this manner, the electric power line can be shortened and a number of the electric power lines can be deleted.

Figure 4:
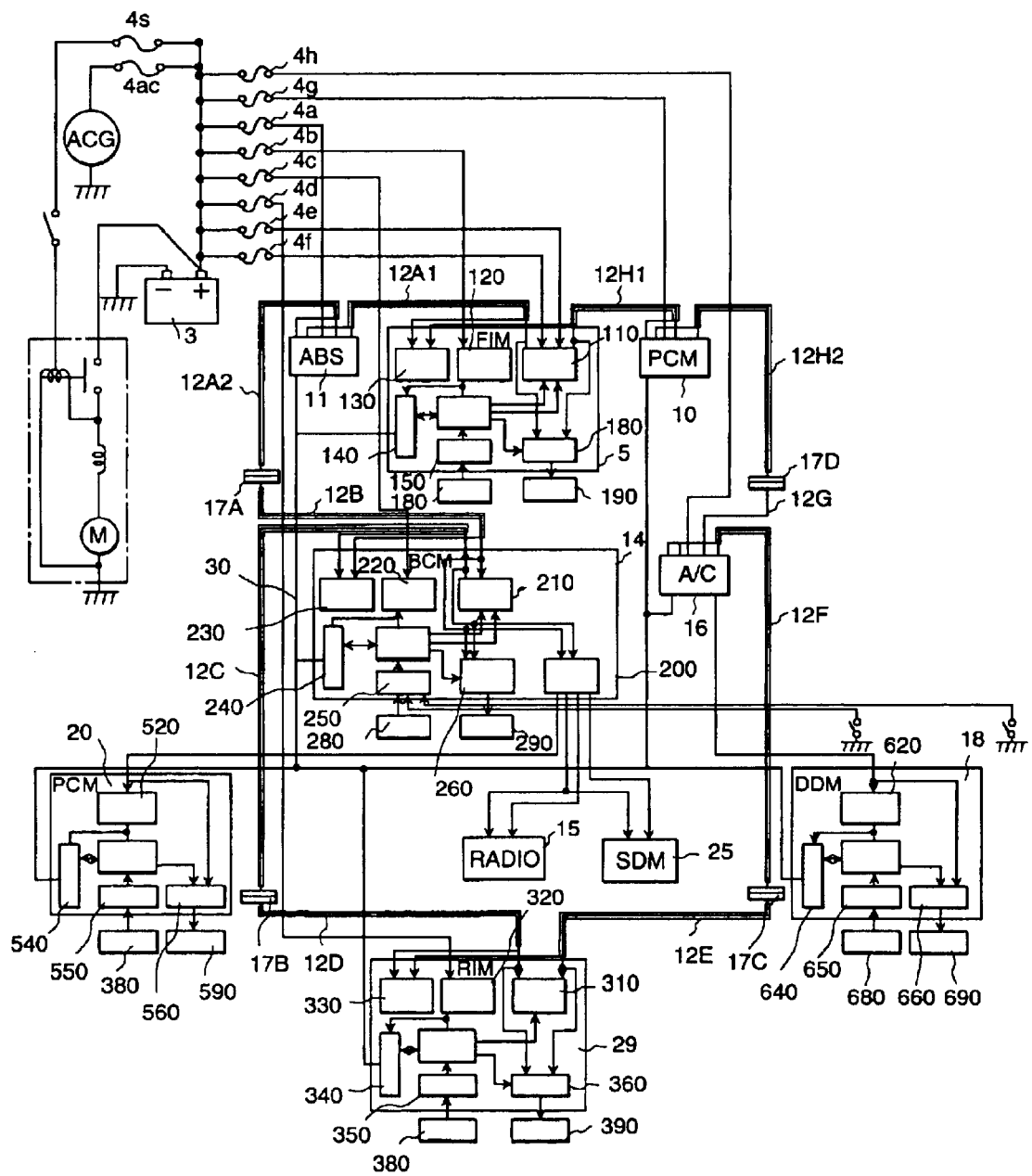
FIG. 4 shows a third embodiment of a whole system of an automobile in which the present invention is implemented.

FIG. 4 shows the construction of a further embodiment. Those portions which differ from the construction shown in FIG. 2 will be explained.

In FIG. 2, the modules which are connected to the power bus 12 are three: the FIM 5, the BCM 14 and the RIM 9. In FIG. 4, the power train control module (PCM) 10 (which is functions separately from the body electric component system), ABS control unit 11, and A/C unit 16 are connected to the power bus 12.

Accordingly, the power bus is comprised of FIM 5, an electric power line 12A1, ABS 11, an electric power line 12A2, a connector 17A, the electric power line 12B, BCM 14, the electric power line 12C, a connector 17B, the electric power line 12D, RIM 29, the electric power line 12E, a connector 17C, the electric power line 12F, A/C unit 16, the electric power line 12G, a connector 17D, an electric power line 12H2, PCM 10, an electric power line 12H1, and FIM 5.

Further, A/C unit 16, and the control system power supply, which are connected to the power train control module (PCM) 10, ABS control unit 11, are supplied through the fuse 4g, the fuse 4a, the fuse 4h and further the multiple communication line 30 is connected. The power supply to DDM is altered from BCM 14 to A/C unit 16.

In the same manner as stated above, the fuses 36a, 36b, 36c, 36d and 36e shown in FIG. 2, which are connected in parallel to the respective power supply line, can be dispensed with. The electric power line between the battery 3 and the respective modules passes from the battery 3 (arranged in the engine compartment) to the ignition key, which is arranged in the cabin, and the fuse box. However, the electric power line is closed by FIM 5 and BCM 14. In this manner, the electric power line can be shortened and a number of the electric power lines can be deleted. Furthermore, in comparison with the structure shown in FIG. 3, the power supply circuit to FIM 5 and BCM 14 can be simplified.

FIG. 5, FIG. 6, FIG. 7, FIG. 8, and FIG. 9 are the constructions of the embodiment shown in FIG. 2.

For convenience of explanation in depicting a semiconductor switching element in the drawing of the present specification hereinafter, generally a symbol indicating a transistor represents a semiconductor switching element having no short protection function, while a symbol indicating a MOSFET represents a semiconductor switching element having a short protection function.

The construction of FIM 5 will be explained referring to FIG. 5. The load power supply shutdown circuit 110 shown in FIG. 2 is constituted by a first load power supply shutdown circuit 110a and a second load power supply shutdown circuit 110b. The first load power supply shutdown circuit 110a, in turn is constituted by a relay 111, a diode 113, and a semiconductor switching element 115. The second load power supply shutdown circuit 110b on the other hand is similar to the first load power supply shutdown circuit 110a and is constituted by a relay 112, a diode 114, and a semiconductor switching element 116.

In these relays 111, 112, when the current flows into the coil the contacts are in an "on" state and when the current is interrupted the contact present an "off" state.

Since the operation and the detailed construction of the first and the second load power supply shutdown circuits 110a and 110b are same, they will be explained by the first load power supply shutdown circuit 110a. The semiconductor switching element 15 is driven to the "on" state and the "off" state, according to the control signal from the control circuit 170, so that the contact points of the relay 111 are driven to the "on" state and the "off" state.

In absence of the diode 113, when the battery 3 is connected reversely, a reverse current flows to the coil of the relay 111, and the contact points of the relay 111 are in the "on" state without reference to the control signal, so that a current flows to the load in a reverse direction in a normal time of the load, and incorrect operation occurs. The diode 113, prevents such a flow of reverse current to the coil of the relay 111, and the contact points of the relay 111 are maintained in the "off" state. Thus, a failure in which operation of the load is continued can be prevented.

The power supply to the coil of the relay 111 is connected to the control system power supply explained in FIG. 2. One side of the relay 111 is connected to the battery 3 through the fusible link 4f, while the other end is connected to the loop system power supply line 12A, and to the output circuit 160 for supplying power to the load.

As stated above, power is supplied to the coil of the relay 111 from the control system power supply, as well as the power supply to the control 170 for outputting the control signal of the coil. Even if the power bus 12 fails, control of the relay 111 is carried out, and accordingly the shutdown and connection of the first load power supply shutdown circuit 110a can be carried out.

Further, it is unnecessary to operate the load, and when the current is to be reduced etc., the current in the relay 111 is shutdown. Thus, the power supply to the load can be shut down, and current consumption can be lessened.

On the other hand, when the control system power supply fails, the current of the relay 111 is interrupted and the load power supply circuit 110a is shut down. Since the latter supplies power to the load, even if the control circuit malfunctions, all of the loads are placed in a stop condition, and erroneous operation is prevented.

The output circuit 160 is constituted by semiconductor switching elements 163–168 which carry out drive control by supplying power to the over-current detection circuits 161 and 162 and the loads. In this embodiment, the semiconductor switching elements 163–168 comprise power MOSFET's which have an over-temperature detection shutdown function. (When and over-current flows and the temperature of the element exceeds a predetermined value, it enters an "off" state.) Accordingly, even when the load is short circuited, current does not continue to flow. Further, when the harness overheats, the fuse blows, so that the battery is not over-discharged.

Although only six semiconductor switching elements are shown in the figure, naturally the number of the elements can be increased or decreased according to the loads which are connected to FIM 5.

Figure 5:
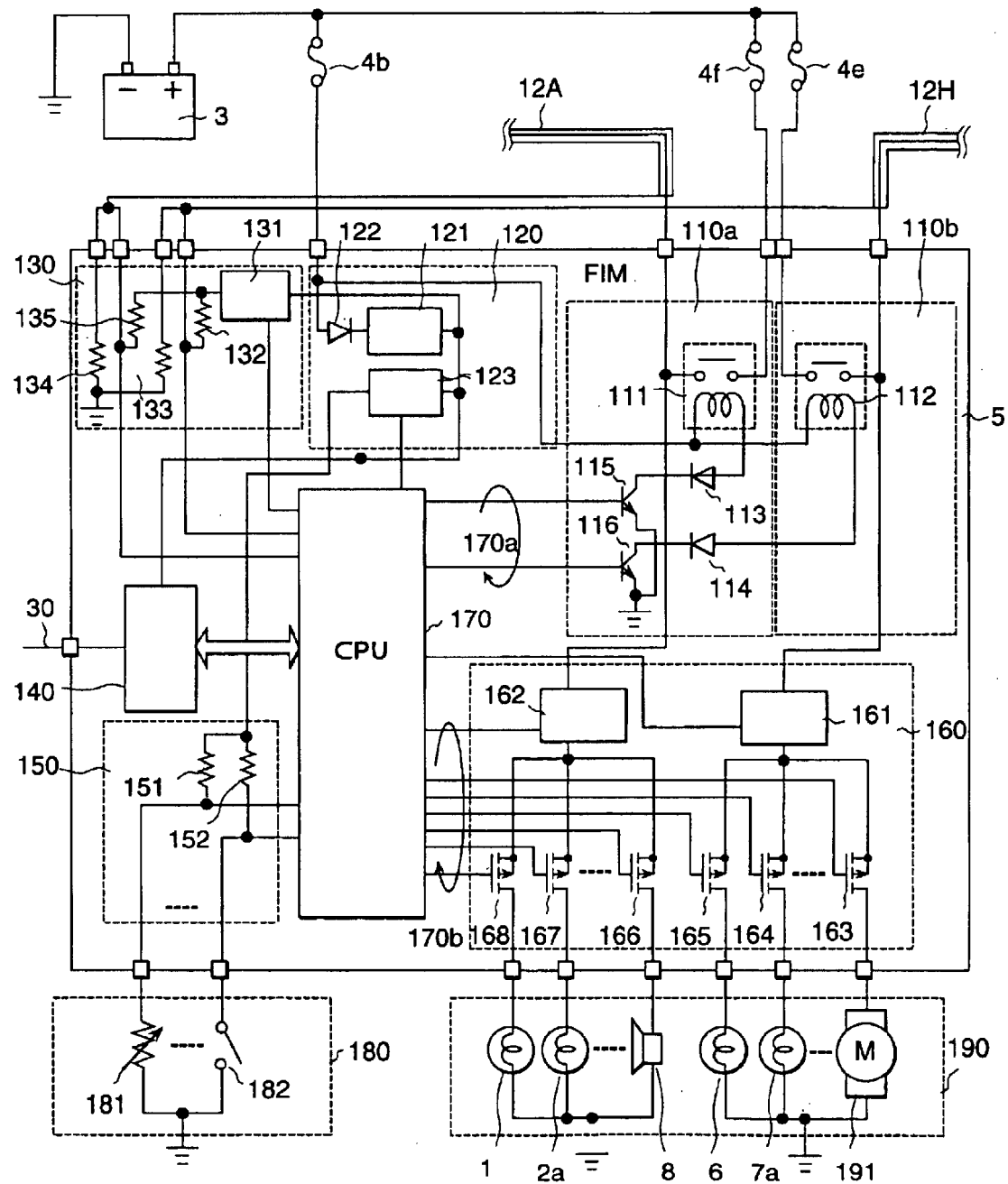
FIG. 5 shows the construction of the PIM module of the system in FIG. 2.

As shown in FIG. 5, of the load 190 which is connected to FIM 5, a washer motor 191, a right turn lamp 7a, and a right head lamp 6 which are arranged at the right side of a vehicle are connected respectively to the semiconductor switching elements 163, 164 and 165. A horn 8, a left turn lamp 2a, and a left head lamp 1 which are arranged at the left side of a vehicle are connected respectively to the semiconductor switching elements 166–168. The other ends of the semiconductor switching elements 163–165 are connected to the over-current detection circuit 161, to which power is supplied by the second load power supply shutdown circuit 110b, situated upstream thereof.

Similarly, the other ends of the semiconductor switching elements 166–168 are connected to an over-current detection circuit 162, to which power is supplied by the first load power supply shutdown circuit 110a, situated upstream thereof.

As stated above, separate systems are formed on the right and left sides of the vehicle, and even if any one of the separate systems fails, another separate system can be operated. Herein, the reason why the separate system is formed at the right side and at the left side is that many loads connected to FIM 5 are constituted by pairs at the right and left sides (for example, the head lamp, the fog lamp, the clearance lamp etc.). For example, when power is supplied to the right and left head lamps via the same power supply system, if the over-current detection circuit of that power supply system detects a failure, the power supply is cutoff to both the head lamps at the right side and the left side. This is very dangerous during a night running.

However, as shown in this embodiment, since two separate systems are constituted, one at the right side and one at the left side, one of the head lamps is remains on, and the worst circumstance can be avoided.

The control system power supply circuit 120 is constituted by a diode 122, a constant voltage power supply circuit 121, and a power supply shutdown circuit. Power from the battery 3 supplies the constant voltage power supply circuit 121 via the fuse 4b and the diode 122.

The constant voltage power supply circuit 121 generates a constant voltage which operates the control circuit 170 for executing the various kinds of control processing. This voltage is supplied to a voltage application drive circuit 131 of the short detection circuit 130, as well as to the control 170, the communication circuit 140, and the power supply shutdown circuit 123.

In the power supply shutdown circuit 123, the constant voltage power supply from the constant voltage power supply circuit 121 is supplied to the input circuit 150, or is cut off according to a control signal of the control circuit 170. The input circuit 150, in turn, converts the signals of the atmospheric temperature sensor 181 and the brake liquid volume sensor 182 etc. to a voltage level which can be taken into the control circuit 170, by means of pull-up resistors 151 and 152. However, when no one rides in the vehicle and it is left alone, according to the information from the brake liquid amount sensor 182 and the atmospheric temperature sensor 181, (regardless of the necessity for alarming the alarm etc.), via the pull-up resistors 151 and 152, when a current flows in the brake liquid volume sensor 182 and the atmospheric temperature sensor 181, the battery 3 is discharged and depleted.

Accordingly, when it is unnecessary to warn the driver, the power supply to the pull-up resistors is shut down via the power supply shutdown circuit 123.

The short detection circuit 130 is constituted by a voltage application drive circuit 131, pull-up resistors 132 and 135, and pull-down resistors 133, 134 to the ground. The voltage application drive circuit 131 connects and disconnects the power supply to the pull-up resistors 132 and 135 according to the control signal of the control circuit 170. The pull-up resistor 132 and the other end of the pull-down resistor 133 are connected to an external connector for use outside of FIM 5, and further are connected to a short sensor of the electric power line 12H.

Further, within FIM 5, the control signal is inputted to the control circuit 170. Similarly, the pull-up resistor 135 and the other end of the pulldown resistor 134 are connected to an external connector for use outside of FIM 5, and further are connected to a short sensor of the electric power line 12A.

Further, in an interior portion of FIM 5, the control signal is inputted to the control circuit 170.

The reason why the pull-up resistor 135 and the other end of the pull-down resistor 134 are connected to the outside of the FIM 5 through an external connector is as follows: When the other end of the short sensor becomes open circuited, commonly the current does not flow into the short sensor. In this case, since the current does not flow into the external connector, the connection portion is oxidized and there is a possibility of a contact failure.

Accordingly, with the construction in this embodiment, since the current flows to the connector through a route comprised of the pull-up resistor 135, the two connection connectors, and the pull-down resistor 134, oxidation can be prevented. The operation will be explained in detail later.

Figure 6:
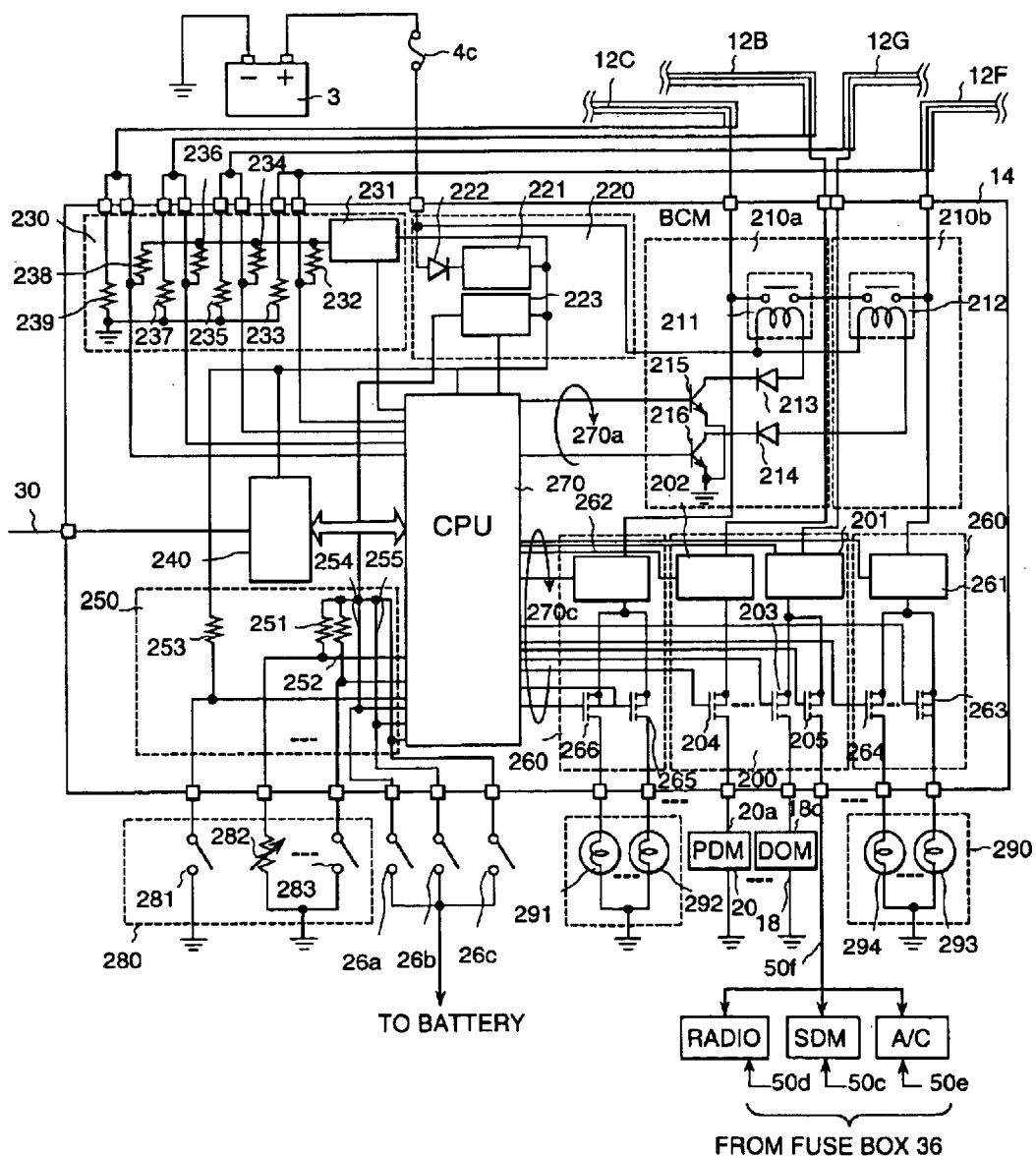
FIG. 6 shows the construction of the BCM module of the system in FIG. 2.

FIG. 6 shows the construction of BCM 14. The first and second load power supply shutdown circuits 210a and 210b have the same constructions as the first and second load power supply shutdown circuits 110a and 110b, shown in FIG. 5.

Power is supplied to the coil of a relay 211 from the control system power supply. One contact of the relay 211 is connected to the loop system electric power line 12B and the other end is connected to the loop system electric power line 12C. At the same time, both ends are connected to the power supply circuit 200 or the output circuit 260.

Although the output circuit 260 and the power supply circuit 200 have the different names, their function and construction are the same, and will be explained simultaneously. They are constituted respectively by the over-current detection circuits 261, 262, 201 and 202 and the semiconductor switching elements 263–266, 203 and 204 for supplying power to the loads.

In this embodiment, the semiconductor switching elements 263–266, 203 and 204 are power MOSFET's which have an over-temperature detection shutdown function. (When an over-current flows and the temperature of the element a predetermined value, it exceeds an "off" state.) Accordingly, even when the load is short circuited, current does not continue to flow. Further, if the harness overheats, the fuse blows, so that the battery does not overdischarge.

Although only six semiconductor switching elements are shown in the figure, naturally the number of the elements can be increased or decreased according to the loads which are connected to FIM 5.

The semiconductor switching elements 263 and 264 are connected to the room lamps 293 and 294 of the load respectively, which are connected to BCM 14. The other ends of the semiconductor switching elements 265 and 266 are connected to warning lamps 291 and 292 of the load 290, which are arranged an instrument panel and are connected to BCM 14.

DDM 18, which is arranged on the driver seat door, is connected to the semiconductor switching element 203, and PDM 20, which is arranged on the passenger seat door, is connected to the semiconductor switching element 204.

The other ends of the semiconductor switching elements 263 and 264 are connected to the over-current detection circuit 261, to which power is supplied by the second load power supply shutdown circuit 110b situated upstream thereof from the electric power line 12F.

Similarly, the other ends of the semiconductor switching elements 265 and 266 are connected to an over-current detection circuit 262, to which power is supplied by the first load power supply shutdown circuit 110a, situated upstream thereof, from the electric power line 12C.

The other end of the semiconductor switching element 203 is connected to the over-current detection circuit 261, to which power is supplied by the first load power supply shutdown circuit 110a, situated upstream thereof, from the electric power line 12G.

The other end of the semiconductor switching element 204, on the other hand, is connected to the over-current detection circuit 202, to which power is supplied by the first load power supply shutdown circuit 210a, upstream thereof, from the electric power line 12B.

From the above, it is apparent that separate systems are formed on the right and left sides of the vehicle. Thus, even if one of the separate systems fails, the other separate system can be operated.

The control system power supply circuit 220 has the same construction and operation as the control system power supply circuit 120 of FIM 5 shown in FIG. 5. The input circuit 250 converts the signals from the intermittent wiper rate 282, the wiper Switch 283, the light switch 281, and the ignition key switch (not shown in FIG. 6) etc. to a voltage level which can be taken into the control circuit 270, by means of pull-up resistors 251, 252 and 253. Since the load to be controlled by the input signals of the intermittent wiper rate 282 and the wiper switch 283 operates necessarily only when the ignition switch is "on", with no one in the vehicle, and the vehicle left alone, it is unnecessary to take in this information. Therefore, the power supply to the pull-up resistors 251 and 252 is shut down by the power supply shutdown circuit 123.

On the other hand, when the vehicle is unoccupied and is left alone, if the light switch 281 and the ignition switch etc. are suddenly turned "on", because it is necessary to drive the load even when no one is in the vehicle, it is necessary always to detect the input condition. Accordingly, the power supply to the pull-up resistor 253 is continuously connected to the output of the constant voltage power supply circuit 221, so that power is always supplied.

The short detection circuit 230 is connected to four short sensors of the electric power line 12B, the electric power line 12C, the electric power line 12F, and the electric power line 12G.

Figure 7:
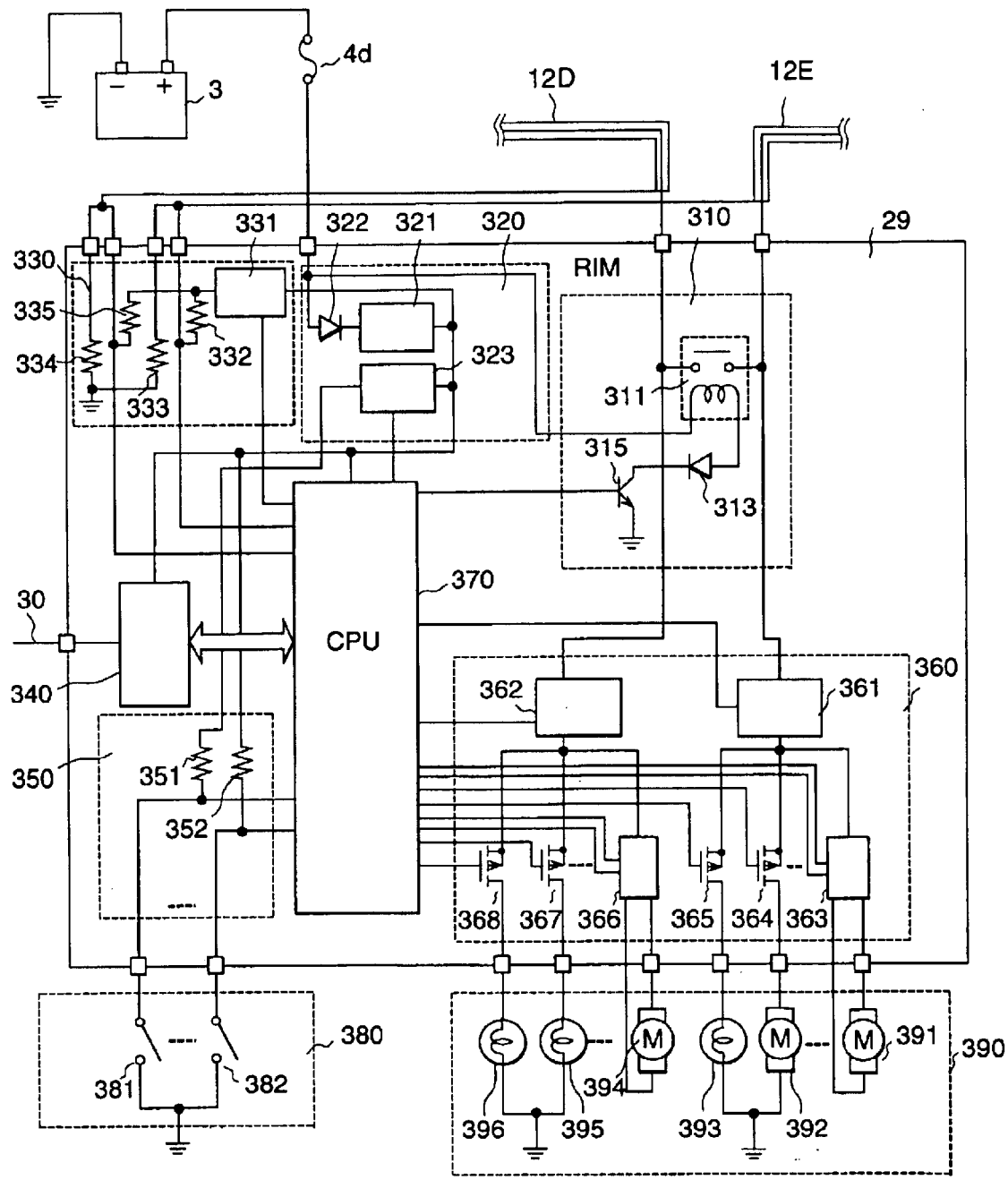
FIG. 7 shows the construction of the RIM module of the system in FIG. 2, FIG. 3 and FIG. 4.

FIG. 7 shows the construction of RIM 29. The construction of the load power supply shutdown circuit 310 is the same as that of the load power supply shutdown circuit 110a of FIM 5 shown in FIG. 5; and the power supply of the relay 311 to a relay coil is connected to the control system power supply, as explained in FIG. 2.

One contact of the relay 311 is connected to the loop system electric power line 12D and the other end is connected to the loop system electric power line 12E. At the same time, both ends are connected to the output circuit 360 for supplying power to the loads.

The output circuit 360 is constituted by semiconductor switching elements 364–368 which supply power to the over-current detection circuits 361 and 362 and the loads.

In this embodiment, the semiconductor switching elements 364, 365, 367 and 368 are power MOSFET's which have an over-temperature detection shutdown function. (When an over-current flows and the temperature of the element exceeds a predetermined value, it turns "off"). Accordingly, even if the load is shorted, current does not continue to flow. Further, if the harness overheats the fuse blows, so that the battery does not over-discharge.

Although six semiconductor switching elements are shown in the figure, naturally the number of the elements can be increased or decreased according to the loads which are connected to RIM 29.

The semiconductor switching elements 363, 364 and 365 are connected respectively to a power window motor 391 of a rear seat right side door, a fuel pump 392 (which is arranged at a right side of the trunk), a stop lamp right 393 etc., which are connected to RIM 29. The semiconductor switching elements 366, 367 and 368, on the other hand are connected respectively to a power window motor 394 of a rear seat left side door, a fuel pump 395 (arranged at a left side of the trunk), and a stop lamp left 396 etc., which are connected to the RIM 29.

The other ends of the semiconductor switching elements 363, 364 and 365 are connected to the over-current detection circuit 361, to which the power is supplied by the load power supply shutdown circuit 310, situated upstream, from the electric power line 12D.

Similarly, the other ends of the semiconductor switching elements 166, 167 and 168 are connected to an overcurrent detection circuit 162, to which power is supplied by the load power supply shutdown circuit 310, from the electric power line 12D.

From the above, it is apparent that separate systems are formed on the right and left sides of the vehicle. Thus, even if one of the separate systems fails, the other separate system can be operated.

The reason why separate systems are formed at the right and left sides is that, many of the loads connected to RIM 29 are constituted by pairs at the right and left sides, for example, the stop lamp, the table lamp etc. When power is supplied, for example, to the stop lamp left 396 and the stop lamp right 393 via the same power supply system, and the over-current detection circuit of power supply system detects a failure, the power supply is cut off. Since both stop lamps are disconnected, braking is very dangerous.

However, as shown in this embodiment, since two separate systems are constituted at the right and left sides, one of the head lamps remains lit and the worst circumstance can be avoided. The semiconductor switching elements 363 and 366 form an H bridge circuit which drives the motor in both normal and reverse directions; such a construction will be explained later.

The control system power supply circuit 320 has the same construction and operation as the control system power supply circuit 120 of FIM 5 shown in FIG. 5. The input circuit 350 converts the voltage level at which the control circuit 370 takes in the signals from the door opening and closing switch 382 of the input signal 380 and the rear seat power window switch 383 etc. by means of pull-up resistors 351 and 352. When the vehicle is unoccupied and is left alone, it is unnecessary to take in this information. Therefore, the power supply to the pull-up resistors 351 and 352 is shutdown by the power supply shutdown circuit 323.

The short circuit 330 is connected to two short sensors of the electric power line 12D and the electric power line 12E.

Figure 8:
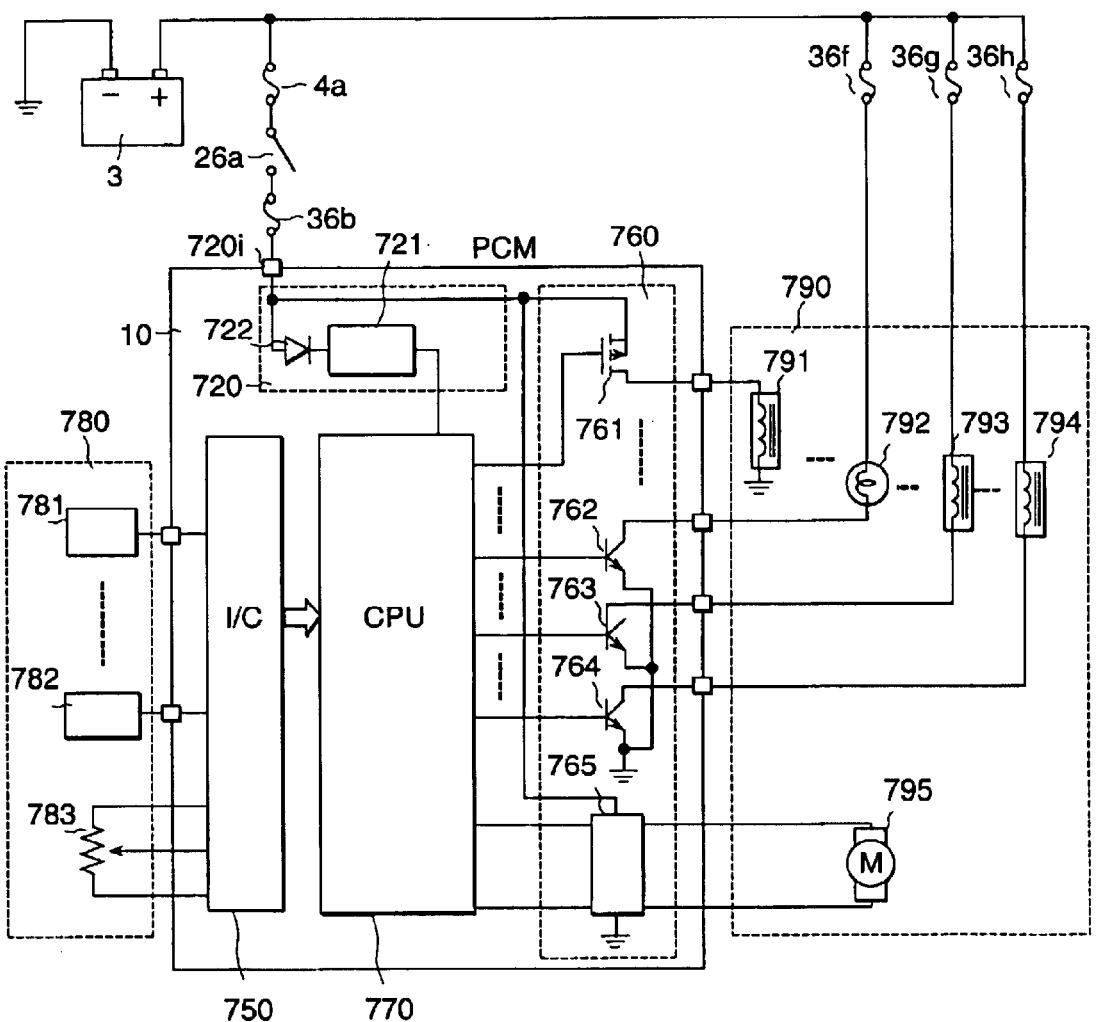
FIG. 8 shows the construction of the PCM module of the system in FIG. 2.

FIG. 8 shows the construction of PCM 10 in which the power supply is supplied by another system against the loop power supply system. PCM 10 in FIG. 2 is constituted by a power supply circuit 720, a control circuit 770, an input circuit 750, and an output circuit 760.

The power supply circuit 720 is constituted by a diode 722, and a constant voltage power supply circuit 721. Power from the battery 3 is supplied via the fuse 4a, the ignition switch 26a, and the fuse 36b to the constant voltage power supply circuit 721 (the diode 722), and to the semiconductor switching elements 761 and 765 of the output circuit 760.

The constant voltage power supply circuit 721 generates the constant voltage which operates the control circuit for performing the various functions, control processing etc. The input circuit 750 converts signals from the crank angle sensor 781, the air flow sensor 782, and the throttle sensor 783, etc. to a voltage which can be input to the control circuit 770.

The output circuit 760 is constituted by semiconductor switching elements 761 and 765 which perform drive control by supplying power to the loads, and semiconductor switching elements 762, 763 and 765 which perform the "on" and "off" switching operations of the loads.

In this embodiment, the semiconductor switching element 765 is a power MOSFET which has an overtemperature detection shutdown function. Thus, when the over-current flows and the temperature of the element exceeds a predetermined value, it turns "off".

Accordingly, even if the load is shorted, current does not continue to flow. Further, if the harness overheats and the fuse blows, that the battery does not over-discharge.

On the other hand, the semiconductor switching elements 762, 763 and 765 are simple semiconductor switching elements. If the load is short circuited and current flows, the fuse which is arranged upstream of the load is blown, and an over current does not continue to flow.

In this embodiment, a semiconductor switching element having no protection function is used; naturally there is no problem in which the semiconductor switching element having a protection function is used.

Although five semiconductor switching elements are shown in figure, naturally a number of the semiconductor switching element can be increased or decreased by the loads which are connected to PCM 10.

The semiconductor switching elements 762, 763 and 764 are connected respectively to a warning lamp 792, an injector 793, and the EGR solenoid 794 which are included in the load 790 connected to PCM 10. Upstream of these elements fuses 36f, 36g and 36h are connected. The semiconductor switching element 761 is connected to the AT solenoid 791 of the load 790, which is connected to PCM 10 etc.

The semiconductor switching element 765 constitutes H bridge circuit which drives the motor in both forward and reverse directions; its construction will be explained later.

Similarly to PCM 10, the ABS 11 is included in the separate system with the loop shape power supply system shown in FIG. 2. The construction of the ABS 11, A/C 16, SDM 25 and the radio 15 are substantially the same as PCM 10 shown in FIG. 8. Naturally, the input signals and the loads which are connected to the modules differ.

Figure 9:
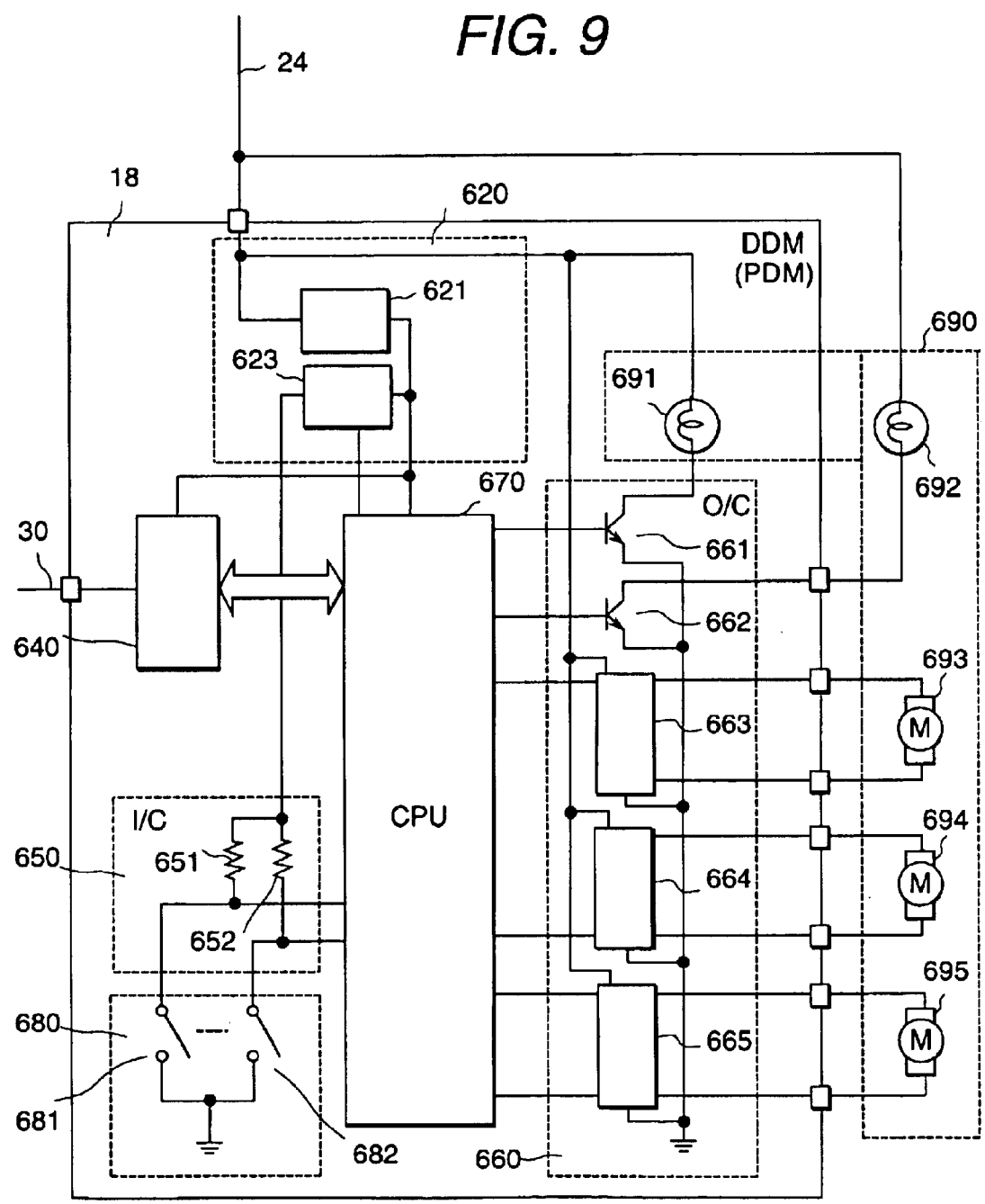
FIG. 9 shows the construction of the DDM module of the system in FIG. 2, FIG. 3 and FIG. 4.

FIG. 9 shows the construction view of DDM 18 to which power is supplied from the power supply circuit 200 of BCM 14.

DDM 18 is constituted by a power supply circuit 620, a communication circuit 670, a part of an output circuit 660 and a part of the loads 690.

The power supply circuit 620 is constituted by a constant voltage power supply circuit 621 and a power supply shutdown circuit 623. Power is supplied from the constant voltage power supply circuit 621 and the power supply shutdown circuit 623.

Power from the power supply circuit 200 of BCM 14 is supplied to the constant voltage supply circuit 621 on the one hand, and to the switching elements 663, 664, and 665 and the load 691 as the load drive power supply on the other hand.

The constant voltage power supply circuit 621 provides a constant voltage for performing the various kinds of executions, and for control processing. The input circuit 650 converts the signals from the power window switch 681 and the door lock switch 682 to a voltage which can be processed in the CPU 670.

When the vehicle is left unoccupied, it is not unnecessary to take in the information from these switches. Therefore, the power supply to the pull-up resistors 651 and 652 is shut down by the power supply shutdown circuit 621.

The output circuit 660 is constituted by semiconductor switching elements 663, 664 and 665, which supply power to the loads, and by semiconductor switching elements 661 and 662 which switch the loads "on" and "off".

In this embodiment, the semiconductor switching elements 661 and 662 are simple semiconductor switching elements.

Even when the load is shorted, and an over-current flows, since the power supply circuit 200 of BCM 14 has a protection function, the current flow is discontinued. Therefore, in this embodiment, although the semiconductor switching elements have no protection function there is no problem.

The switching elements 663, 664 and 665, which drive the power window motor 693, the door lock motor 694, the mirror motor 695, use a relay; however, a semiconductor switching element can also be used.

The semiconductor switching element 661 is connected to a switch mirror lamp 691 in DDM 18; and the semiconductor switching element 662 is connected to a step motor which is installed in the door. The power supply circuit 200 of BCM 14 is connected upstream of these loads.

Since the construction of PDM 20 is substantially the same as that of DDM 18 shown in FIG. 9, a detailed explanation will be omitted.

Since power for DDM 18, PDM 20 and the loads which are installed on the door is supplied from the power supply circuit having a protection function of BCM 14, it is unnecessary to use coaxial cable (such as FIG. 26) for this purpose; rather, an ordinary wire can be used, and the diameter of the wire can be thin. Further, the semiconductor switching element used in the output circuit, does not need to have a protection function.

Figure 10:
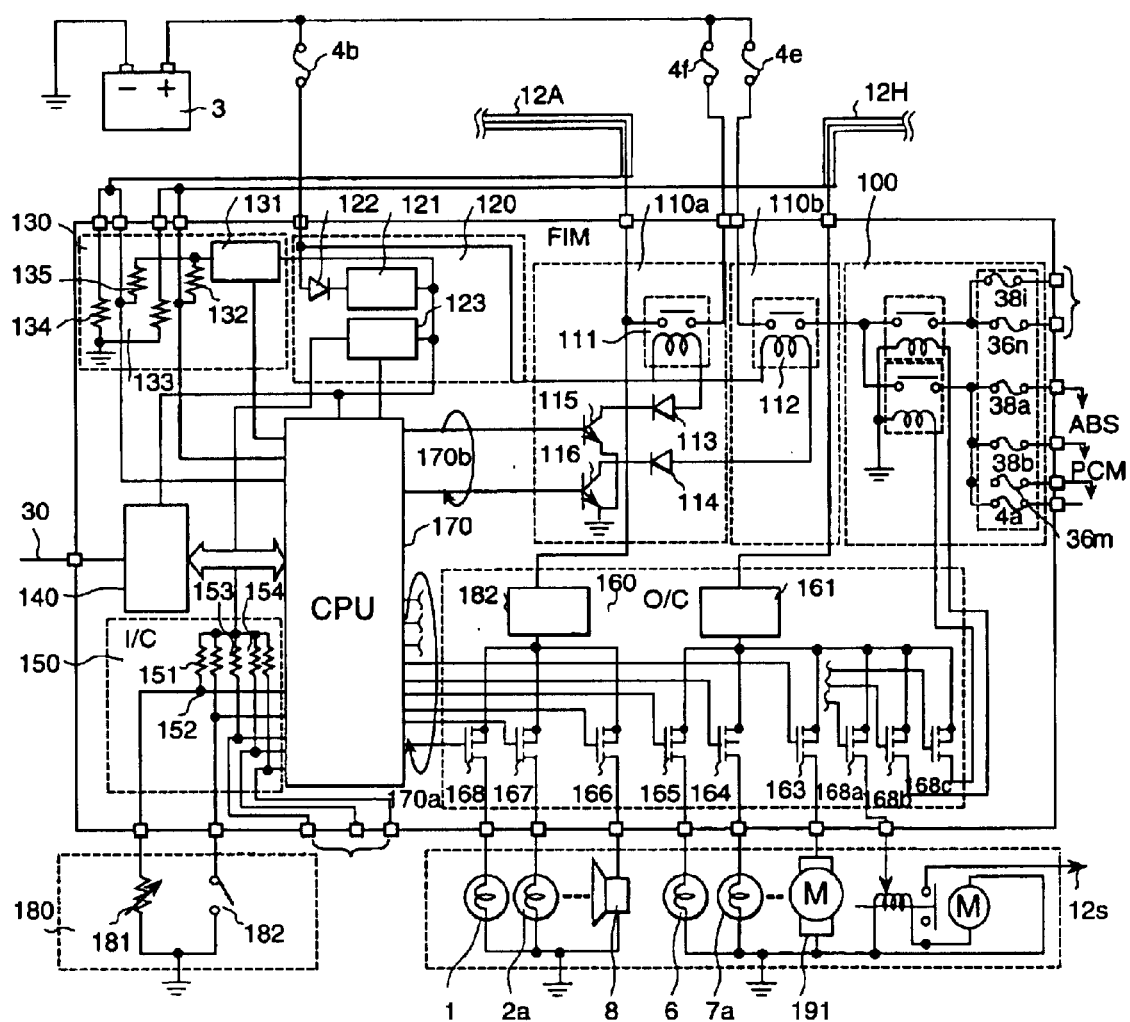
FIG. 10 shows the construction of the FIM module of the system in FIG. 3 and FIG. 4.
Figure 11:
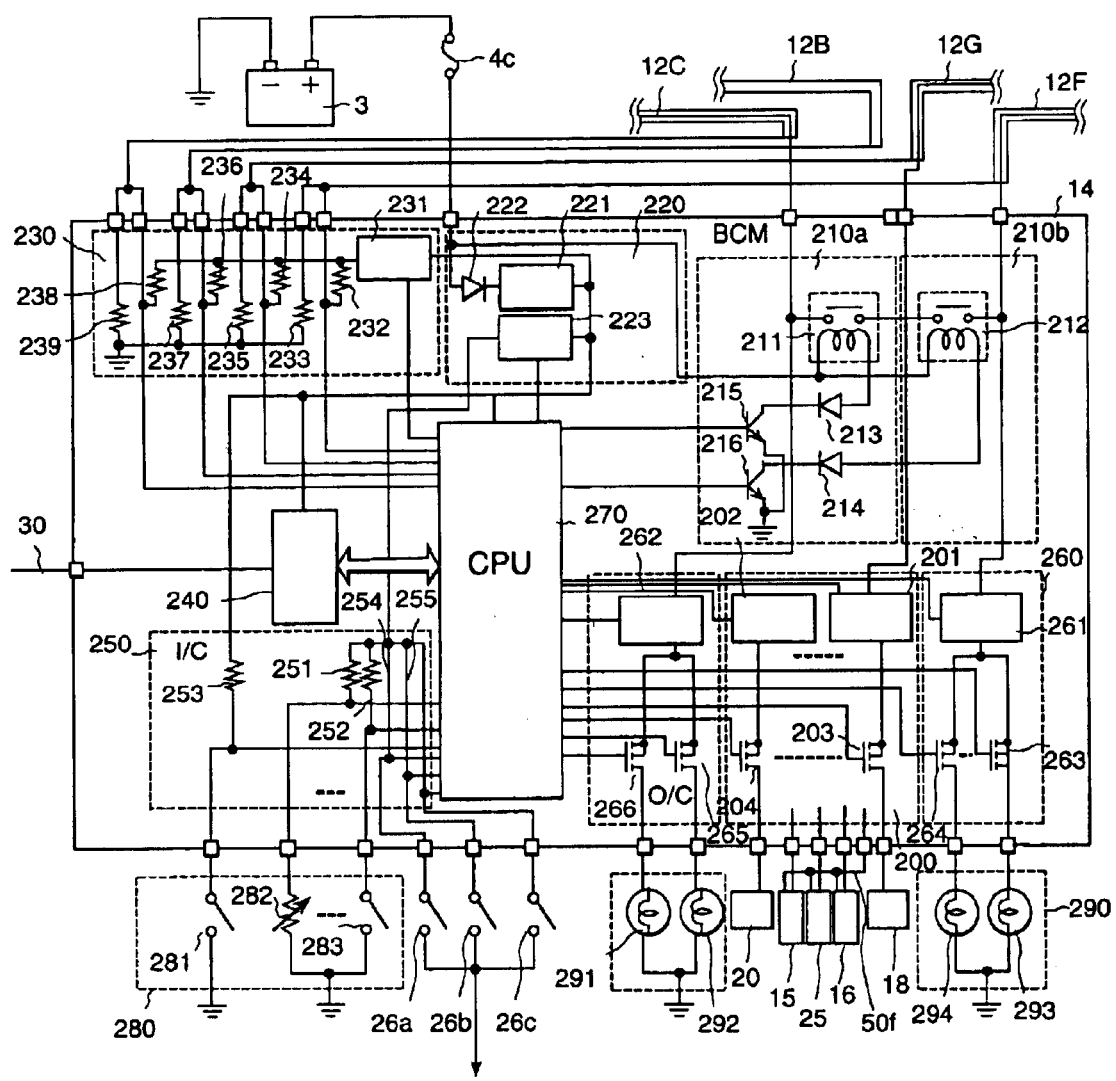
FIG. 11 shows the construction of the BCM module of the system in FIG. 3.
Figure 12:
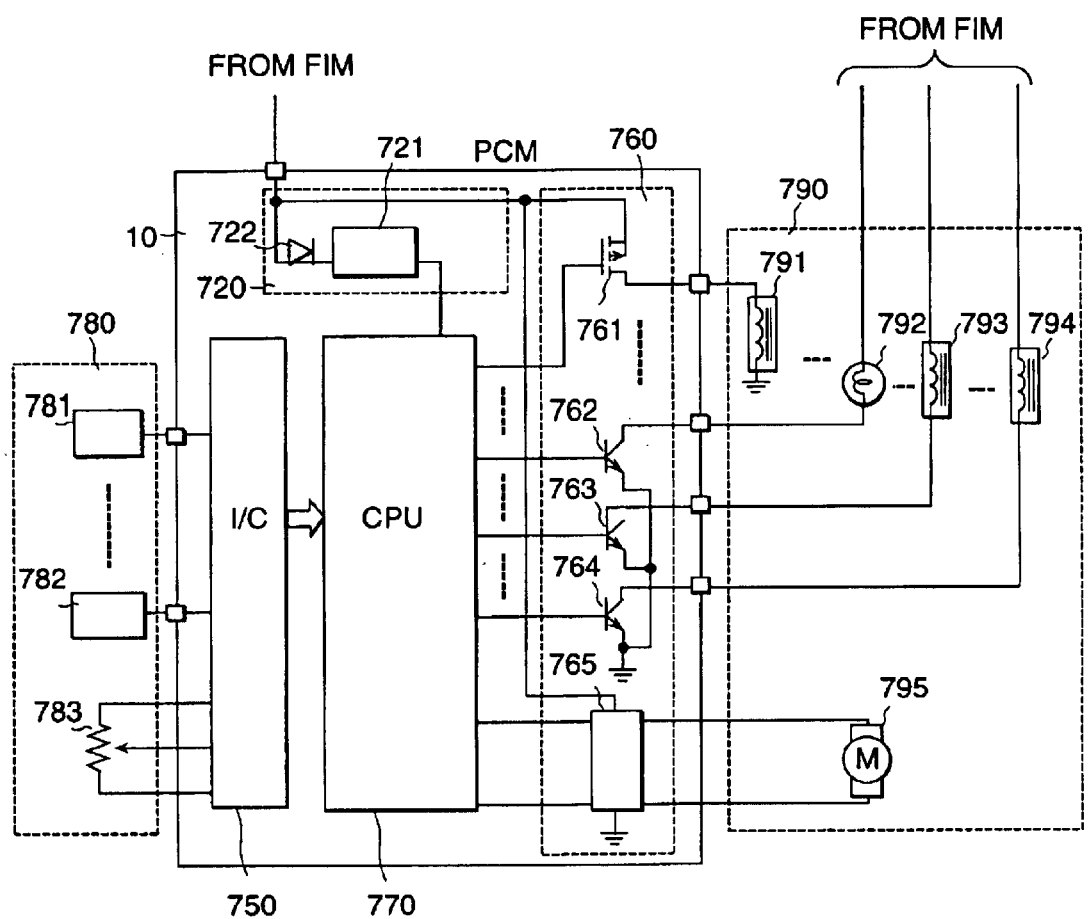
FIG. 12 shows the construction of the PCM module of the system in FIG. 3.

FIG. 10, FIG. 11 and FIG. 12 show the construction of FIM 5, BCM 14 and PCM 10 according to the embodiment shown in FIG. 3. There are no changes in the other modules RIM 29, DDM 18 and PDM 20 relative to the embodiment shown in FIG. 2.

The construction of FIM 5 according to the embodiment shown in FIG. 3 will be explained according to FIG. 10. Only the points which differ from the construction of FIM 5 according to the embodiment shown in FIG. 5 will be explained.

In FIG. 2, a separate power supply system having a separate function is formed for every control system except for the body electrical component system. However, in the embodiment shown in FIG. 3, power is supplied to PCM 10 and ABS 11 from FIM 10, which is arranged in the same engine compartment. Accordingly, compared to FIM 5 shown in FIG. 5, a power supply circuit 100 is added.

The semiconductor switching element 102 of the power supply circuit 100 receives power via an over-current detection circuit 162 and controls the supply of power against PCM 10; and the semiconductor switching element 101 receives the supply of the power supply via an over-current detection circuit 161 and controls the supply of the power supply against ABS 11.

As stated above, it is possible to dispense with the fuses 36a, 36b, 36c, 36d and 36e shown in FIG. 2, which are connected in parallel to the respective power supply line. The electric power line between the battery 3 and the respective modules passes from the battery 3 (arranged in the engine compartment) to the ignition key, which is arranged in the cabin, and the fuse box. However, the electric power line is closed by FIM 5 and BCM 14. In this manner, the electric power line can be shortened and a number of the electric power lines can be deleted.

The construction of BCM 14 in the embodiment shown in FIG. 3 will be explained according to FIG. 11. Only those points which differ relative to the construction of BCM 14 in FIG. 6 will be explained.

In FIG. 2, a separate power supply system having the separate function is formed for every control system except for the body electrical component system. However, in the embodiment shown in FIG. 3, power is supplied to the radio 15, SDM 25 and A/C 16 from 8 CM 14, which is also arranged in the cabin of the vehicle, via the power supply circuit 200, and is controlled according to the semiconductor switching elements (not shown).

As stated above, it is possible to dispense with the fuses 36a, 36b, 36c, 36d and 36e shown in FIG. 2, which are connected in parallel to the respective power supply line. The electric power line between the battery 3 and the respective modules passes from the battery 3 (in the engine compartment) to the ignition key, which is arranged in the cabin, and the fuse box. However, the electric power line is closed by BCM 14. In this manner, the electric power line can be shortened and a number of the electric power lines can be deleted.

The construction of PCM 10 in the embodiment shown in FIG. 3 will be explained referring to FIG. 12. The construction of PCM 10 is the same shown in FIG. 8; however, the power supply of PCM 10 and the loads is altered from FIM 5.

Figure 13:
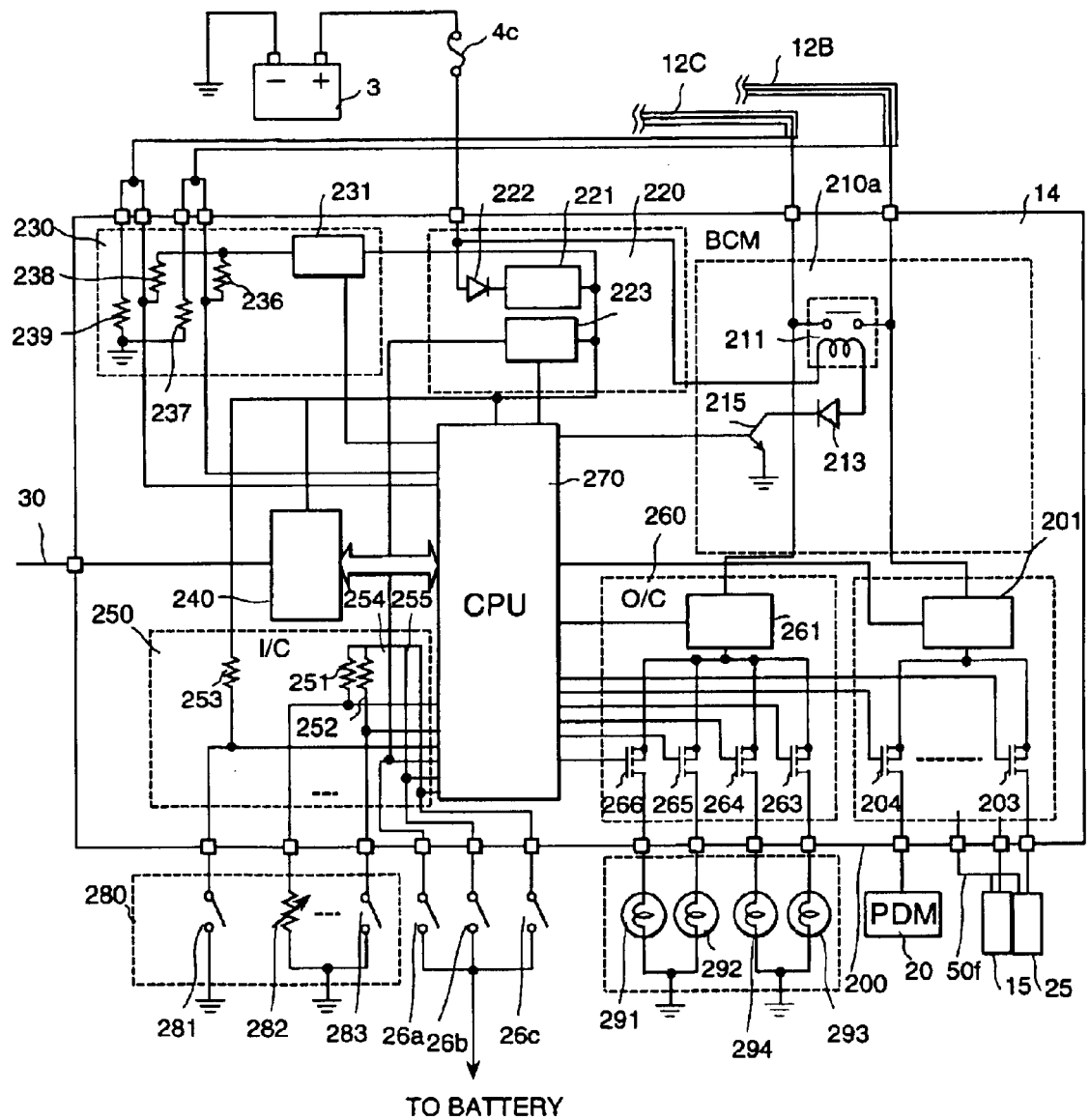
FIG. 13 shows the construction of the BCM module of the system in FIG. 4.
Figure 14:
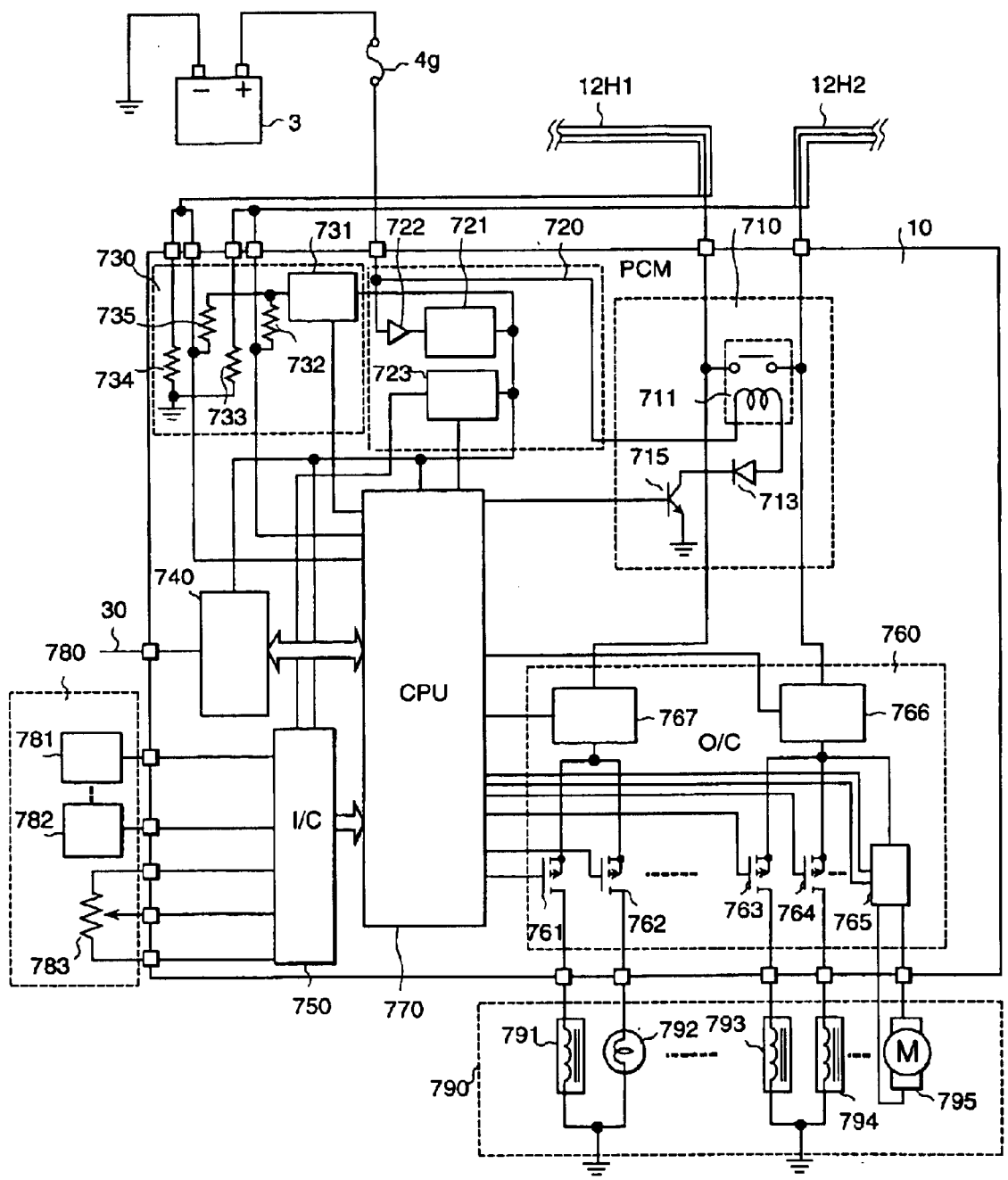
FIG. 14 shows the construction of the PCM module of the system in FIG. 4.

FIG. 13 and FIG. 14 show the construction of the modules BCM 14 and PCM 10 according to the embodiment shown in FIG. 4. (There are no changes in the other modules FIM 50, RIM 29, DDM 18 and PDM 20 compared with the embodiment shown in FIG. 2.)

The construction of BCM 14 in FIG. 4 will be explained with reference to FIG. 13. Only those points which differ from the construction of BCM 14 in FIG. 6 will be explained.

In FIG. 2, three modules (FIM 5, BCM 14, RIM 29) are connected to the power bus 12. However, in FIG. 4 the control modules PCM 10, ABS 11 and A/C 16 (which have a separate function except for the body electrical component system) are also connected to the power bus 12.

Accordingly, two electric power lines (12B and 12C) are connected to BCM 14; (The electric power lines 12F and 12G, which are connected to BCM 14 in the embodiment shown in FIG. 2, are connected to A/C 16.)

Together with this variation, the connections of the short sensor are reduced to two from four, and the construction of the power supply circuit 200 and the loads to be connected are slightly altered. However, because there are no alterations of the basic construction and operation, further detailed explanation will be omitted.

As stated above, it is possible to dispense with the fuses 36a, 36b, 36c, 36d and 36e shown in FIG. 2, which are connected in parallel to the respective power supply line. The electric power line between the battery 3 and the respective modules passes from the battery 3 (in the engine compartment) to the ignition key, which is arranged in the cabin, and the fuse box. However, the electric power line is closed by BCM 14. In this manner, the electric power line can be shortened and a number of the electric power lines can be deleted.

Further, in comparison with the construction shown in FIG. 3, the power supply circuit of BCM 14 can be simplified.

The construction of PCM 10 in the embodiment shown in FIG. 4 will be explained referring to FIG. 14.

In FIG. 4, PCM 10 (which has a separate function from the body electric equipment system) is connected to the power bus 12.

The construction of PCM 10 in FIG. 14 differs from that of RIM 29 which is connected to the power bus 12 in FIG. 2, in respect of the input signals to be connected and the electric power lines. However, the construction is otherwise basically the same, and accordingly, a further detailed explanation will be omitted.

Figure 15:
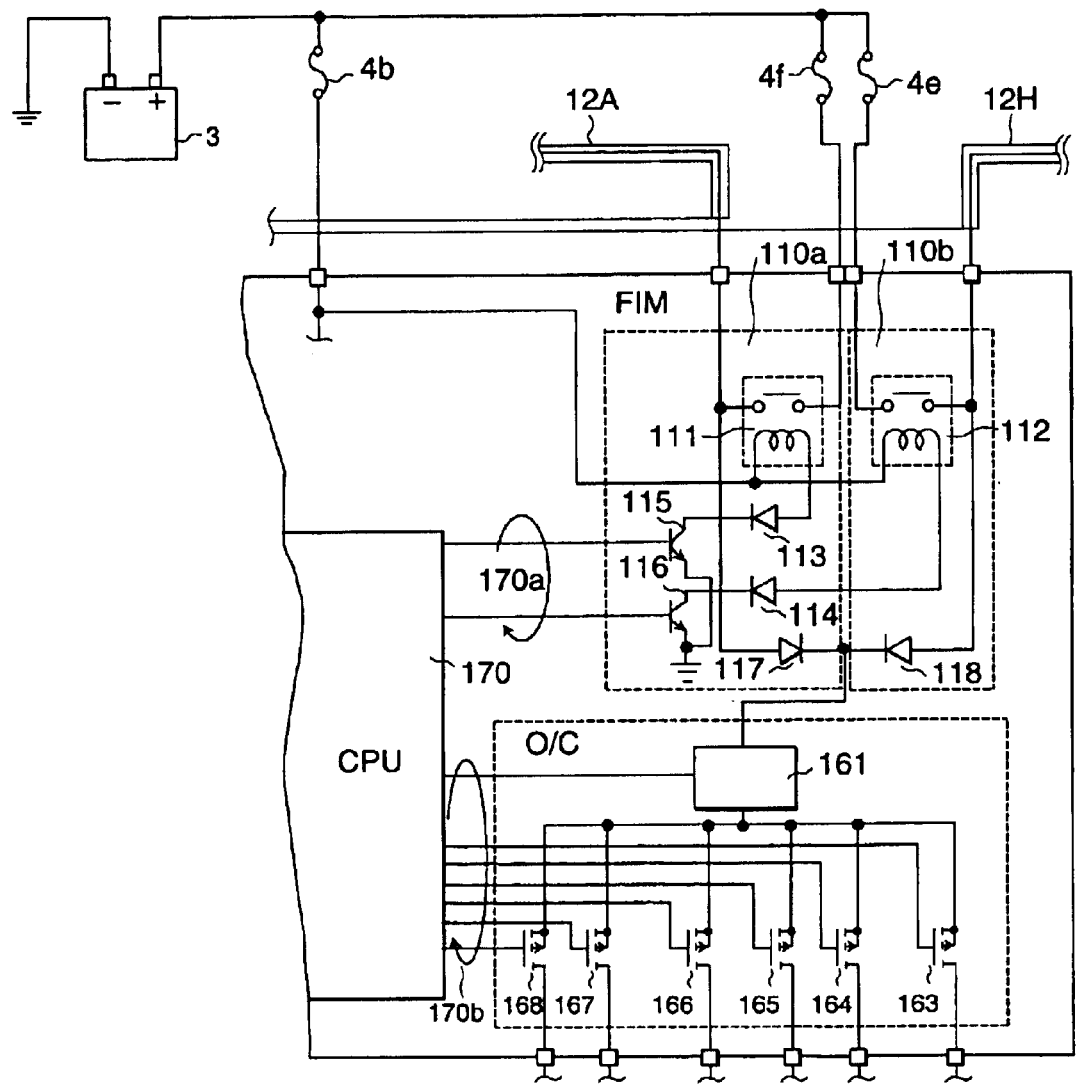
FIG. 15 shows the construction of another embodiment of FIM module of the system in FIG. 2.
Figure 16:
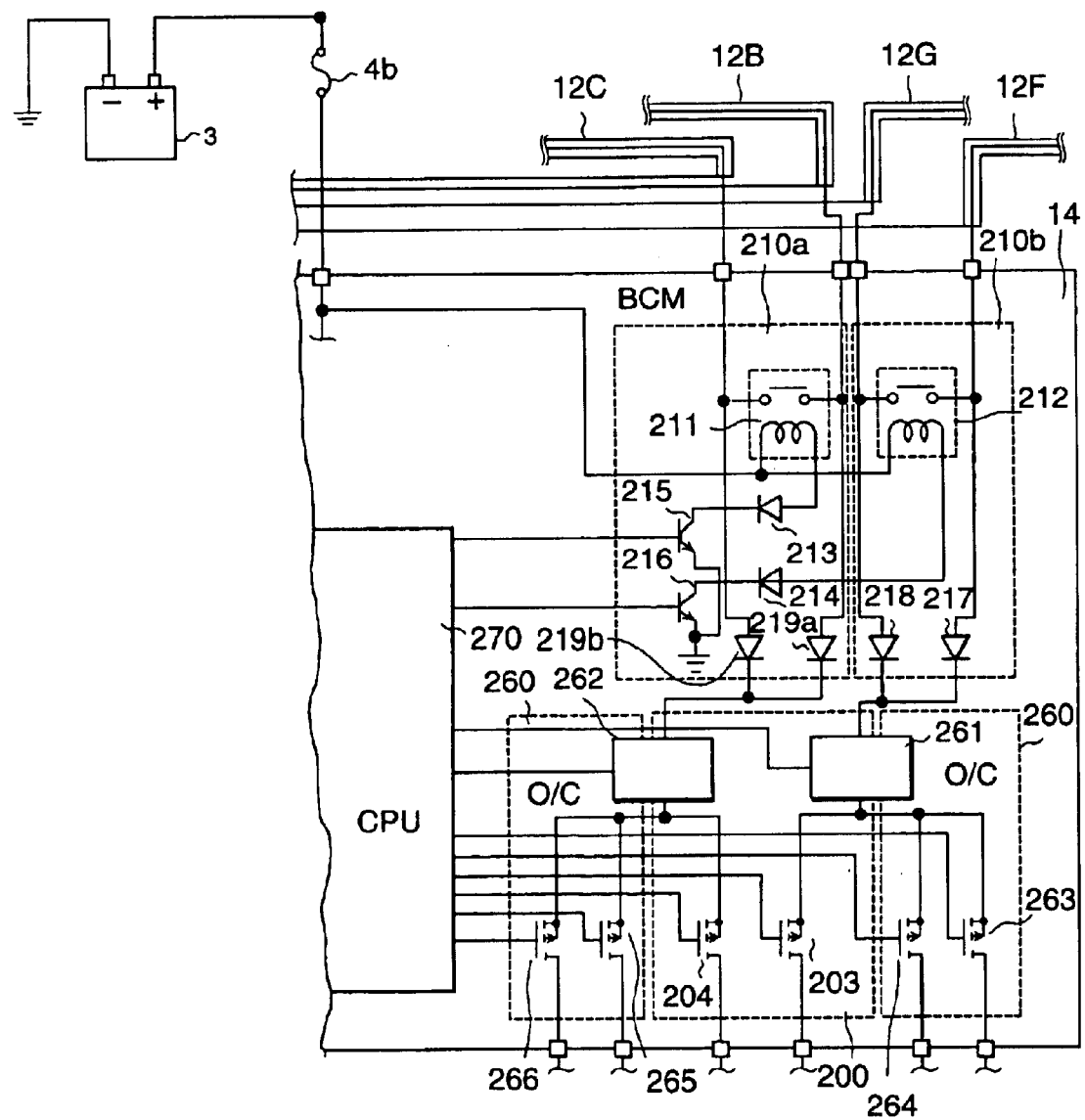
FIG. 16 shows the construction of another embodiment of BCM module of the system in FIG. 2.
Figure 17:
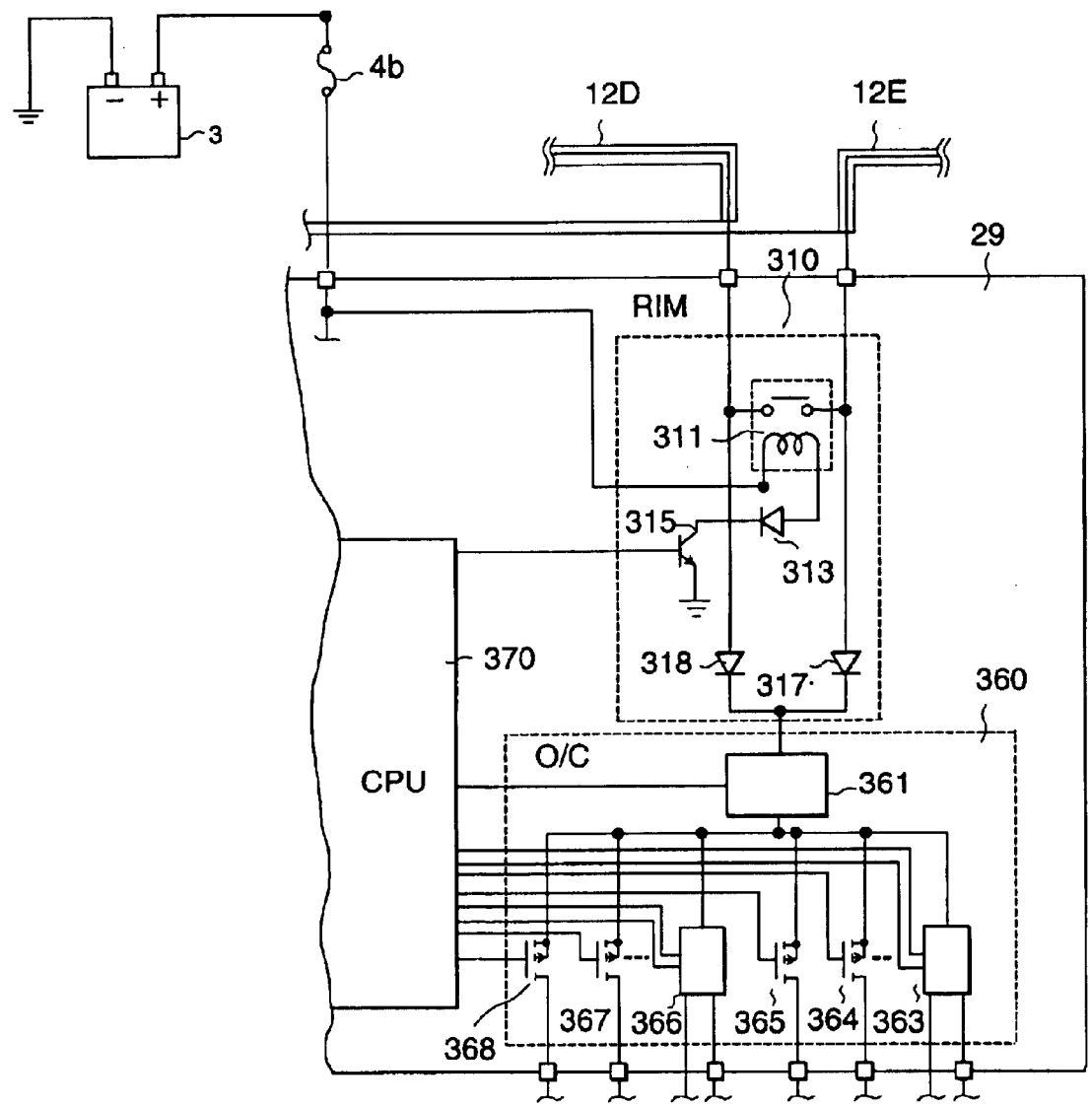
FIG. 17 shows the construction of another embodiment of RIM module of the system in FIG. 2.

FIG. 15, FIG. 16 and FIG. 17 show other constructions (alternative to FIG. 5. FIG. 6 and FIG. 7) of the respective modules FIM 5, BCM 14 and RIM 29 according to the embodiment shown in FIG. 2. In FIG. 5, FIG. 6 and FIG. 7, power is supplied from electric power lines 12A and 12H of the loop power supply system which are connected to the module, independently to the respective loads. However, in FIG. 15, FIG. 16, FIG. 17, power is supplied from electric power lines of the loop power supply system to the loads in the interior portion of the module, by means of a diode logical AND.

In FIM 5 shown in FIG. 15, for example, the power supply from the electric power line 12A and the electric power line 12H is supplied to the output circuit via a logical AND circuit comprising a diode 117 and a diode 118.

In BCM 14 shown in FIG. 16, the power supply from the electric power lines 12B and 12C is supplied to the output circuit via a logical AND circuit which includes a diode 217 and a diode 218; and power from the electric power lines 12F and 12G is supplied to the output circuit via logical AND circuit comprised of a diode 219a and a diode 219b. Similarly, in RIM 29 shown in FIG. 17, the power supply from the electric power lines 12D and 12E is supplied to the output circuit via a logical AND circuit in the form of a diode 317 and a diode 318.

With the above stated constructions, since the number of the power supply systems is reduced, a number of the over-current detection circuits which are disposed downstream can be deleted.

FIGS. 18–21 show an H bridge circuit for driving the motor in both the forward and reverse directions.

First, the construction shown in FIG. 18 will be explained. In response to two control signals, the control circuit, (logical circuit 1050) controls the H bridge, which is constituted by four semiconductor switching elements 1010, 1020, 1030 and 1040, and has no short protection function. During normal forward rotation, the semiconductor switching elements 1020 and the semiconductor switching elements 1030 are turned "on", so that current flows to the motor 1060 in a first polarity; while during reverse rotation, the semiconductor switching elements 1010 and the semiconductor switching elements 1040 are turned "on", so that a reverse current flows in the motor 1060.

Figure 19:
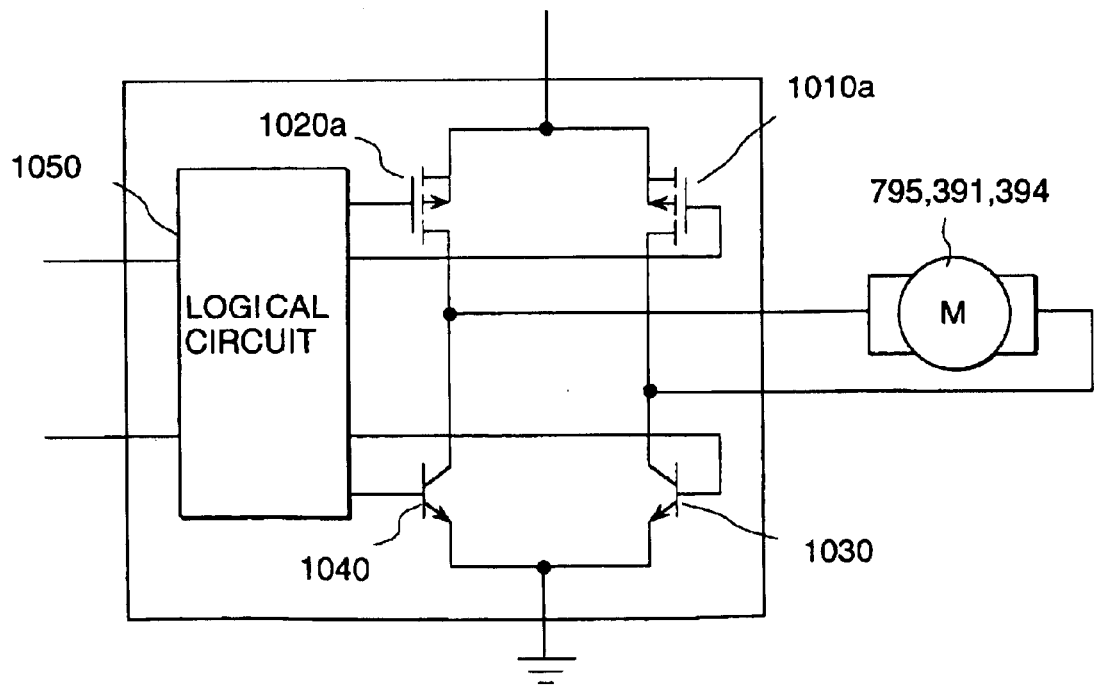
FIG. 19 shows the construction of another motor drive H bridge circuit (2)
Figure 20:
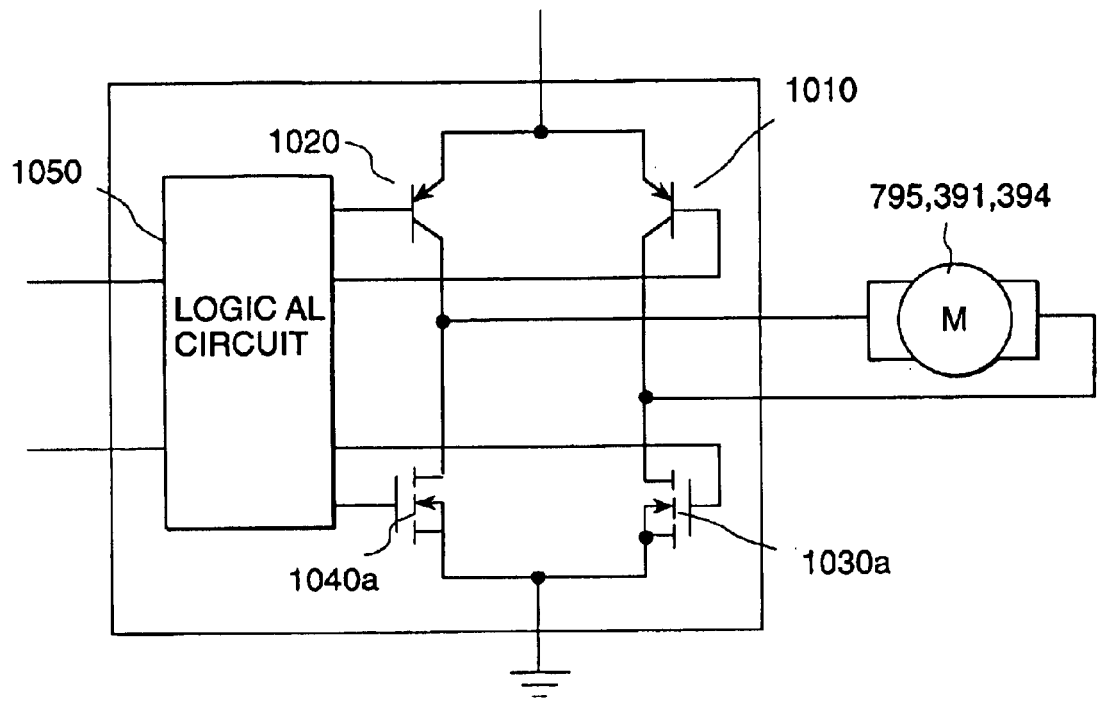
FIG. 20 shows the construction of another motor drive H bridge circuit construction (3)

In FIG. 19, the two upstream semiconductor switching elements 1010a and 1020a which constitute H bridge have a short protection function; while in FIG. 20, the downstream semiconductor switching elements 1030a and 1040a which constitute H bridge have a short protection function. Finally, in the Construction shown in FIG. 21, all of four semiconductor switching elements 1010a, 1020a, 1030a and 1040a which constitute H bridge have a short protection function.

Figure 18:
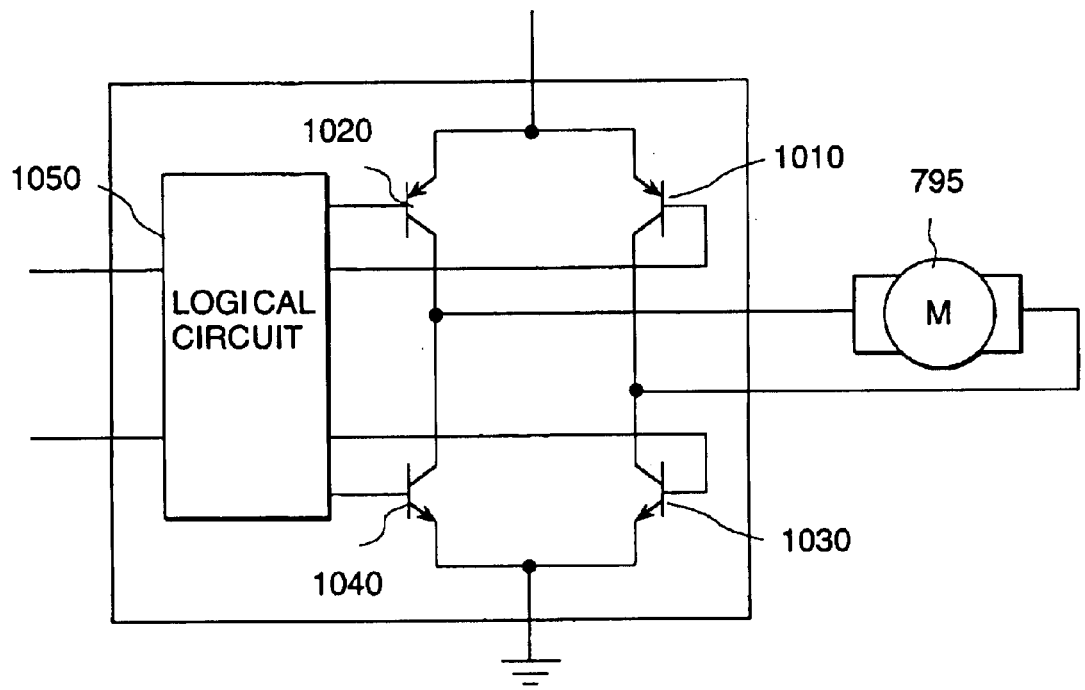
FIG. 18 shows the construction of a motor drive H bridge circuit (1)

In the construction of FIG. 18, since the semiconductor switching elements of the H bridge have no short protection function, it is necessary to provide a short protection function elsewhere.

In the construction of FIG. 19, since the semiconductor switching elements 1010a and 1020a have a short protection function at the upstream side, the apparatus is protected when the load is shorted and when the power supply connected to the load is shorted to ground. However, when the wire connected to the load is shorted to the power supply side, then the semiconductor switching element at the downstream side is destroyed.

Figure 21:
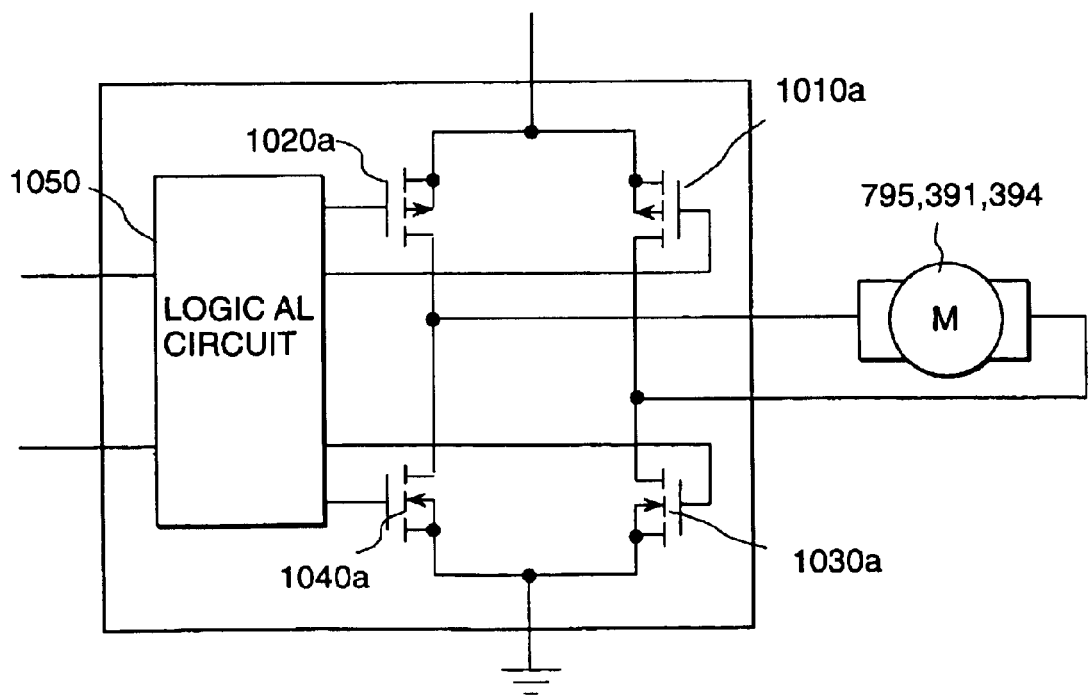
FIG. 21 shows the construction of another motor drive H bridge circuit (4)

In contrast to the above, in the construction FIG. 21, since both the upstream and downstream semiconductor switching element have a short protection function, the apparatus is protected against all such short circuits; that is, when the load is shorted when the power load is shorted when the wire connected to the load is shorted to ground, and when the apparatus is shorted at the power supply side.

The manner of use of the four H bridges will now be explained. The module which receives the supply power from the power bus 12 (specifically at the upstream side of FIM 5, BCM 14 and RIM 29 in the embodiment shown in FIG. 2), there are only two fusible links 4e and 4f.

When the load is short circuited and no short protection function is provided in the output circuit, the whole loop power supply system becomes inoperative. Therefore, it is necessary to use one of the constructions shown in FIG. 19, FIG. 20 and FIG. 21 as a motor drive H bridge circuit in FIM 5 (FIG. 5), BCM 14 (FIG. 6) and RIM 29 (FIG. 7).

However, since PCM 10 (FIG. 8) and ABS 11, A/C 16 etc. according to the embodiment shown in FIG. 2 have separate fuses for every function and every load (as shown in PCM 10 shown in FIG. 8), even if the H bridge circuit has no short protection function, a fatal failure does not occur. Therefore, in this embodiment, the H bridge circuit having no short protection function (shown in FIG. 18) is used. (Of course, there would also be no problem in using the H bridge Circuits shown in FIG. 19, FIG. 20, FIG. 21).

Similarly to, in the power supply for DDM 18 and PDM 20, since semiconductor switching elements having a short protection function are used, the H bridge circuit comprising semiconductor switching element having no short protection function (FIG. 18) is used.

In the embodiments shown in FIG. 4, since PCM 10, ABS 11 and A/C 16 are supplied with power from the power bus 12, it is necessary to use H bridge circuits having a short protection function, such as shown in FIG. 19, FIG. 20 and FIG. 21, in these modules. Specifically, H bridge circuit shown in FIG. 20 is used as the circuit for driving the throttle motor.

Next, the over-current detection circuits in the output circuits of the modules shown in FIGS. 5–7, 10, 11 and 13–17 will be explained.

Figure 22:
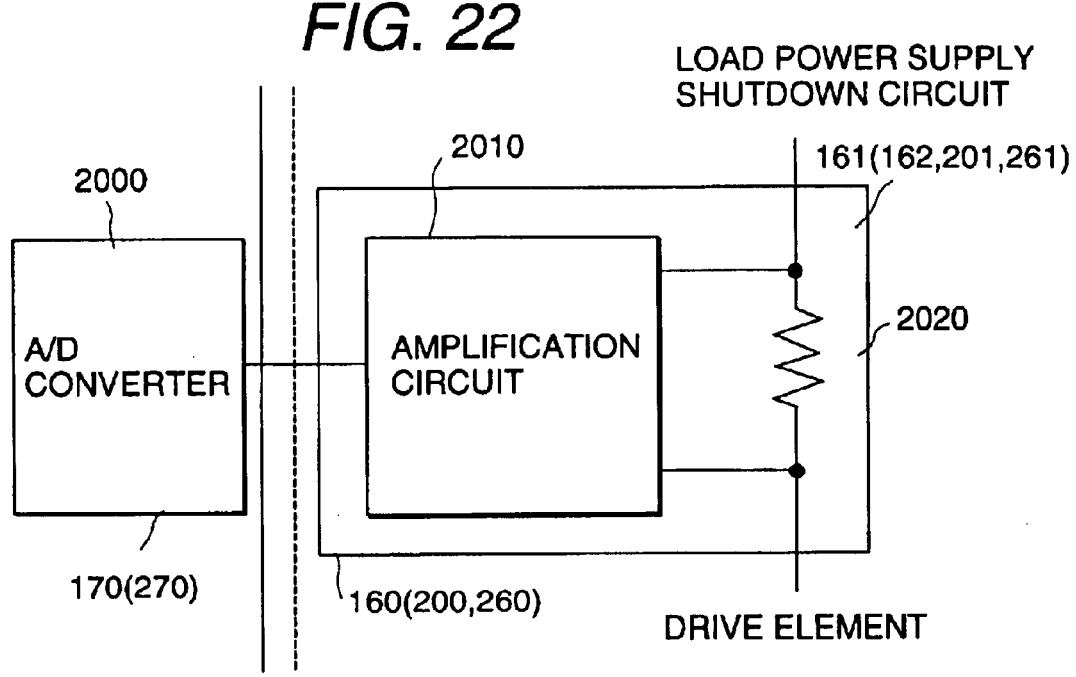
FIG. 22 shows the construction of an over-current detection circuit according to a shut resistor.

FIG. 22 shows the construction of the over-current detection circuit. A shunt resistor 2020 is connected to the electric power line at its upstream side, and to the plural semiconductor switching elements for driving the loads at its downstream side. All the currents which flow into the connected loads flow through this shunt resistor 2020.

A potential difference across the shunt resistor 2020 is amplified by an amplification circuit 2010 and the current which flows into the shut resistor 2020, (the total of all currents which flow into the connected load) is detected by A/D converter 2000 of the control circuit.

In this embodiment, by detecting the current, a dead short failure of the load, a leak short failure of the load, and a complex failure including both a load dead short failure and a dead short failure of the semiconductor switching element of the output circuit etc., can be detected. Accordingly, fail-safe operation can be achieved.

Using the flow charts shown in FIG. 37 and FIG. 38, the above stated failure detection and fail safe operation of the modules will be explained, referring to FIGS. 5–7, 11, 13 and 14–17.

Figure 37:
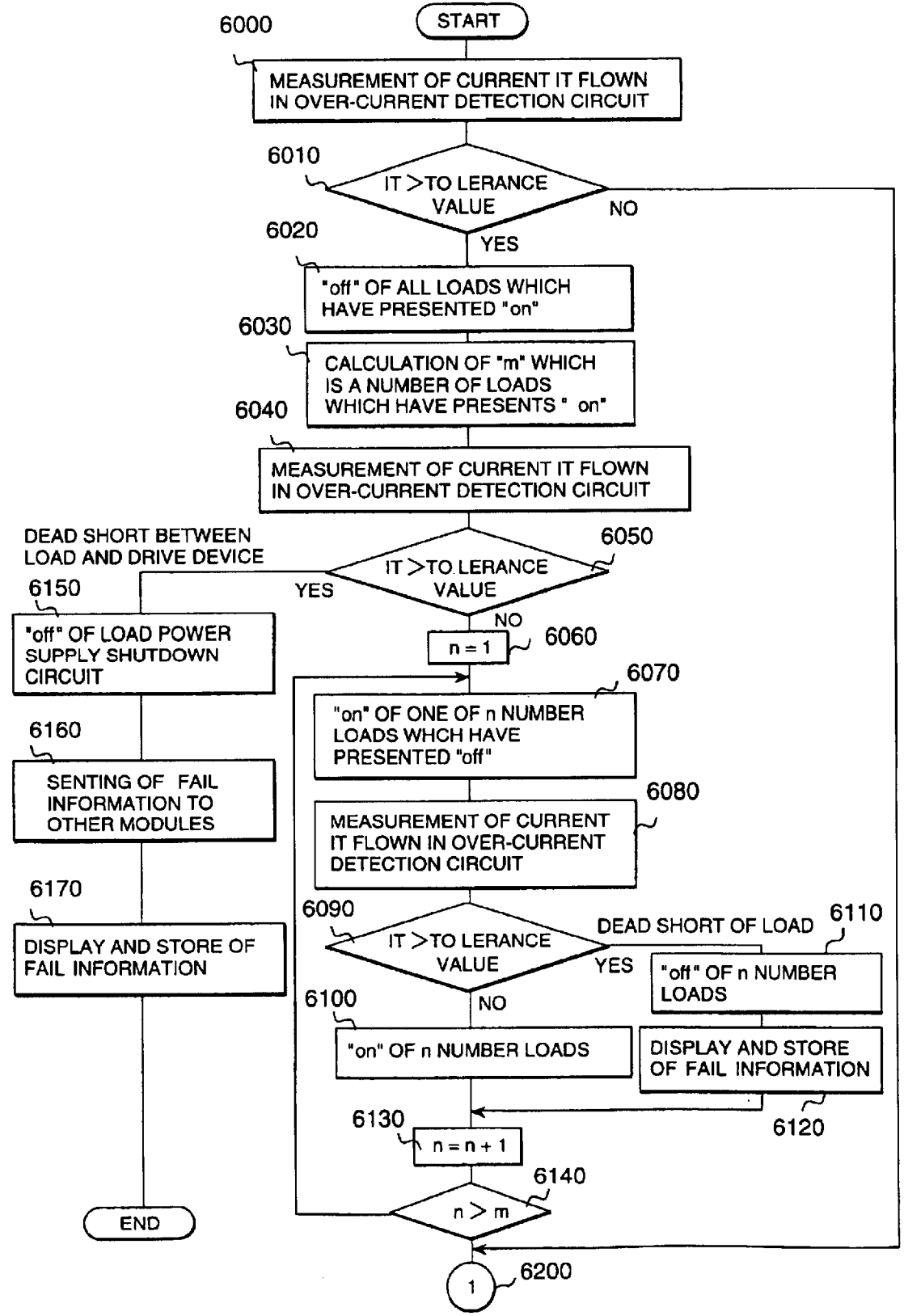
FIG. 37 shows an algorithm for load and short detection and protection operation.

FIG. 37 shows the failure detection operation of the load and a fail safe operation. Firstly, in a step 6000, the current IT which flows into the over-current detection circuit is measured by A/D converter 2000 shown in FIG. 22.

Next, in a step 6001, it is determined whether or not the current IT is more than a predetermined tolerance value. The above stated tolerance value is a numerical value which is less than a current at which any portion of the module is destroyed, and is more than the total operating current at which all loads connected to the module operate.

In the step 6010, when the current IT is less than the tolerance value, it is determined that there is no fatal dead short failure, and a step 6200 (FIG. 38) is carried out. In the step 6010, when the current IT exceeds the tolerance value, it is assumed that a load element has become shorted, and steps including a step 6020 are carried out.

In step 6020, all of the loads which are then in the "on" state are turned "off". (All of the semiconductor switching elements of the output circuit are switched "off".) In a step 6030, the number m of the loads which have been in the "on" state is determined, and in a step 6040, the current IT is measured again.

Herein, when all of the semiconductor switching elements are switched "off", then no current will flow, regardless of whether a semiconductor switching element has failed.

To judge this, in a step 6050, a comparison is made to determine whether the current IT measured in step 6040 (all of the semiconductor switching elements "off") exceeds the above stated tolerance value. When it does, the semiconductor switching element has failed, and also the load has experienced a dead short failure. The reason is that when the load is normal (no failure) but the semiconductor switching element fails, there is no case where the current IT exceeds tolerance value.

Accordingly, to shut down the loop power supply system so that no power is supplied to the failed point, firstly in a step 6150, the load power supply shutdown circuit of the module which is connected to the power supply system which has failed is switched to the "off" state. In step 6160, the failure information is sent to other modules via a multiple bus.

In a module which has received this failure information, when the information indicates the load power supply shutdown circuit itself should be placed in an "off" state, immediately the load power supply shutdown circuit is switched "off". With the above stated construction, the failed power supply system can be shut down, and a current flow can be prevented.

Further, in a step 6170, the failure point and the nature of the failure are displayed, and this information is stored as service information for the dealer. This stored information can be read out by the diagnosis apparatus shown in FIG. 1. etc.

A manner for shutting down the failed power supply system will be explained clearly, referring to the embodiment shown in FIG. 2.

As one example, it is assumed that both a fuel pump 392 connected to RIM 29 (FIG. 7) and a semiconductor switching element 364 for driving the fuel pump 392 experience a dead short failure.

In this case, when the failure is detected (based on the current which flows into the over-current detection circuit 361 of RIM 29), firstly a contact of the relay of the load power supply shutdown circuit 310 of the failed power supply system is switched "off", and the electric power line 12E of the failed power supply system and the electric power line 12D of the normal power supply system are shut down.

Further, since the electric power line 12E of the failed power supply system is connected to the electric power line 12F, a contact of the relay of the second load power supply shutdown circuit 210b of BCM 14 (FIG. 6) in which the electric power line 12F is connected, is switched "off", and the electric power line 12F of the failed power supply system and the electric power line 12G of the normal power supply system are shut down.

Accordingly, since only the failed power supply system is shut down, the load which is connected to the normal power supply system can be operated normally.

When the current IT (measured again in the above stated step 6050) is less than the tolerance value, the semiconductor switching element has not failed, but a component of the load is undergoing dead short. After the steps including a step 6060, it is determined that a load component is shorted.

In the step 6060, a numeric value n (indicating a number of repetitions of a following processing) is initialized to the value "1". In a step 6070, after a single load which was in the "off" state is switched "on", the current IT is measured, and is compared in a step 6090 with the above stated predetermined tolerance value. When it exceeds the predetermined tolerance value, it can be concluded that the load which was switched "on" has experienced a dead short, and in a step 6110, regardless the return condition is effected, the load is switched "off". Further, at this time (similarly to the above) in a step 6120 the failure information is displayed and stored.

If the current value IT is less than the predetermined tolerance value in step 6090, then it is determined that the load is not dead shorted, and in step 6100, the semiconductor switching element for driving the load is turned "on" so that the load operates normally.

The above stated steps complete the diagnosis of one load. To diagnose the remaining loads, in a step 6130, the numerical value n is incremented by "1", and in a step 6140 it is determined whether all processing has been finished. If not, then the processing steps including a step 6070 are repeated. When all steps have been finished, a step 6200 shown in FIG. 38 is carried out.

Figure 38:
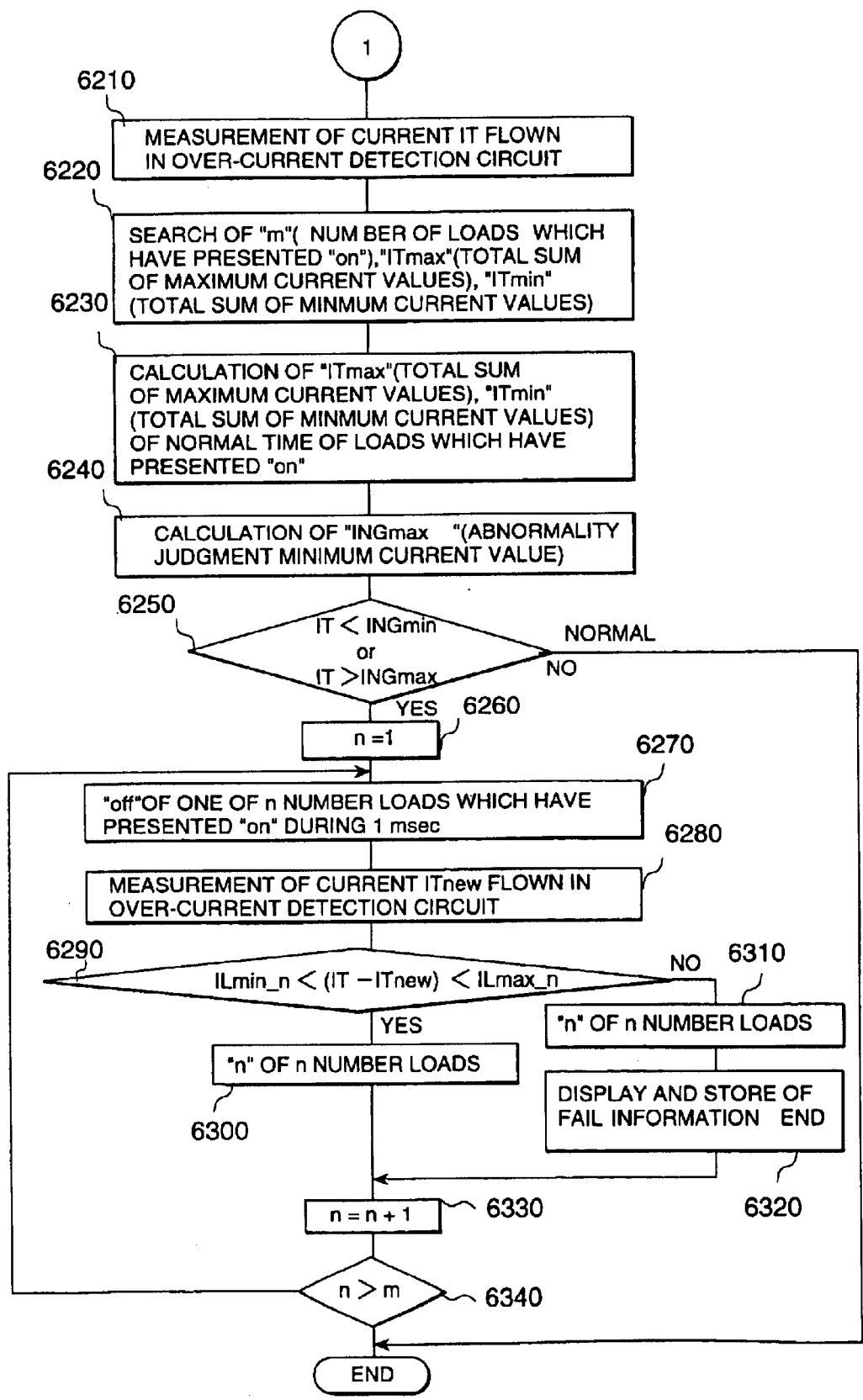
FIG. 38 is an algorithm for load over-current detection and protection operation.

FIG. 38 shows a process for switching "off" the loads when a current greater than normal is detected due to a leak of the load, but not a dead short.

In a step 6210, the current value IT is measured. In a step 6220, a maximum current value ILMAX and minimum current value ILmin for normal operation of all the loads which are then operating are searched, and further a number m of the operated loads is calculated.

Figure 39:
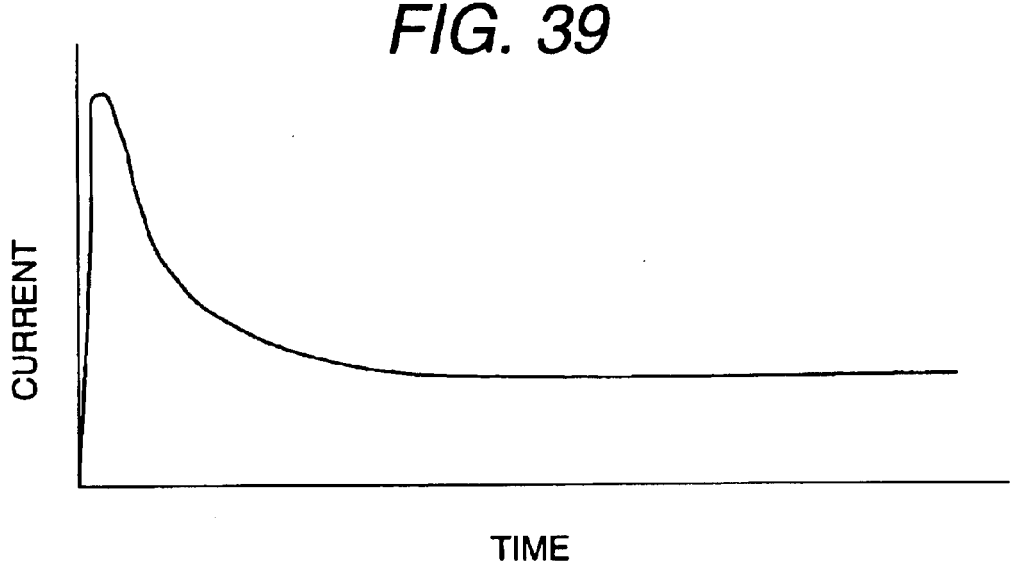
FIG. 39 is a lamp current characteristic.
Figure 40:
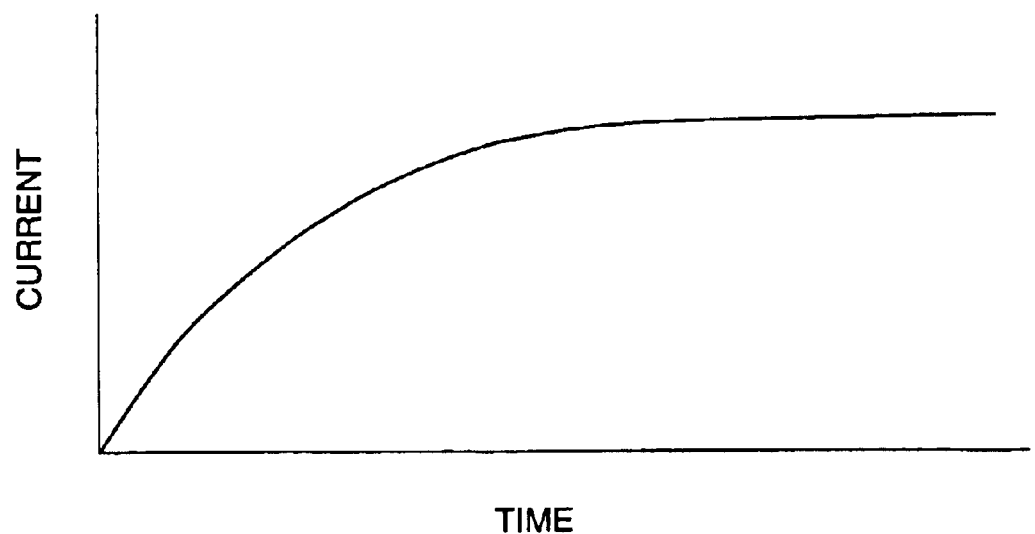
FIG. 40 is a motor current characteristic.

For example, FIG. 39 shows an example of a center value of the normal operating current for the lamp from the start of the operation, and FIG. 40 shows an example of a center value of the normal operating current for the motor from the start of operation.

Normal current data for all of the loads are stored in advance in a memory. These data are searched, and the maximum normal current value ILMAX and the minimum normal current value ILmin of all the loads are calculated according to the following formulas 1 and 2.

$$ILMAX = \text{current at normal time} \times (1+\alpha) \quad \text{formula 1}$$

$$ILmin = \text{current at normal time} \times (I-\alpha) \quad \text{formula 2}$$

Herein, $\alpha$ indicates a scattering degree.

In a step 6230, a sum ITmax of the maximum current value and a sum ITmin of the minimum current value of the normal current values of the loads which are in the "on" state are calculated according to following Formulas 3 and 4.

$$ITmax = \sum_{n=1}^{m} ILMAX \quad \text{formula 3}$$

$$ITmin = \sum_{n=1}^{m} ILmin \quad \text{formula 4}$$

Figure 41:
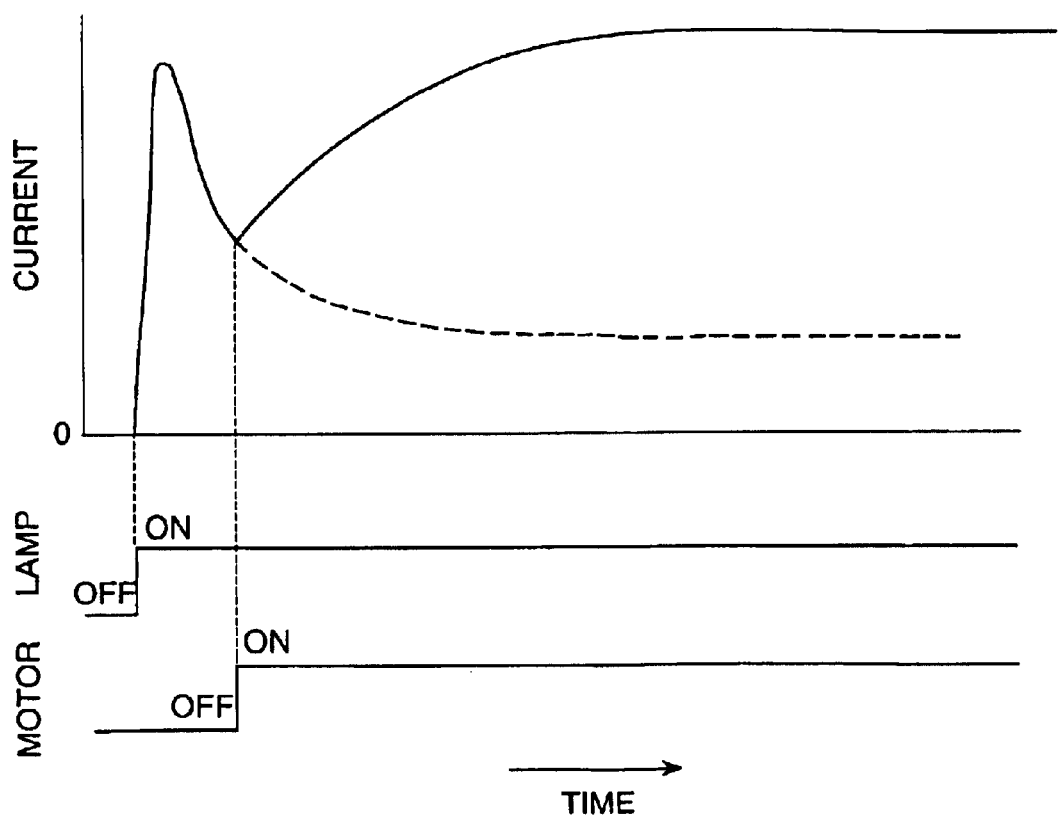
FIG. 41 is a current characteristic during plural drive operations.

For example, when the two loads shown in FIG. 39 and FIG. 40 are operated, the total sum becomes the current value shown in FIG. 41.

Next, in a step 6240, the abnormality judgment maximum and minimum current values INGmax and INGmin are calculated according to the following formulas 5 and 6.

$$INGmax = ITmax + A \quad \text{formula 5}$$

$$INGmin = ITmin - A \quad \text{formula 6}$$

Reference numeral "A" in the formula 5 and 6 is a predetermined constant value greater than zero (0).

In this embodiment, the abnormality judgment current value is calculated by adding a predetermined constant value; however in the alternative, it may be calculated as a proportion.

The current value IT measured in a step 6210 and the abnormality judgment current value calculated in step 6240 are compared in a step 6250. When the current value IT is larger than the abnormality judgment minimum current value INGmin, and is less than the abnormality judgment maximum current value INGmax, operation is judged to be normal, and processing is finished.

When, on the other hand, the current IT exceeds the normal range, it is judged that a load has failed. In this case, to specify the abnormal load, the following processing is carried out.

In a step 6260, a numeric value n (which indicates the number of times processing has been repeated) is initialized to a value of "1". In step 6270, after 1 ms one load which was "on" is switched "off", and in step 6270, the current ITnew at this time is measured.

In a step 6290, when the variation of the current value (IT-ITnew) in the "off" state is smaller than the maximum current value ILMAX of the load which was requested by the search in the step 6220 and is larger than the maximum current value ILmin, the load is normal. Then, in a step 6300, the semiconductor switching element for driving the load is turned "on", for normal operation.

In step 6290, if it is determined as a load abnormality, regardless the return condition is effected, the load switched to the "off" state. Further, in a step 6320, the failure information is displayed and stored.

To diagnose the remaining loads, in a step 6330, the above stated numeric value n is increased by "1", and in a step 6340 it is determined whether all processing has been finished. If not, the previous steps including a step 6270 are repeated.

According to the above, when both the load and the semiconductor switching element short circuited, since the power supply system is shut down, the loop power supply system is not affected.

Further, when the short and the rare short of the load is detected, it is possible to shut down only the corresponding semiconductor switching element, so that only the failure point is separated, and other loads are not affected.

Further, in this embodiment, as noted above, the semiconductor switching has an over-temperature detection shutdown function. Since the current of the respective individual loads is detected, the protection function of the semiconductor switching element may have a large scattering range, the only goal being to avoid destroying the semiconductor switching element; and the short protection can be carried out fully. Accordingly, the construction of the semiconductor switching element can be simplified.

Figure 23:
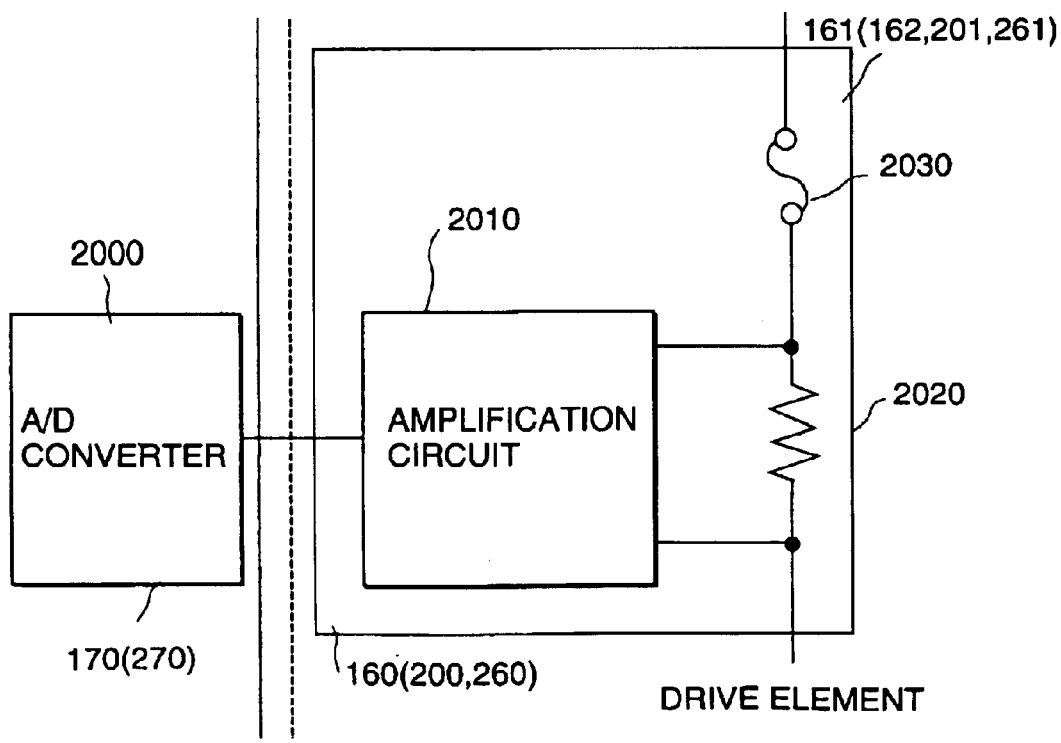
FIG. 23 shows the construction of an over-current detection circuit according to a shut resistor and a fuse.

FIG. 23 shows another embodiment of the over-current detection circuit, which differs from the construction shown in FIG. 22 in that a fuse is connected to a shunt resistor 2020 in series.

In this circuit, the failure detection and the fail safe processing shown in FIG. 37 and FIG. 38 are carried out. Further whether or not the failed power system is shut down, because of the fuse 2030, the failure point can be shut down.

Figure 24:
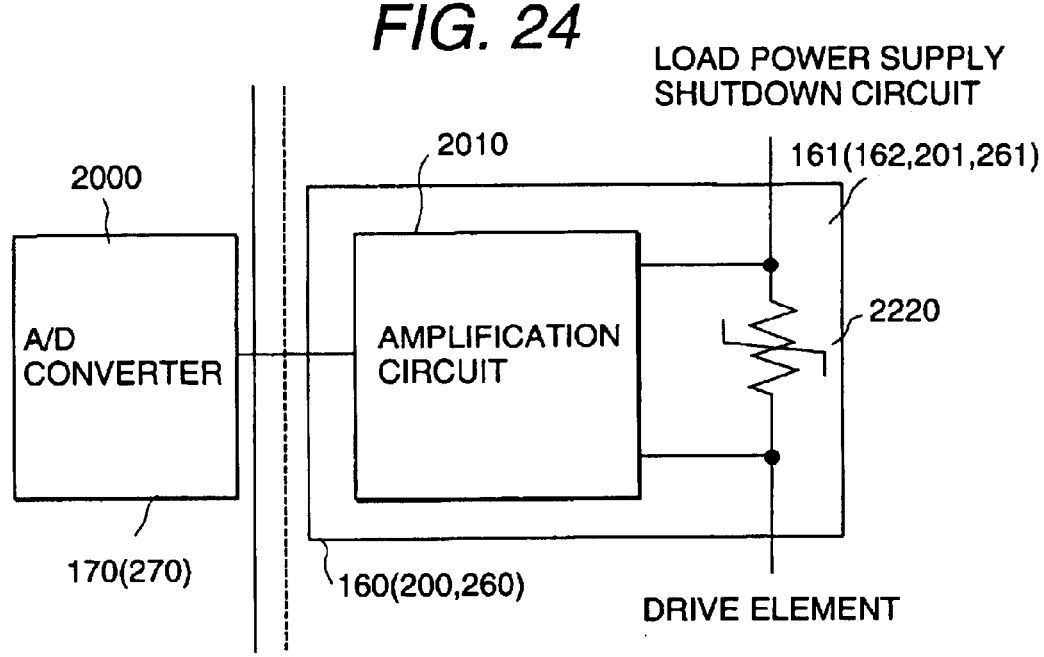
FIG. 24 shows the construction of an over-current detection circuit according to a PTC element.

FIG. 24 shows a further another embodiment of the over-current detection circuit, which differs from FIG. 22 in that a protection element (hereinafter, PTC element) 2220 having a PTC characteristic (when the temperature rises, the resistance increases) is used in place of the shunt resistor 2010.

Figure 25:
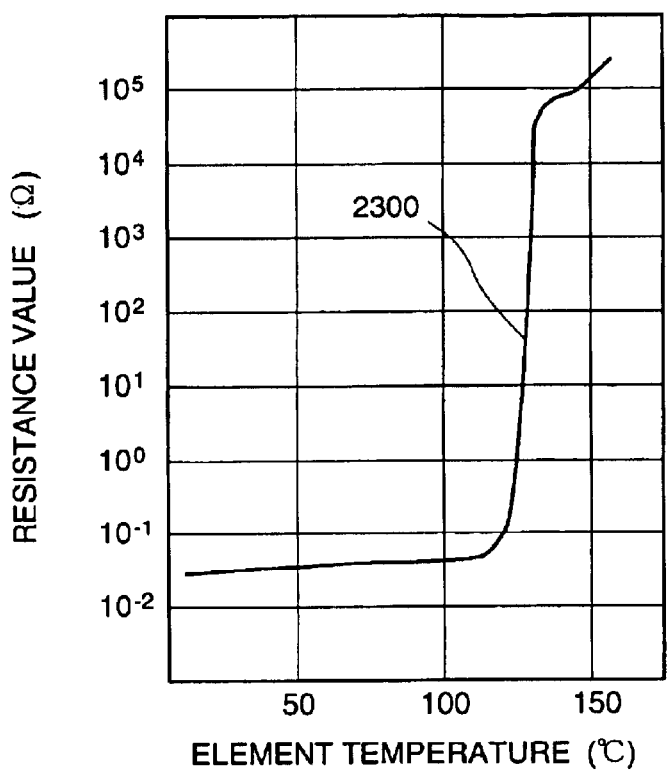
FIG. 25 shows a characteristic of a PTC element.
Figure 25:
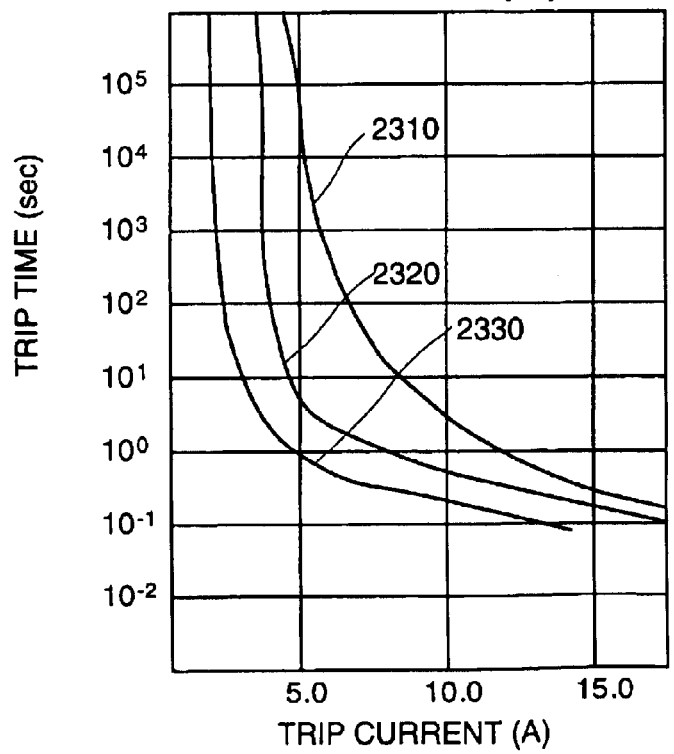

PTC element has the temperature characteristic shown in FIG. 25(*a*) and when its temperature rises above a preset value (in this embodiment about 120° C.), its resistance value increases abruptly, from several tens of mΩ to about several hundred kΩ.

Further, the factor which causes the temperature to rise is the current which flows into the PTC element. The relationship between the current and time (a trip time) for abruptly increasing the resistance value is shown in FIG. 25(*b*). The characteristics 2310, 2320 and 2340 are the characteristics when the respective surrounding temperatures are 0° C., 20° C. and 60° C., respectively. When the current is more than 15A, the resistance value increases in less than one second.

With this PTC element the current is detected. When a very large current flows, since the resistance value of PTC element is increased, and because of the potential difference between PTC elements, a large difference occurs between the detection voltages in the normal and abnormal conditions. Accordingly, the detection accuracy is made rough.

Further, in this circuit, the failure detection and fail safe processing are shown in FIG. 37 and FIG. 38. However, when an attempt is made to shut down the failed power supply system but the shutdown processing is not carried out, since the resistance value of PTC element is increased, the current value can be restrained, and therefore the flow continuation of the over-current can be prevented.

In the embodiments shown in FIG. 2, FIG. 3 and FIG. 4, in which the power bus 12 makes a circuit in the vehicle, when the electric power line becomes short circuited, the power supply is cut off to all of modules, so that almost all functions of the automobile are made to stop.

Accordingly, in the embodiment examples, when there is a danger of the short circuit in the electric power line, such a short circuit is detected before it happens, and the necessary treatments can be carried out.

Figure 28:
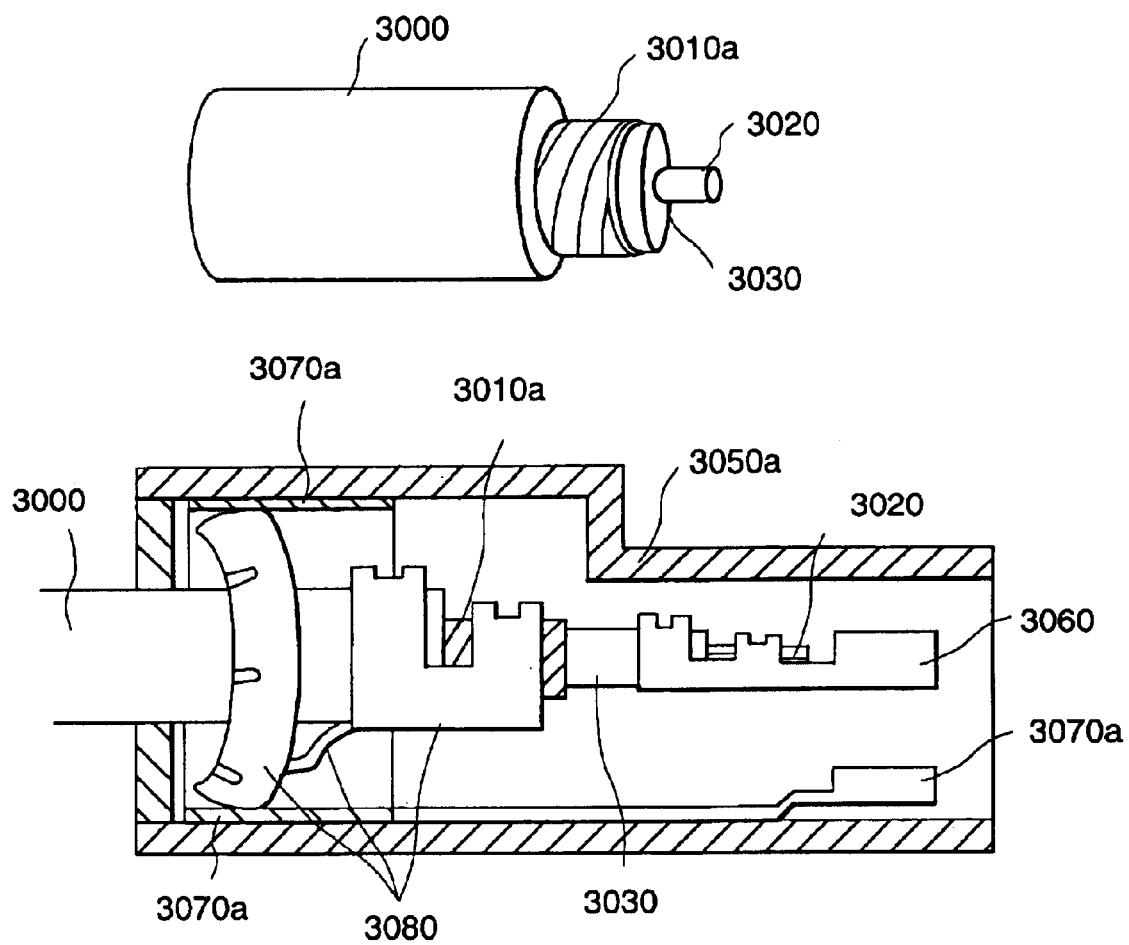
FIG. 28 shows the construction of a short sensor (3)

One construction element of the above stated treatments is the electric power line having the above stated short sensor. As the embodiment of the electric power line, three kinds of the constructions shown in FIG. 26, FIG. 27 and FIG. 28 are shown.

In the construction shown in FIG. 26, a connector 3050 is employed to connect to the module. A rubber plug 3080 has a role of water proofing. The electric power line 3020 is connected to a terminal coupler 3060 in the manner of a faucet, and the latter is fitted and connected to the connector of the module.

Similarly, a short sensor 3010 in the form of a connector for shield is connected to a terminal 3070 in the manner of a faucet and is fitted and connected to the connector of the module.

In the construction shown in FIG. 27, the short sensor constituted by the connector for the shield comprises an aluminum film 3010a and a drain wire 3010b which contacts to an inner side of the aluminum film. With this construction, when the terminal 3070 is carried out by performing the faucet manner, since it is unnecessary to untie the connector for shied, the process manner can be carried out easily.

Further, in comparison with the connector for shield, since the conductive body can be formed at all faces, even in the case of a contact with the material such as a needle, the short can be detected. Accordingly, the detection performance of the short sensor can be improved.

In the construction shown in FIG. 28, the drain wire 3010b shown in FIG. 27 is deleted.

In this case, a connector 3050a is provided to connect the short sensor 3010a to the module. The electric power line is connected to the terminal 3060 in the manner of a faucet as shown in FIG. 26 and FIG. 27; but a connector 3070a for connecting the short sensor to the module is formed with the connector as one body as shown in figure.

The connector 3070a is buried with a cylindrical form at an inner periphery of a harness side of the connector 3050a and is formed with a portion for connecting the module as one body and further has the same potential.

On the other hand, the short sensor 3010 of the electric power line is connected to a faucet portion of another relay terminal 3080 in the manner of a faucet.

In the relay terminal 3080, a faucet portion of the short sensor, a portion having a spring force to connect according to a contact with the terminal 3070a and a portion for connecting the two portions are formed as one body.

The procedure for assembly of this apparatus is that firstly the terminal 3060 and the electric power line 3020 are connected in the manner of a faucet, the short sensor 3010a and the relay terminal 3080 are connected in a similar manner, and the faucet member is inserted to the connector 3050a. In the short sensor, between the relay terminal 3080 and the terminal 3070a is connected with the connection manner.

With this construction, the structure of the electric power line can be simplified, and further the terminal process of the short sensor can be simplified.

Next, the manner of detecting a short using the short sensor will be explained. The short detection circuit which is provided in the respective modules will be explained referring to FIG. 5, by means of the representative example of one circuit part of the short detection circuit 130 of FIM 5 shown in FIG. 5.

Figure 29:
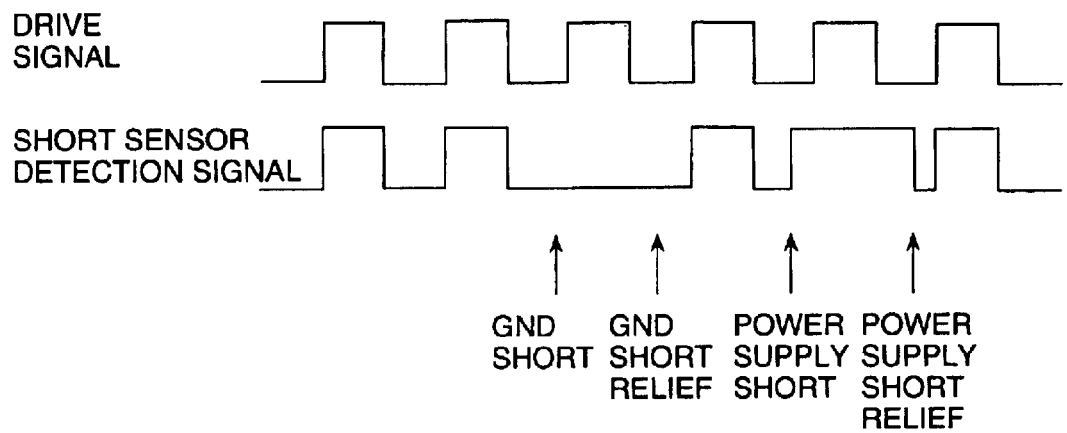
FIG. 29 is an operation waveform of a short sensor detection circuit.

When a control signal of a voltage application drive circuit 131 is controlled by a pulse shaped waveform as a drive signal, as shown in FIG. 29, during normal operation a drive signal having the same waveform is inputted in a control circuit 170. When, however, it is shorted to ground (hereinafter a lower side short), that portion of the waveform which is originally at a high potential becomes a low potential.

Further, when a short occurs in the electric power line (hereinafter, an upper side short), that portion of the waveform which is originally at a low potential becomes a high potential.

Using detection logic, it can be detected that whether the short sensor is the lower side short or is the upper side short.

Further, as explained in FIG. 2, since the short sensor has an open condition at portions of the connectors 17A, 17B, 17C and 17D, it can detect in FIM 5 a lower side short and the upper side short of the electric power lines 12A and 12H; in BCM 14 it can detect a lower side short and an upper side short of the electric power lines 12B, 12C, 12F and 12G; and in RIM 29 it can detect a lower side short and an upper side short of the electric power lines 12D and 12E. In this way, the failure point can be specified.

Further, according to the manner of connection, since the electric power lines 12B, 12C, 12F and 12G are separated in the cabin, and the electric power lines 12D and 12E are separated in the trunk compartment, in order to correct the failure, it is necessary to mend only one harness.

In the embodiment described above, when there occurs a danger of a short circuit in the electric power line, the danger is detected before the short occurs, and the necessary treatments are carried out. The function and operation of the load power supply shutdown circuit, which is an important component will be explained.

As explained in FIG. 37, there are the following functions: separating the failure point from the power bus 12 during a dead short of the load and during a dead short of the output circuit; a fail safe function for separating the failure point from the power bus 12 by detecting beforehand an upper or lower side short of the electric power line (explained later); and a sleep function for reducing the current consumption by shutting down the power supply when the vehicle is left unoccupied.

Using the construction shown in FIG. 36, the fail safe function and the sleep function will be explained.

In a step 5000, it is determined whether the vehicle is in a "sleep condition" (the vehicle is left alone and unoccupied) or in a normal operation condition. For example, when the ignition switch is "on", the accessory switch is "off" state, all of the doors are closed, and there is no load being operated, it is judged as the sleep condition.

When it is judged as the sleep condition, in a step 5060, the load power supply shutdown circuit is shut down, and the power supply to the loads is shut down. For this purpose, a relay is employed, in which the current continues to flow to the load when the connection is made. When the connection is made during the sleep condition the current continues to flow to the coil, the battery is discharged.

As stated above, during the sleep condition when the load power supply is shut down, the current does not flow into the coil of the relay and the leakage current of the semiconductor switching element which is employed in the output circuit does not flow. Accordingly, the consumption of the current can be restrained.

Further, since the power supply for the coil of the relay and the control system power supply are coupled to the power bus 12 by separate power supplies, even when the load power supply shutdown circuit is shut down, the control circuit can be operated.

During normal operation, in a step 5010, the diagnosis for the power bus is carried out in all of the modules which are connected to the power bus 12.

For diagnosis, the short detection process by the short sensor stated above is carried out. For diagnosis of the power bus, the aim will be attained using current detection.

When a failure is determined to exist in a step 5020, in a step 5030, the failure information (such as the failure point and the nature of the failure etc.) is displayed, and is stored in the memory. In step 5040, the connection of the shutdown of the load power supply shutdown circuit of the respective modules is carried out, according to the logical value table shown in FIG. 31, based on the failure point.

In the case when all components operate normally, according to the logic value table shown in FIG. 31, the connection and the shutdown of the load power supply shutdown circuit can be carried out.

As a representative example to show the logic of the load power supply shutdown circuit shown in FIG. 31, in which the failure point is shut down, a case will be explained in which the electric power line 12 is shorted.

With respect to the overall system, the operation will be explained referring to construction shown in FIG. 2; and with respect to the modules FIM 5, BCM 14 and RIM 29, the explanation will be made referring to FIGS. 5, 6 and 7, respectively.

In FIM 5, a short of the electric power line 12A shown in FIG. 2 is detected in advance, a contact of the relay of the first load power supply shutdown circuit 110a of FIM 5 and a contact of the relay of the first load power supply shutdown circuit 210a of BCM 14 are shut down; and the relay of the load power supply shutdown circuit 310 of RIM 29 (which is shut down during normal operation) is connected.

The failed point electric power line 12A and the electric power line 12B, which are connected together by the connector 17A, are completely shut down in the power bus 12.

When the contact of the relay of the first load power supply shutdown circuit 210a of BCM 14 is shut down, the electric power line 12C is shut down according to the power bus 12. However, since the relay of the load power supply shutdown circuit 310 of RIM 29, which is shut down during normal operation, is connected, power is supplied from the reverse direction compared to the normal operation.

Accordingly, only a part of the failed electric power line is shut down; and only the loads (in this embodiment, the head lamp left 1, the turn lamp left, the horn 8, PDM 20), which receive their power supply from the electric power line, cannot be operated. The other loads, being supplied with power from the reverse direction can be operated.

FIG. 32 shows another manner of fail safe operation of the load power supply shutdown circuit. In the table shown in FIG. 31, during normal operation, the load power supply shutdown circuit 310 of RIM 29 is turned "off"; however FIG. 32 differs in that all of the load power supply shutdown circuits are "on" during normal operation.

When the load power supply shutdown circuit 310 of RIM 29 is "off" during normal operation, at the time when a short is detected by current detection, since the direction of the current is fixed, the detection can be carried out easily.

Further, when the load power supply shutdown circuit 310 of RIM 29 is "on" during normal operation, the time required to turn the load power supply shutdown circuit 310 of RIM 29 on during the normal operation can be shortened.

Figure 33:
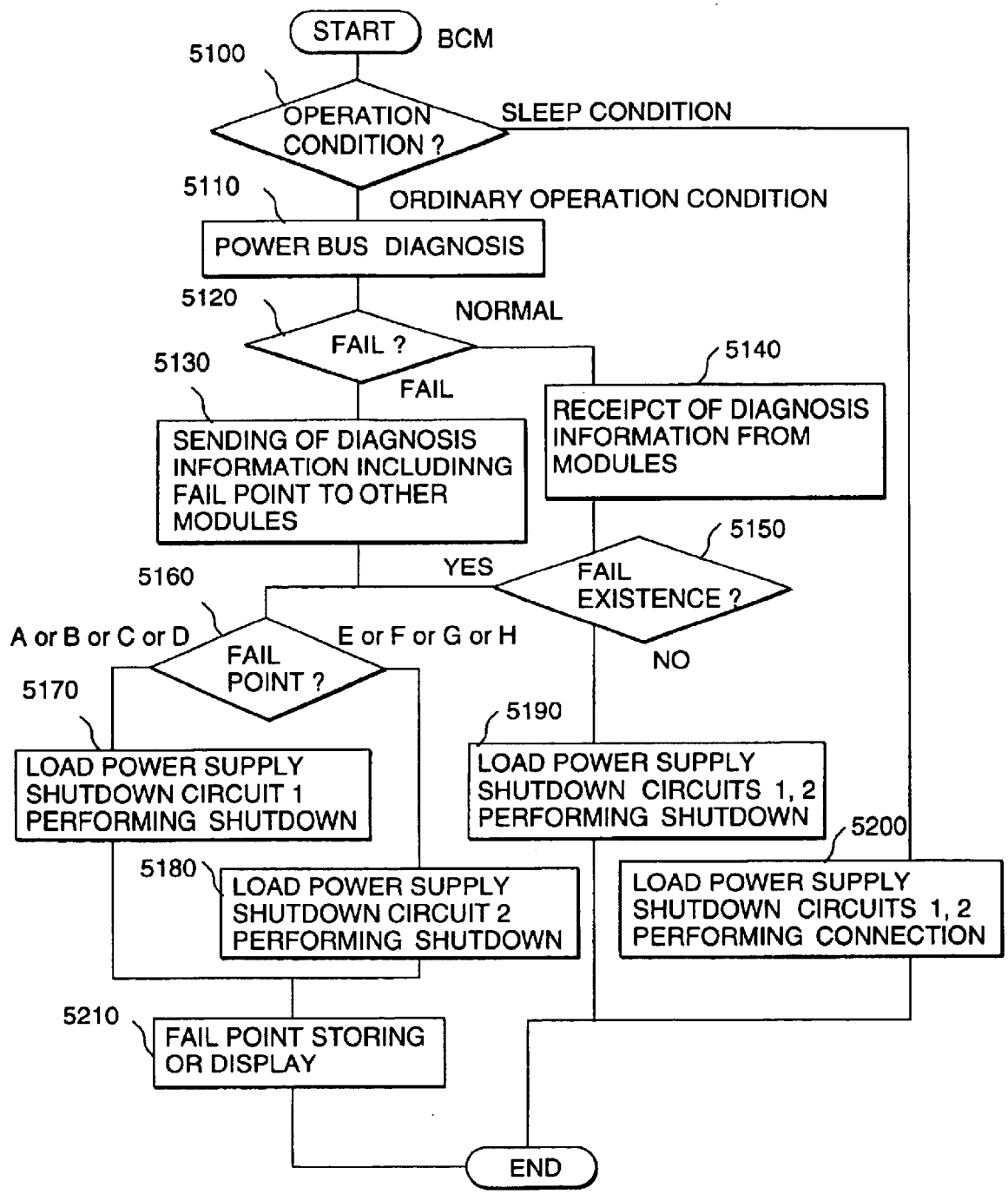
FIG. 33 is a BCM Process flow chart which shows operation during a power bus failure.
Figure 34:
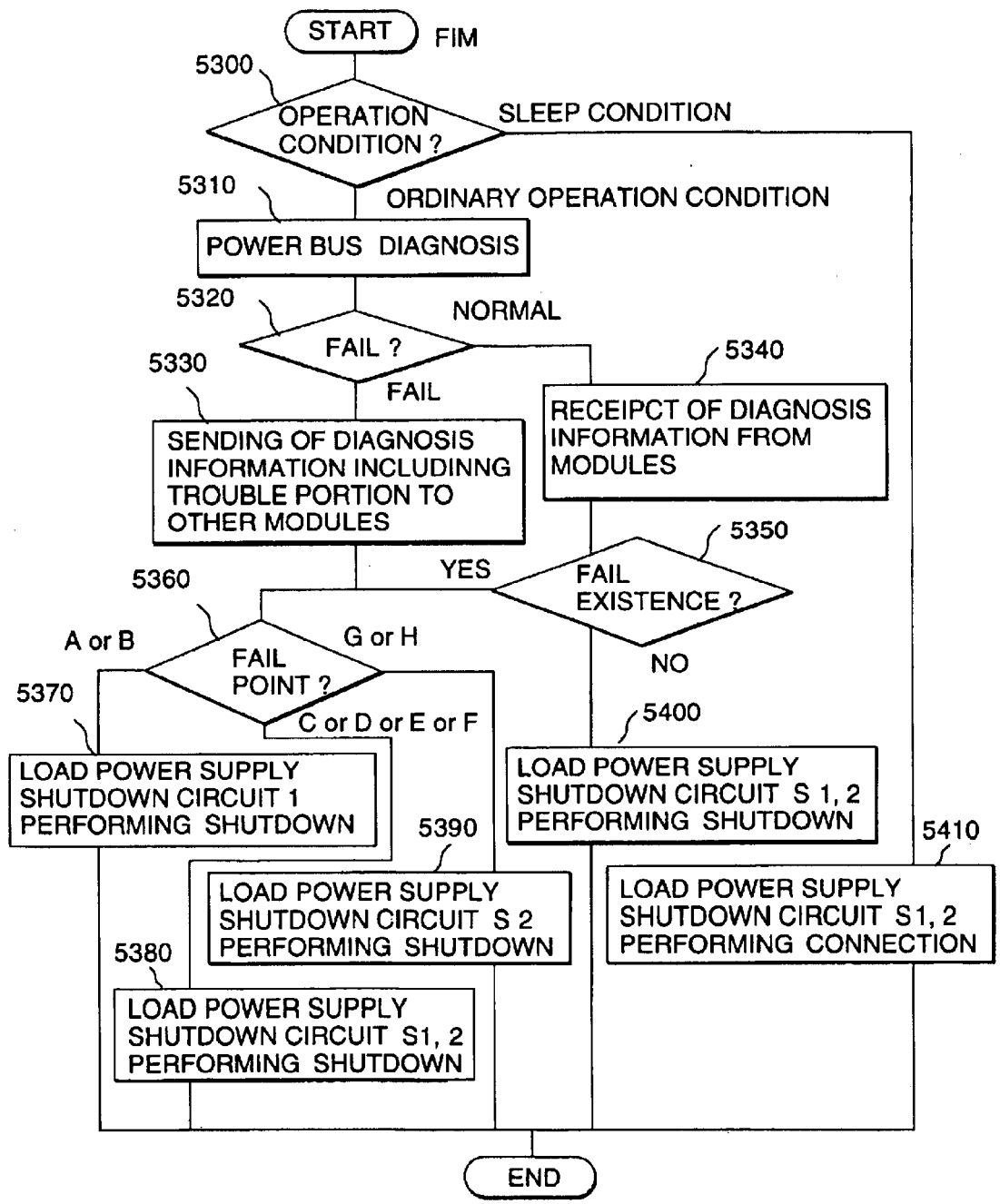
FIG. 34 is a FIM process flow chart which shows operation during a power bus failure.
Figure 35:
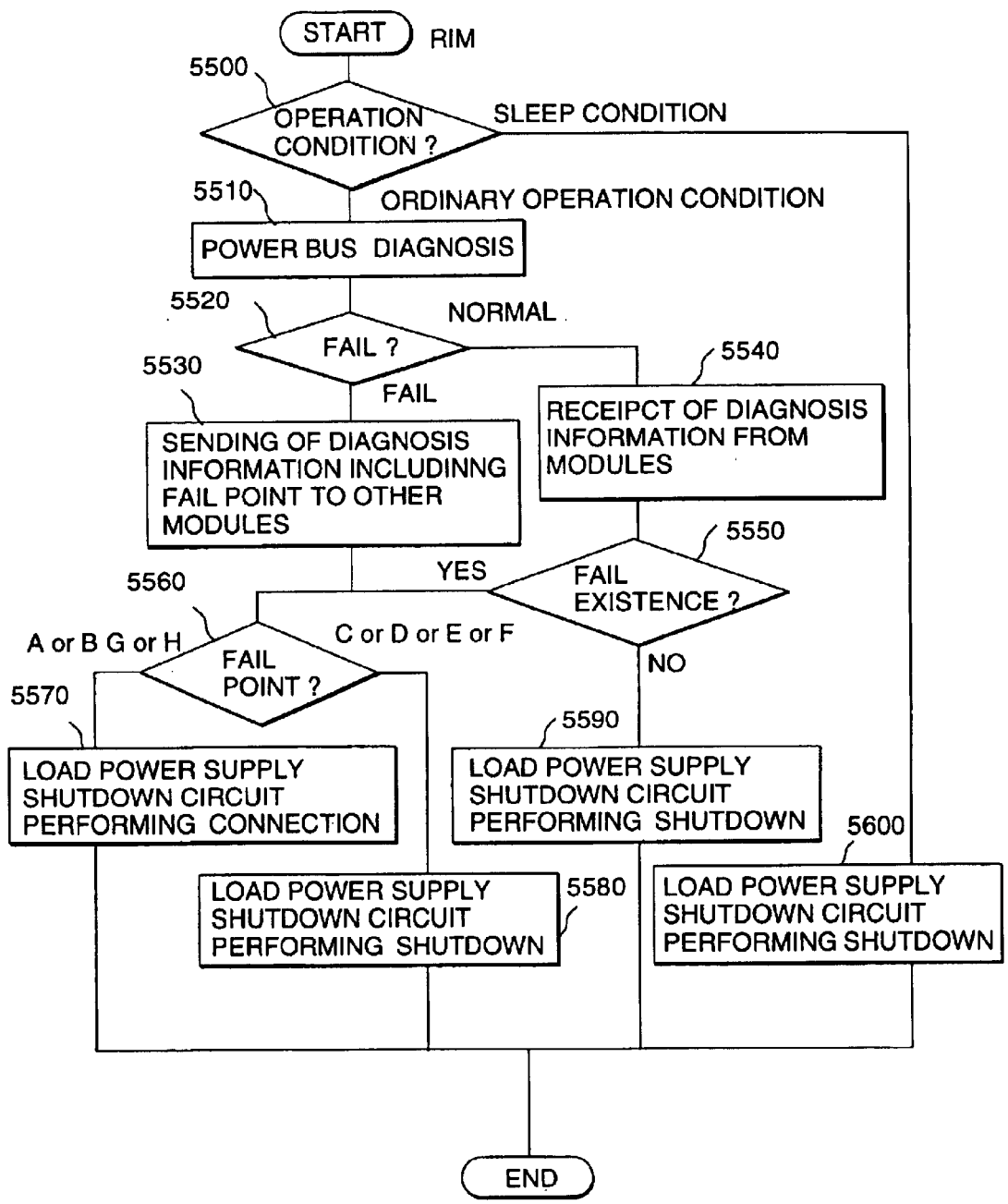
FIG. 35 is a RIM process flow chart which shows operation during a power bus failure, in which the logical value table shown in FIG. 32 is realized.

FIG. 33, FIG. 34 and FIG. 35 are respectively the process flow charts of BCM 14, FIM 5 and RIM 29 when the logic shown in FIG. 31 is controlled.

Figure 36:
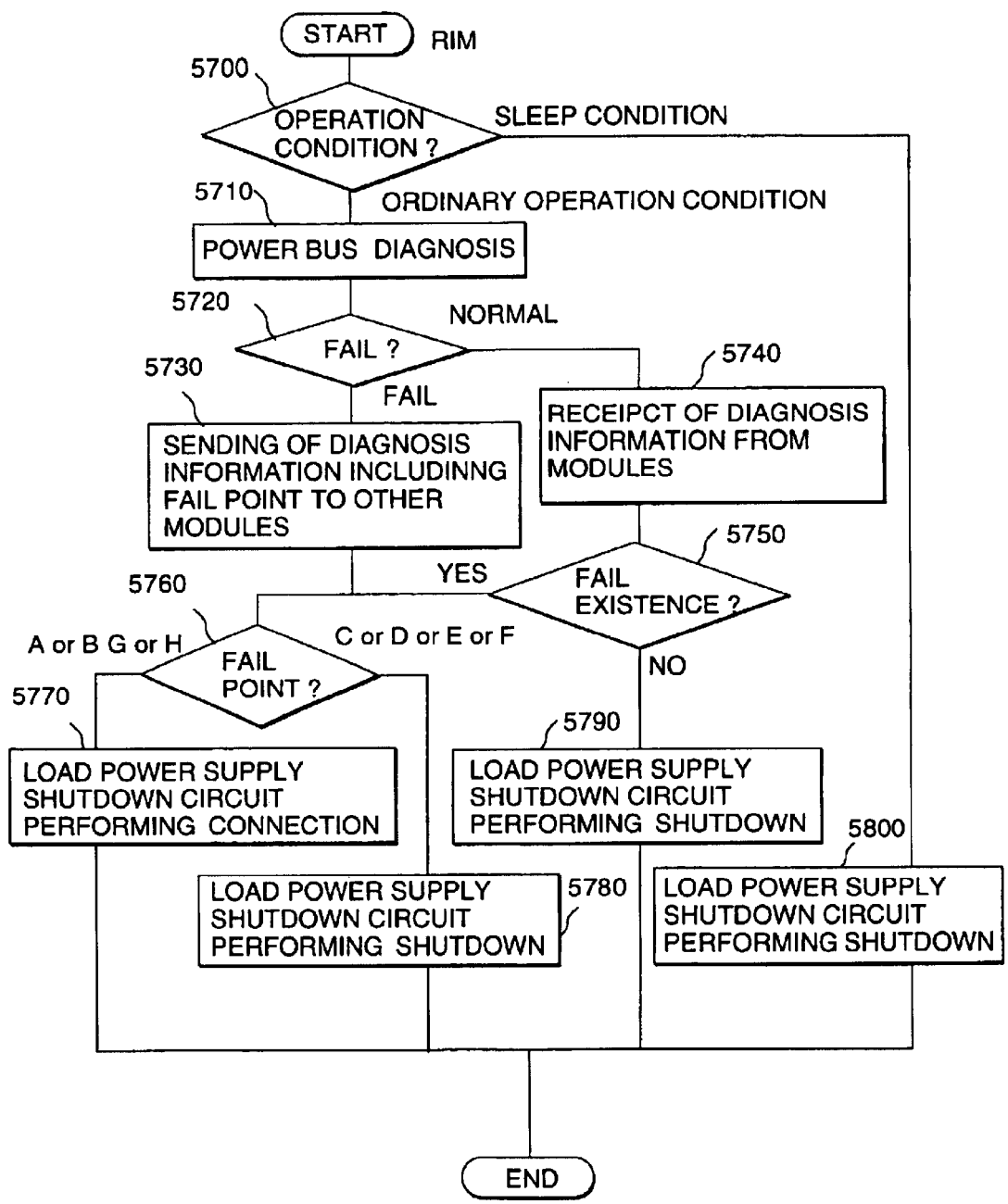
FIG. 36 is a RIM process flow chart which shows operation during a power bus failure, in which the logical value table shown in FIG. 33 is realized.

Further, FIG. 36 is a process flow chart of RIM 29 when the logic shown in FIG. 32 is controlled. Since the constructions are substantially the same, the flow chart of BCM 14 shown in FIG. 33 will be explained as a representative example.

In a step 5100, if it is judged that the vehicle is in a sleep condition, in a step 5200, the first load power supply shutdown circuit 210a and the second load power supply shutdown circuit 210b are shut down, and the process is finished.

On the other hand, in the ordinary operation condition (not sleep), in step 5110, the diagnosis of the power bus is carried out according to the short detection circuit 230. In a step 5120 when a failure is detected, in a step 5130, the diagnosis information in which any failure point exists in another module is received by the multiple communication bus, and then the steps including a step 5160 are carried out.

On the other hand, in the case of operation, to judge whether or not there exists a failure on the electric power line in another module, in a step 5140, the diagnosis information from the other modules are received. When it is determined, based on this information that a failure has occurred, in a step 5160, the failure point is determined. When the fail point is any of the electric power lines 12E, 12F, 12G and 12H, in a step 5180, the second load power supply shutdown circuit 210b is shut down, and in a step 5210, the failure point is displayed, and this information is stored in the memory.

In a step 5150, when there is no failure, the first load power supply shutdown circuit 210a and the second load power supply shutdown circuit 210b are connected and then the process has finished.

Figure 30:
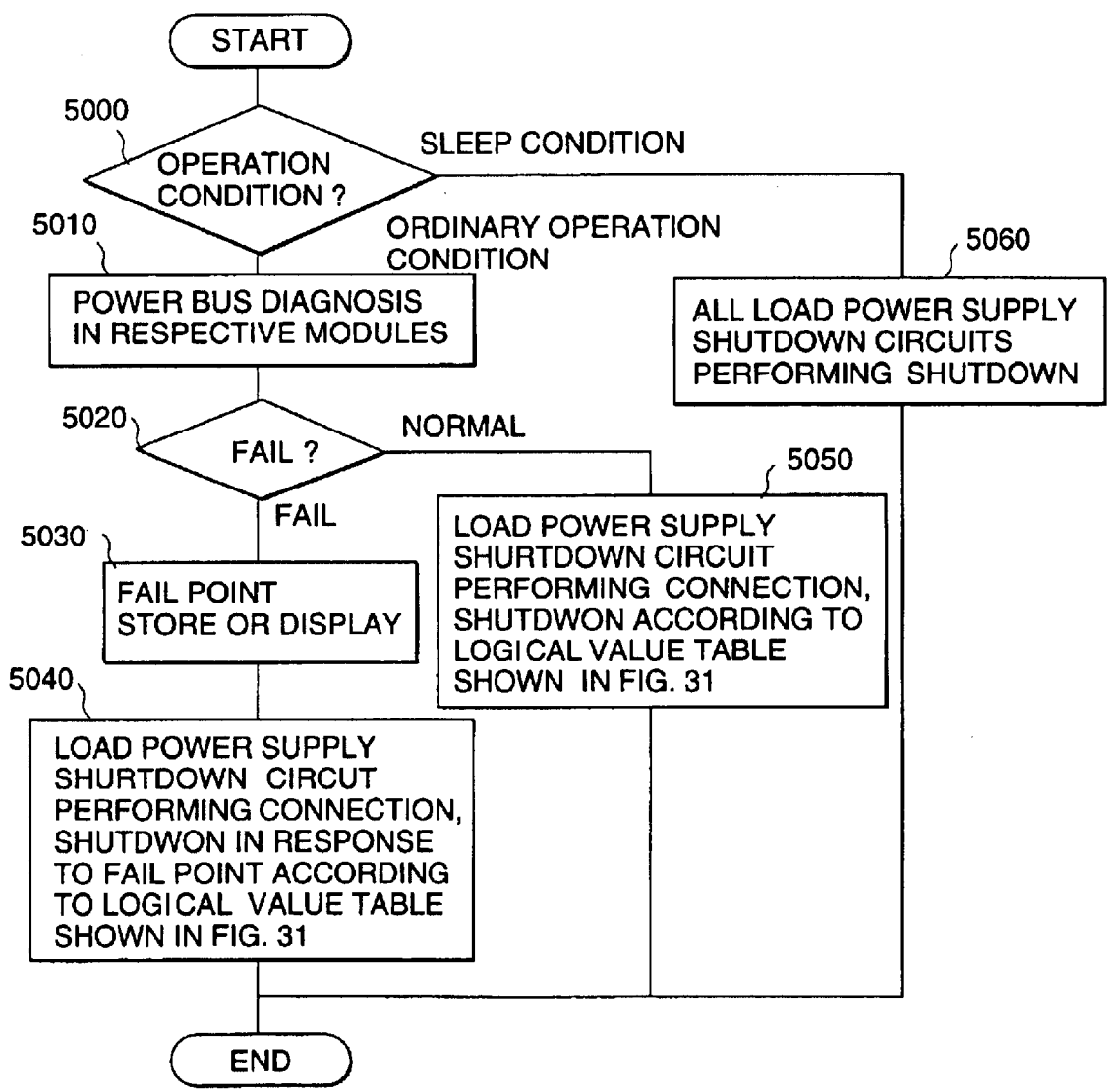
FIG. 30 illustrates an algorithm of power bus over-current detection and protection operation.

Since the process flow charts in other modules are the same ones, a further detailed explanation of them will be omitted. With the above processes, a system operation shown in FIG. 30 can be carried out.

Figure 42:
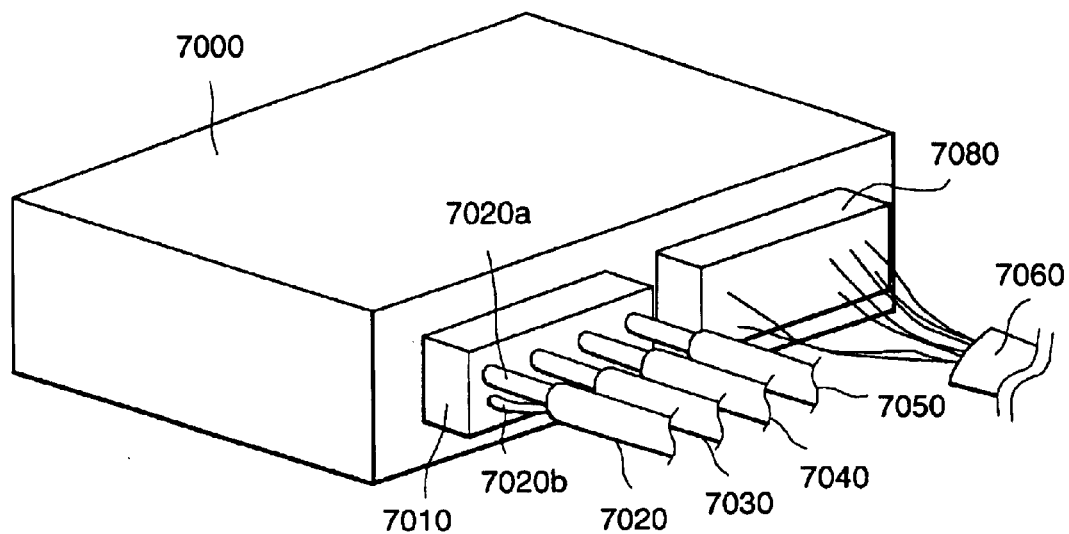
FIG. 42 is a module construction view (1)
Figure 43:
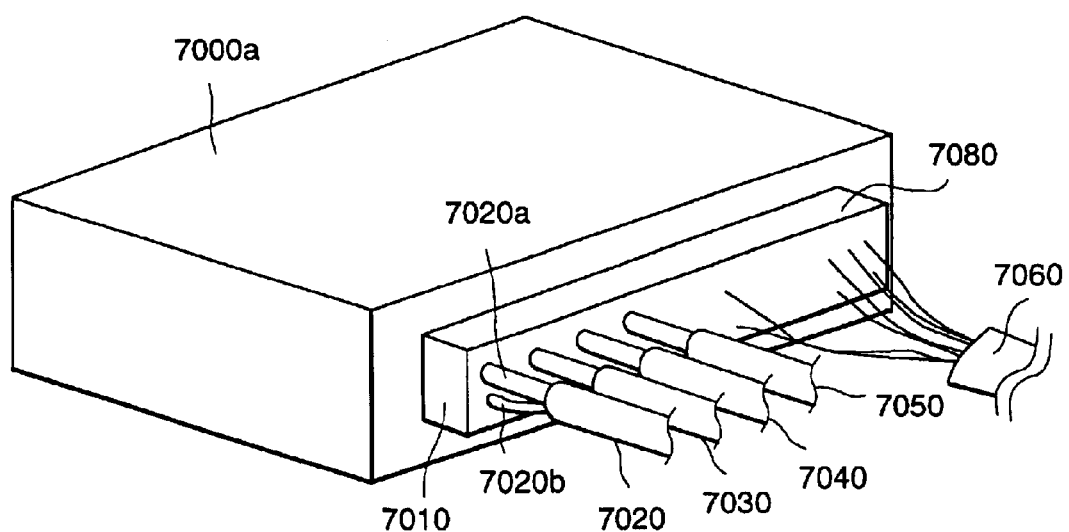
FIG. 43 is another.module construction view (2)

FIG. 42 and FIG. 43 show the connection manner of the module with the power bus 12.

The construction is constituted by a module 7000 shown in FIG. 42, power buses 7020, 7030, 7040 and 7050 and an electric power line 7020a, a short sensor 7020b. Only the power buses are connected to the module 7000 by a connector 7010; another electric power line 7060 is connected to the module 7000 with another connector 7080. In the construction shown in FIG. 43, the power buses 7020, 7030, 7040 and 7050 and the another electric power line 7060 are connected to a module 7100 with the same connector 7110.

As shown in the construction shown in FIG. 42, when it is connected to the module using the connector having the power bus, according to a number of the other electric power lines, since it is unnecessary to alter the connector, which can be standardized.

Further, as shown in FIG. 43, when the integral connector is employed, the occupation area of the connector can be deleted, accordingly the module can be made small.

Figure 44:
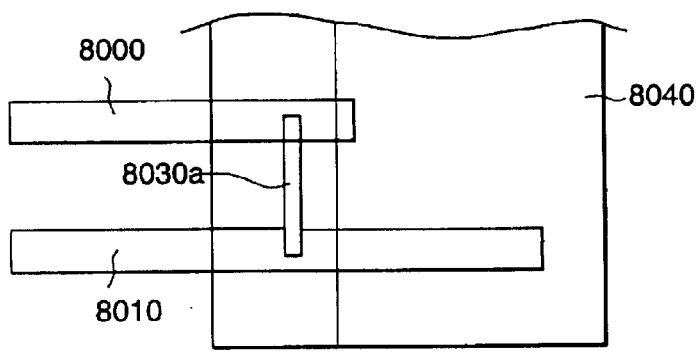
FIG. 44 shows the construction of a connector having a shut resistor (1)
Figure 44:
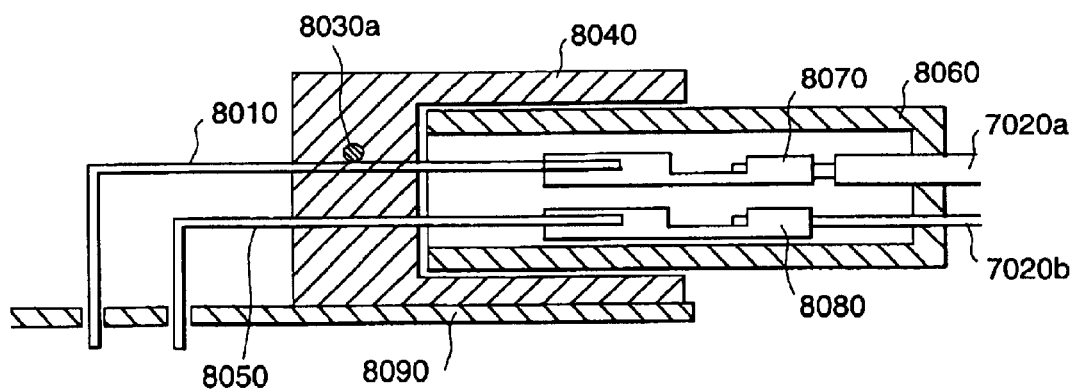

FIG. 44 is a view which shows the shunt resistor used in the over-current detection circuit installed in the connector of the module.

A connector housing 8040 of the module includes the connector terminals 8000 and 8010, and a shunt resistor 8030. The connector housing 8040 and the shunt resistor 8030 are welded or soldered to the connector terminals 8000 and 8010.

The construction is constituted by an electric power line 7020a of the power bus and a short sensor 7020b. The electric power line 7020a and the short sensor 7020b are connected respectively to module side terminals 8010 and 8050 through terminals 8070 and 8080.

Figure 45:
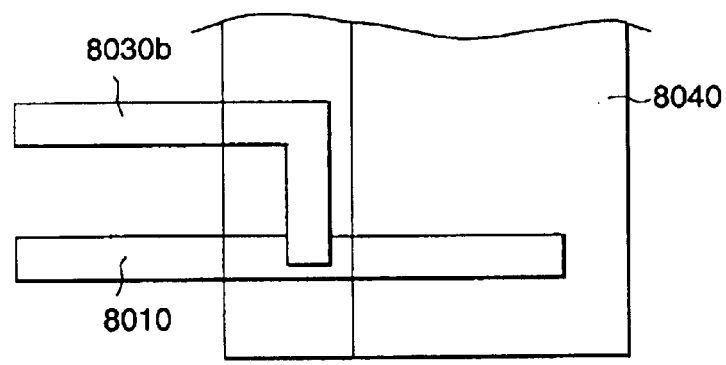
FIG. 45 shows the construction of another connector having a shut resistor (2).
Figure 45:
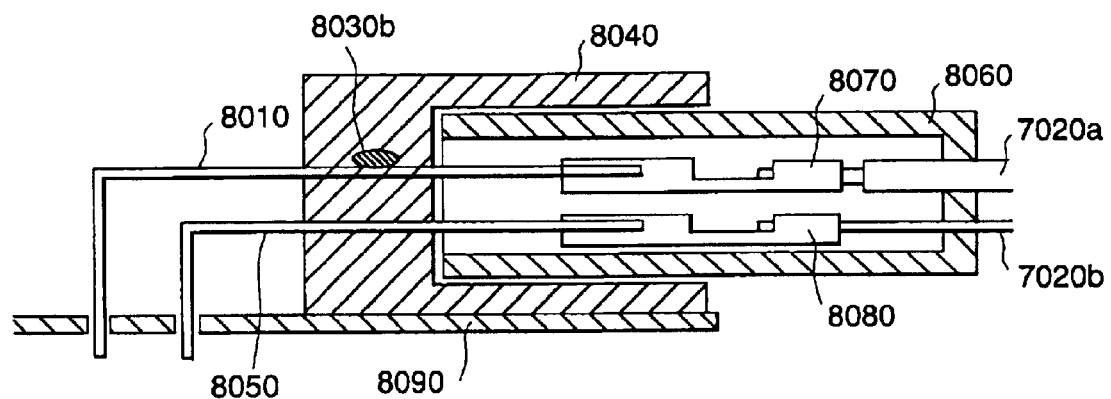

In the construction shown in FIG. 45 compared with the construction shown in FIG. 44, the shunt resistor 8030a and the connection terminal 8000 are formed as one body 8030b.

As stated above, since the shunt resistor is installed in the interior portion, the distance for flowing the large current can be shortened. Also, the size of the module can be made small.

According to the present invention, the number of fuses can be made decreased, the wire harness for supplying power can be shortened.

According to invention, not only the occurrence of a short circuit of the electric power line can be prevented in advance, but also the failure point during the short circuit can be specified.

Further, according to a further feature of the invention, since an over-current detection circuit is provided, when the load fails, the failed portion can be separated.

Further, according to another feature of the invention, the consumption of current of the power supplying apparatus during the non-operation of the vehicle can be reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A power supply apparatus for a vehicle, comprising:
an electric power line comprising a plurality of sequentially connected segments wired in an interior of a vehicle from a battery, for supplying power to various kinds of loads of said vehicle via a plurality of modules which are connected to receive electric power via respective segments of said electric power line;
a semiconductor switching element connected between each respective segment and a load supplied by said segment for controlling electric power to said load;
a plurality of short sensors for detecting a short circuit in at least one of said plurality of segments of said electric power line, said at least one segment connecting respective modules;
a power supply shutdown means connected in series with each segment of said electric power line connecting respective modules, said power supply shutdown means being connected in series with said semiconductor switching element to supply electric power to said semiconductor switching means;
a control circuit for specifying a short circuited segment of said electric power line in accordance with a short detection condition of said plurality of short sensors; and
means responsive to signals from said control circuit for cutting off the power supply cutoff means, and removing the short circuited segment from said electric power line for supplying power to said loads; wherein,
the electric power line includes a plurality of sensor electric lines which form outer layer portions of the respective segments of the electric power line, and are provided with a short detecting potential;
the sensor lines are divided into connecting portions for the respective control modules of the electric power line, or in connecting portions at a midpoint of the electric power line; and
a short circuit in a particular segment is predicted based on a change of the potential of the plurality of sensor lines.

2. A power supply apparatus for a vehicle according to claim 1, further comprising:
a connector for connecting said electric power line segments to each other arranged between respective short sensors.

3. A power supply apparatus for a vehicle, comprising:
a battery;
a load drive electric power line wired in an interior of a vehicle from the battery through a first fuse, for driving a vehicle load;
a control circuit drive electric power line wired in said interior of said vehicle from a battery through a second fuse, for driving a control apparatus;
at least one control apparatus including a control circuit which is supplied with power from said control circuit drive electric power line, and a load drive circuit provided between said load drive electric power line and said load, for controlling a supply of a power to said load in response to a signal from said control circuit;
a short sensor for detecting a short circuit of said load drive electric power line; and
a shutdown circuit for performing a shutdown of an electric line between said first fuse and said load drive circuit in response to a signal from said short circuit through said control circuit.

4. A power supply apparatus for a vehicle, comprising:
a battery;
a load drive electric power line wired in an interior of a vehicle from the battery through a first fuse, for driving a vehicle load;
a control circuit drive electric power line wired in said interior of said vehicle from a battery through a second fuse, for driving a control apparatus; and
at least one control apparatus including a control circuit which is supplied with power from said control circuit drive electric power line, and a load drive circuit provided between said load drive electric power line and said load, for controlling a supply of a power to said load in response to a signal from said control circuit; wherein:
said control apparatus includes a communication control circuit;
said at least one control apparatus comprises a first control apparatus and a second control apparatus which are connected to each other by a communication line; and
supply and interruption of power to a load of said second control apparatus is controlled in response to a condition of a switch which is inputted to said first control apparatus.

5. A load control module of an electric power supply apparatus for a vehicle, said load control module comprising:
- a communication circuit which is connectable to at least one other module of said power supply apparatus through a communication line;
- a control circuit connected to said communication circuit, for outputting a load control signal in accordance with a signal which is inputted through said communication circuit;
- a drive circuit connected to an electric power line that is coupled between said control module and said other module, said drive circuit controlling a power supply to a first load component of said vehicle in accordance with an output signal from said control circuit; and
- a relay for opening and closing a connection between said power line and a second load component, as a function of an output from said control circuit, said relay opening and closing in response to load control signals output from said control circuit; wherein,
- the control module includes a fuse for connecting the particular load and the relay.

6. A power supply apparatus for an automobile, comprising:
- a rear control module installed in an area which is rearward of a driver's seat of the automobile;
- a front control module installed in an area which is forward of said driver's seat of the automobile;
- a central control module installed between said front control module and said rear control module;
- a rear electric power line for connecting said rear control module and a battery;
- a front electric power line for connecting said front control module and said central control module to said battery;
- an ignition switch connected to an input interface of said central control module;
- an ignition relay coil connected to an output interface of said front control module;
- an ignition relay contact which closes and opens in response to a signal of said ignition switch which is inputted to a communication circuit of said front control module from said central control module;
- a specific load to which power from said front side electric power line is supplied and interrupted through said ignition relay contact; and
- at least one additional load to which electric power from the rear electric power is supplied and interrupted through the driver circuit of the rear control module;
- wherein, a fusible link is connected between the input side terminal and the output side terminal of the ignition relay.

7. A power supply apparatus for an automobile according to claim 6, further comprising:
- a fuse connected between said ignition relay contact and said specific load.

8. A power supply apparatus for an automobile according to claim 7, wherein:
- said specific load is one of an alternator and a stator.

9. A power supply apparatus for an automobile according to claim 7, wherein said ignition relay and said fuse are received in a relay/fuse box provided adjacent to said control.

10. A power supply apparatus for an automobile, comprising:
- a load drive control circuit provided between a power supply of said automobile and a specific load;
- a relay provided between said load drive control circuit and said power supply;
- a sleep control circuit for opening a relay contact by stopping the current in flowing a coil of said relay and performing a shutdown of an electric line to said specific load in response to detection that the automobile is not operated and power is not needed in said specific load.

* * * * *